US009880962B2

(12) United States Patent
Tuccinardi et al.

(10) Patent No.: US 9,880,962 B2
(45) Date of Patent: Jan. 30, 2018

(54) VEHICLE ENTERTAINMENT ASSEMBLIES AND SYSTEMS

(71) Applicant: TMI PRODUCTS, INC., Corona, CA (US)

(72) Inventors: Eugene Michael Tuccinardi, Temecula, CA (US); Roel Castillo Espina, Lake Elsinore, CA (US); Jon Parker Lawrence, Riverside, CA (US); Jonathan Daniel Fether, Temecula, CA (US)

(73) Assignee: TMI PRODUCTS, INC., Corona, CA (US)

( * ) Notice: Subject to any disclaimer, the term of this patent is extended or adjusted under 35 U.S.C. 154(b) by 0 days.

(21) Appl. No.: 15/431,716

(22) Filed: Feb. 13, 2017

(65) Prior Publication Data
US 2017/0154006 A1 Jun. 1, 2017

Related U.S. Application Data

(63) Continuation of application No. 14/065,219, filed on Oct. 28, 2013, now Pat. No. 9,584,890.

(60) Provisional application No. 61/719,833, filed on Oct. 29, 2012.

(51) Int. Cl.
*G06F 13/40* (2006.01)
*G06F 1/16* (2006.01)

(52) U.S. Cl.
CPC ........ *G06F 13/4081* (2013.01); *G06F 1/1632* (2013.01)

(58) Field of Classification Search
None
See application file for complete search history.

(56) References Cited

U.S. PATENT DOCUMENTS

| 8,243,215 B2* | 8/2012 | Schedivy ................. H04N 5/64 348/837 |
| 8,953,102 B2* | 2/2015 | Tranchina ........... B60R 11/0252 348/837 |
| 2004/0228622 A1* | 11/2004 | Schedivy ............. B60N 2/4876 386/230 |
| 2006/0119748 A1* | 6/2006 | Vitito .................. B60R 11/0211 348/837 |
| 2006/0148576 A1* | 7/2006 | Vitito ..................... B60K 35/00 463/46 |

(Continued)

*Primary Examiner* — Paul Huber
(74) *Attorney, Agent, or Firm* — Barcelo, Harrison & Walker, LLP

(57) ABSTRACT

Methods and systems are disclosed relating to in-vehicle entertainment, information presentation, and/or processing. Aspects of multimedia in-vehicle entertainment systems that may incorporate removable and/or portable tablet-type computing devices are described. In certain configurations, a hinged tablet computer carrier includes guide rails into which a portable tablet computer may slide while in an open position, and which can hinge into a closed or locked position that holds the tablet computer in place, positions it for viewing, and effects mechanical and electrical coupling of the tablet computer with other components of the in-vehicle entertainment system. Exemplary placement could include headrest, seatback, overhead, or in-dash mounting. Hinging or sliding could be vertical or horizontal. Various other mechanical, electronic, and electro-mechanical aspects of the methods and systems are described.

20 Claims, 51 Drawing Sheets

(56) References Cited

U.S. PATENT DOCUMENTS

| | | | |
|---|---|---|---|
| 2007/0052266 A1* | 3/2007 | Chu | B61D 33/005 297/217.3 |
| 2007/0108788 A1* | 5/2007 | Shalam | B60R 11/0235 296/37.15 |
| 2008/0138039 A1* | 6/2008 | Wu | B60R 11/0235 386/353 |
| 2008/0246319 A1* | 10/2008 | Chang | B60R 11/0235 297/217.3 |
| 2009/0091164 A1* | 4/2009 | Liu | B60N 2/4876 297/217.3 |
| 2009/0167977 A1* | 7/2009 | Lee | B60R 11/0235 349/58 |
| 2009/0278389 A1* | 11/2009 | Pos | B60N 2/286 297/217.3 |
| 2012/0005393 A1* | 1/2012 | Hu | H04L 12/40006 710/313 |
| 2012/0280542 A1* | 11/2012 | Wood | B60R 11/0235 297/180.1 |
| 2013/0119727 A1* | 5/2013 | Lavelle | B60N 2/4876 297/217.3 |
| 2014/0016032 A1* | 1/2014 | Chou | H04N 7/0125 348/441 |

* cited by examiner

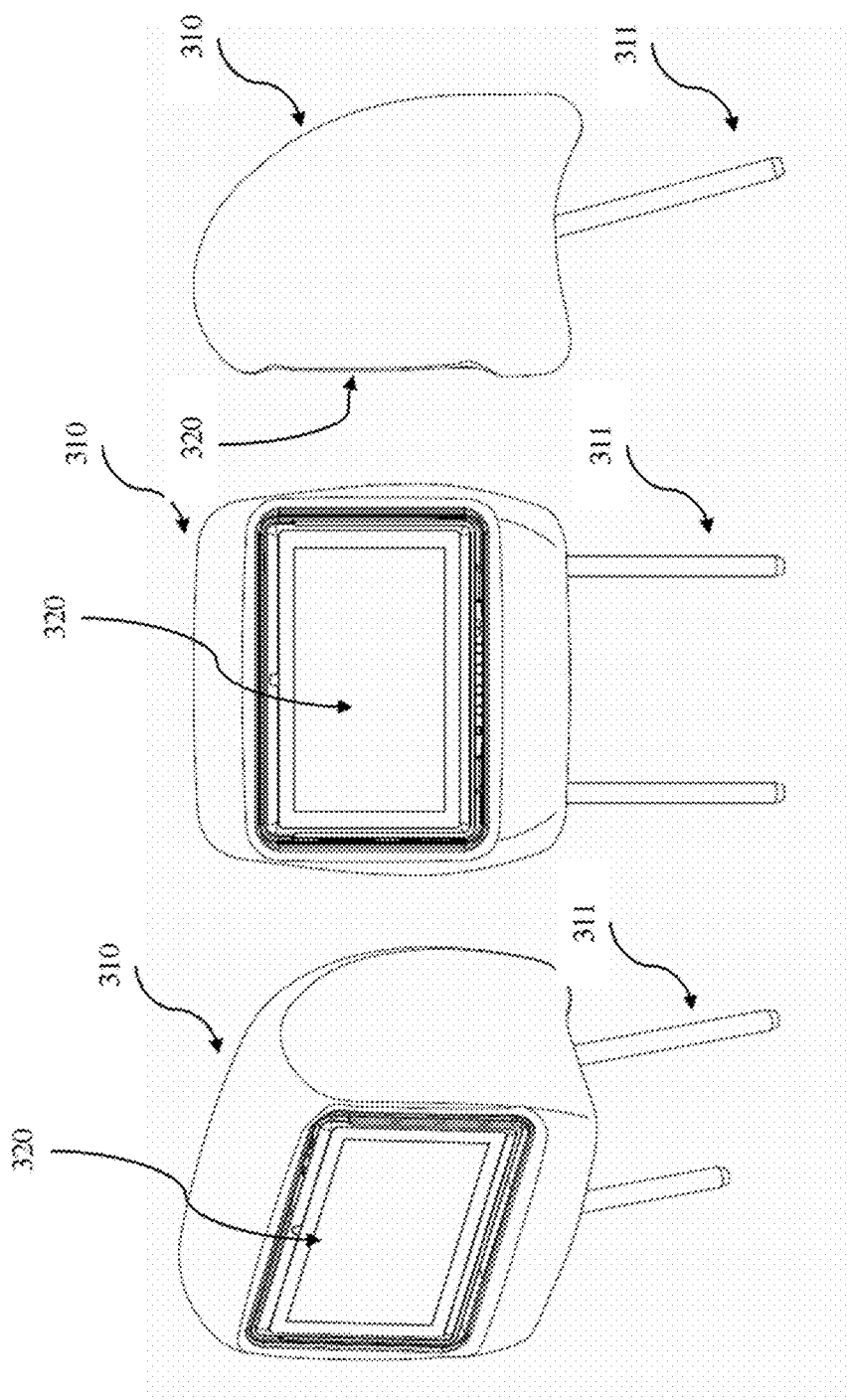

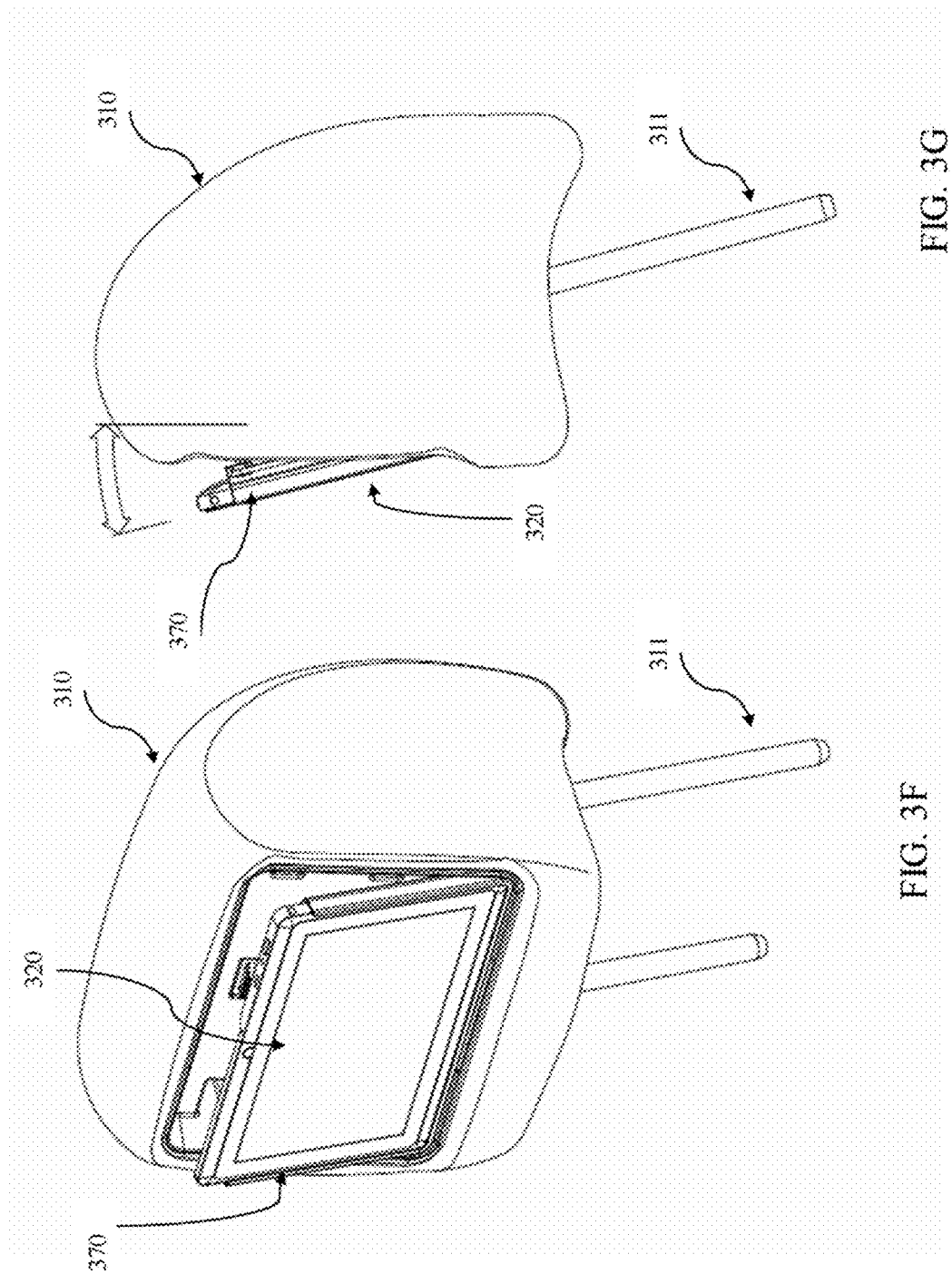

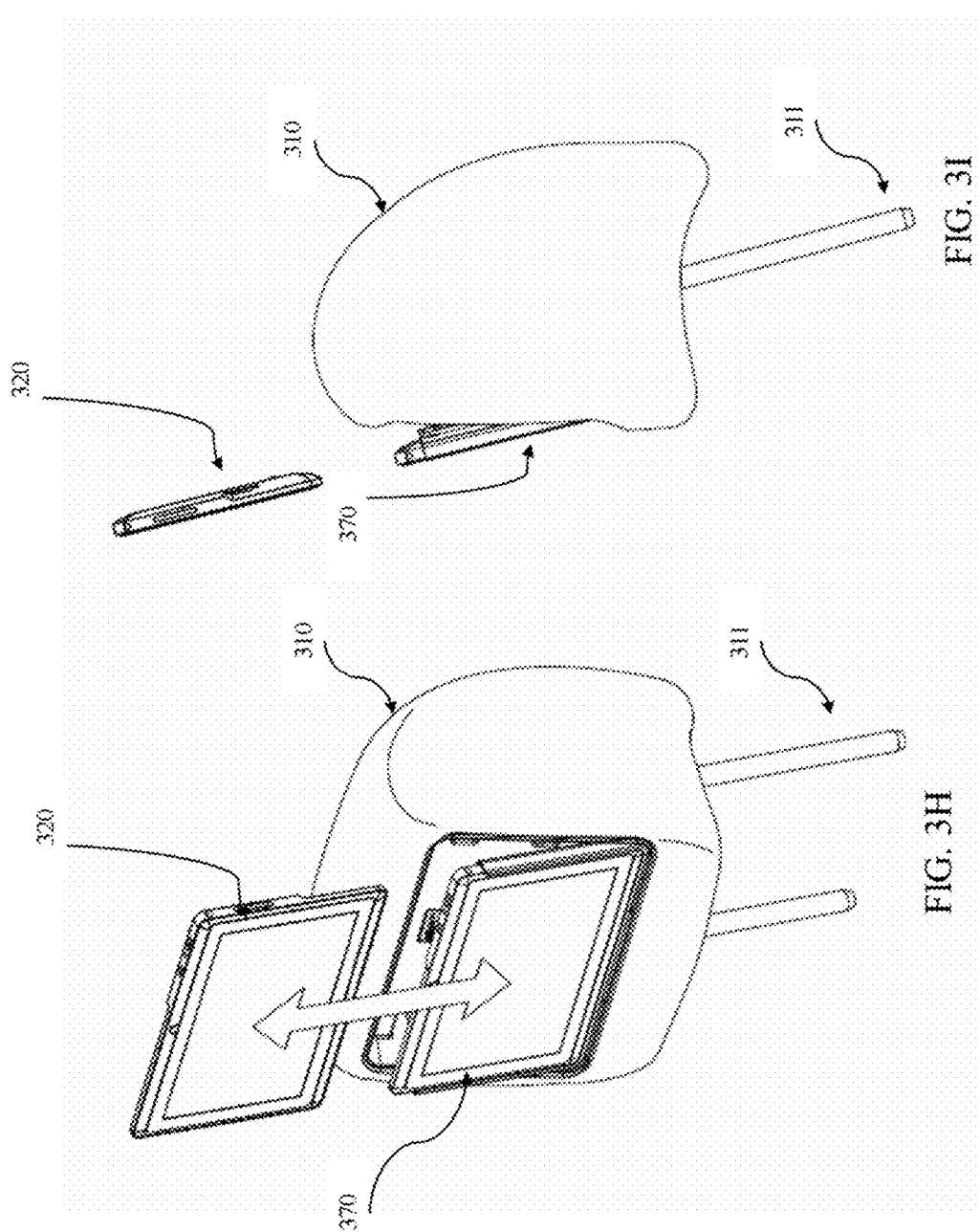

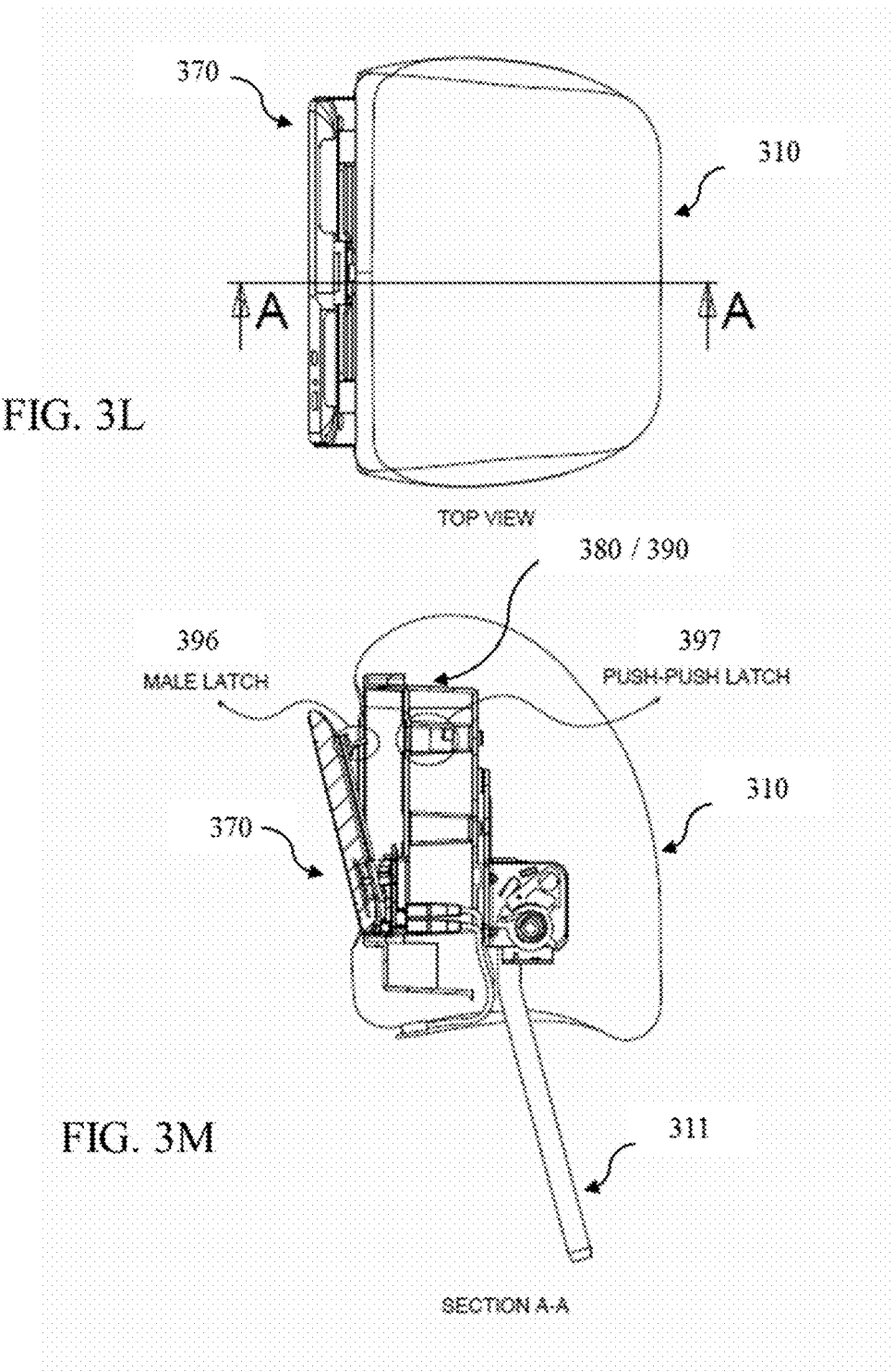

VEHICLE ENTERTAINMENT ASSEMBLIES AND SYSTEMS

CROSS-REFERENCE TO RELATED APPLICATIONS

This application claims benefit under 35 U.S.C. § 120 as a continuation of U.S. patent application Ser. No. 14/065,219 to Tuccinardi, filed 2013 Oct. 28 and entitled "Vehicle Entertainment Assemblies and Systems," pending, which claims benefit under 35 U.S.C. § 119(e) to U.S. Provisional Patent Application 61/719,833, filed on 2012 Oct. 29, the contents of which are incorporated herein by reference in their entirety.

BACKGROUND OF THE DISCLOSURE

1. Field of the Disclosure

This disclosure relates generally to methods, assemblies, and systems for in-vehicle entertainment, information presentation, and/or processing. More specifically, according to aspects of certain embodiments, this disclosure relates to multimedia in-vehicle entertainment systems incorporating removable tablet-type computing devices.

2. General Background

Various multimedia in-vehicle entertainment systems are known, not only to skilled artisans in the field, but increasingly to the general public as well. Typically such systems (such as those for use in an airplane or automobile) include a display screen (often based on flat-screen technology), a sound system (e.g., based on wired or wireless headphone interfaces), and one or more entertainment or information content sources (e.g., a DVD player, flash memory device interface, hard disk drive, MP3 or other music player). It is also generally known that such systems may be mounted at various locations within a vehicle, such as in a seat back (or headrest), in a dash board, or in an overhead-mounted or floor-mounted console. Moreover, various configurations for the physical arrangement of each of the components in a given system are known. For example, a single unit mounted within a vehicle headrest may contain a display screen, a DVD player, and a headphone interface, among other elements, whereas a different system may employ a display screen that is mounted in an overhead console (and may use headphone-based audio systems, speaker-based audio systems, or no audio at all) and receive its entertainment or information content from a central server or DVD player located elsewhere within the vehicle or even remotely from the vehicle but coupled via appropriate network interfaces that are well known.

Various stand-alone entertainment or information presentation and/or consumption devices such as tablet computers are also well known. In general, such tablet computers may be considered as mobile computers, typically larger than mobile phone or personal digital assistants, and, depending on the specifics of each of the many available devices, typically include a touch screen or other user interface, as well as audio output capabilities, network connectivity of various types, data storage facilities (e.g., flash memory or various interfaces to other internal or external data storage devices), media playback facilities (e.g., MP3 and/or MPEG player), camera/microphone capabilities, navigational facilities (e.g., GPS), and/or various other features.

As described herein in detail, among other aspects of the present invention, it is desirable to address the limitations in the art with respect to the integration of tablet computers into vehicle entertainment systems. Other features and advantages of various aspects of the present invention may be seen upon review of the accompanying figures and of the detailed description that follows.

BRIEF DESCRIPTION OF THE DRAWINGS

By way of example, reference will now be made to the accompanying drawings, which are not to scale unless otherwise indicated. The same reference numbers will be used throughout the drawings and the following description to refer to the same or like parts, unless otherwise indicated.

FIGS. 3C-3M depict various aspects of a tablet-mounting and interconnection system according to certain embodiments of the present invention.

DETAILED DESCRIPTION

Figure 1A:
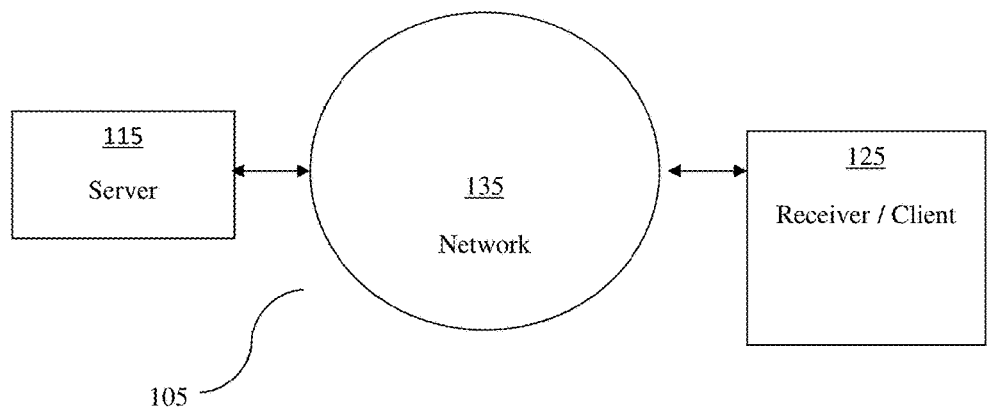
FIG. 1A illustrates an exemplary networked environment and its relevant components according to certain embodiments of the present invention.

Those of ordinary skill in the art will realize that the following description is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any non-transitory structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1A depicts an exemplary networked environment 105 in which systems and methods, consistent with exemplary embodiments, may be implemented. As illustrated, networked environment 105 may include a server 115, a receiver/client 125, and a network 135. The exemplary simplified number of servers 115, receivers 125, and networks 135 illustrated in FIG. 1A can be modified as appropriate in a particular implementation. In practice, there may be additional servers 115, receivers 125, and/or networks 135.

In certain embodiments, a receiver 125 may include any suitable form of multimedia playback device, including, without limitation, a DVD player. A receiver 125 may connect to network 135 via wired and/or wireless connections, and thereby communicate or become coupled with server 115, either directly or indirectly. Alternatively, receiver 125 may be associated with server 115 through any suitable tangible computer-readable media or data storage device (such as a disk drive, CD-ROM, DVD, or the like), data stream, file, or communication channel.

Network 135 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 105 may perform one or more of the tasks described as being performed by one or more other components of networked environment 105.

Figure 1B:
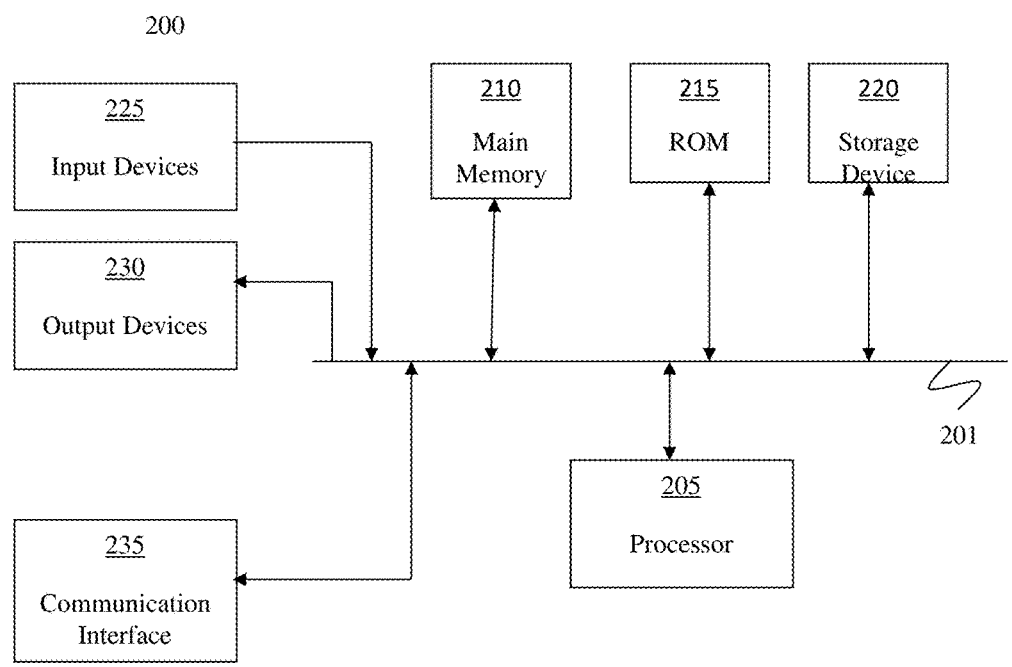
FIG. 1B is an exemplary block diagram of a computing device that may be used to implement aspects of the present invention.

FIG. 1B is an exemplary diagram of a computing device 200 that may be used to implement aspects of certain embodiments of the present invention, such as aspects of server 115 or of receiver 125. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200. Computing device 200 may be implemented as a tablet computer in certain embodiments, which, depending on the needs of each particular implementation, may be initially configured according to any suitable variety of the many commercially-available and well-known devices of this type.

Processor 205 may include any type of conventional processor, microprocessor, or processing logic that interprets and executes instructions. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 135 as shown in FIG. 1A.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 135 shown in FIG. 1A, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 135. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 135. For example, source data or other information received from devices connected to the network 135 may be output via the browser. Also, both the browser and the browser assistant are capable of performing operations on the received source information prior to outputting the source information. Further, the browser and/or the browser assistant may receive user input and transmit the inputted data to devices connected to network 135.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

Embodiments of the present invention may be configured to integrate with different kinds of tablets computers that are commercially available from various manufacturers including, without limitation, Apple Computer's iPad tablets, various Android-based tabled computers, Samsung Galaxy tablets, Amazon Kindle e-book readers (including Kindle Fire and Kindle Fire HD variants), and Barnes & Nobles Nook e-reader). Custom tablet computers may of course also be used if doing so suits the needs of particular implementations. The tablet computers may be mounted in various parts of a vehicle according to certain embodiments of the present invention. These include, without limitation: headrests, seat backs, as a Center Console Monitor System, as a Drop Down Monitor System, as an Active Head Restraint (AHR) Monitor System.

Certain embodiments of the in-vehicle entertainment systems described herein support some or all of the following functionality:

A docket system to hold and to connect the tablet to the power supply and to the audio system of the car. The tablet can be disconnected and removed very quickly.

Wireless capabilities with some or all of the following: wifi synchronization; Bluetooth interfaces; other analog or digital wireless interfaces, integrated web browser(s); file transfer and synchronization.

Audio output options, including, without limitation headphone mini jack outputs; hard wires to connect to the car stereo system; FM transmitter capability from the headrest system to the car stereo; audio control from the steering wheel's or in-dash audio controls.

The headrest monitor system is capable to control front and rear cameras, with recording option.

Inputs and Outputs: Low profile connectors; USB connectors; Connector for Apple devices; Connectors for DVD players (internally DVD hub); Micro AV receptacle; Ethernet ports; power over Ethernet; Micro Slim AV; Circuit Board with USB port; Micro AV ports at the bottom of the headrest post.

Video with HDMI, video option for Linux, for Apple, and the like.

Parental Control app from the Tablet and/or Parental Control from the Front Monitor of the vehicle.

I Square C bus (i.e., I2C) interface capability.

Synchronizations, recording and apps for games, pictures, music, photos, capable of sharing videos and music with other monitors in the vehicle, with Wi-Fi synchronization, Bluetooth, and the like.

Keyboard interface capabilities.

GPS Navigation (which may share GPS information with monitors or subsystems elsewhere in the vehicle).

Virtual cloud interface (described in more detail in other portions of this application).

The headrest monitor system can communicate with other tablets, or smartphones in the vehicle.

Self-tuning FM transmitter using a real tuner; radio channel to transmit audio feed.

Integrated infrared (IR) transmitter port.

Removable/dockable DVD player.

Figure 1C:
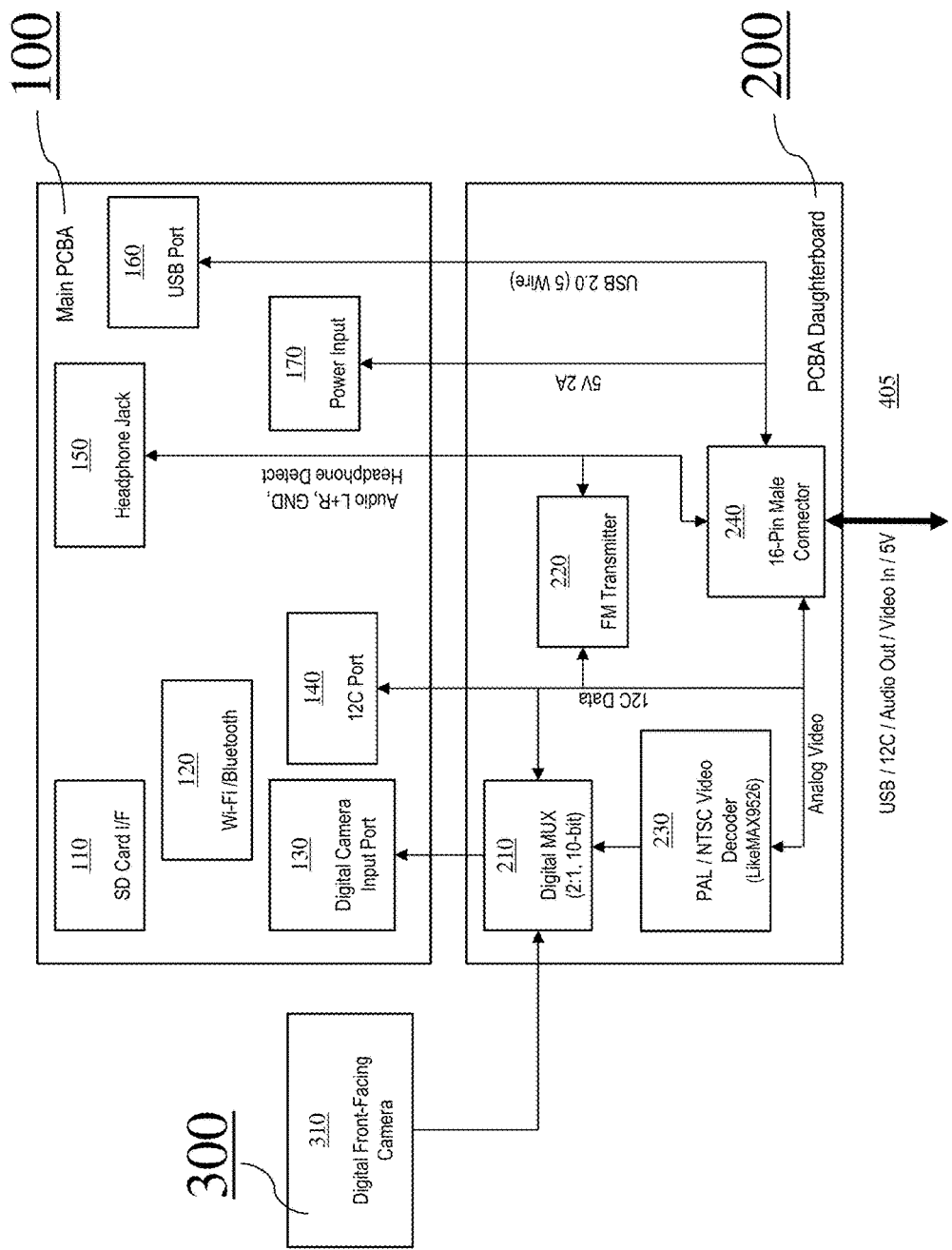
FIGS. 1C and 1D depict a block diagram illustrating a system configuration according to certain embodiments of the present invention.
Figure 1D:
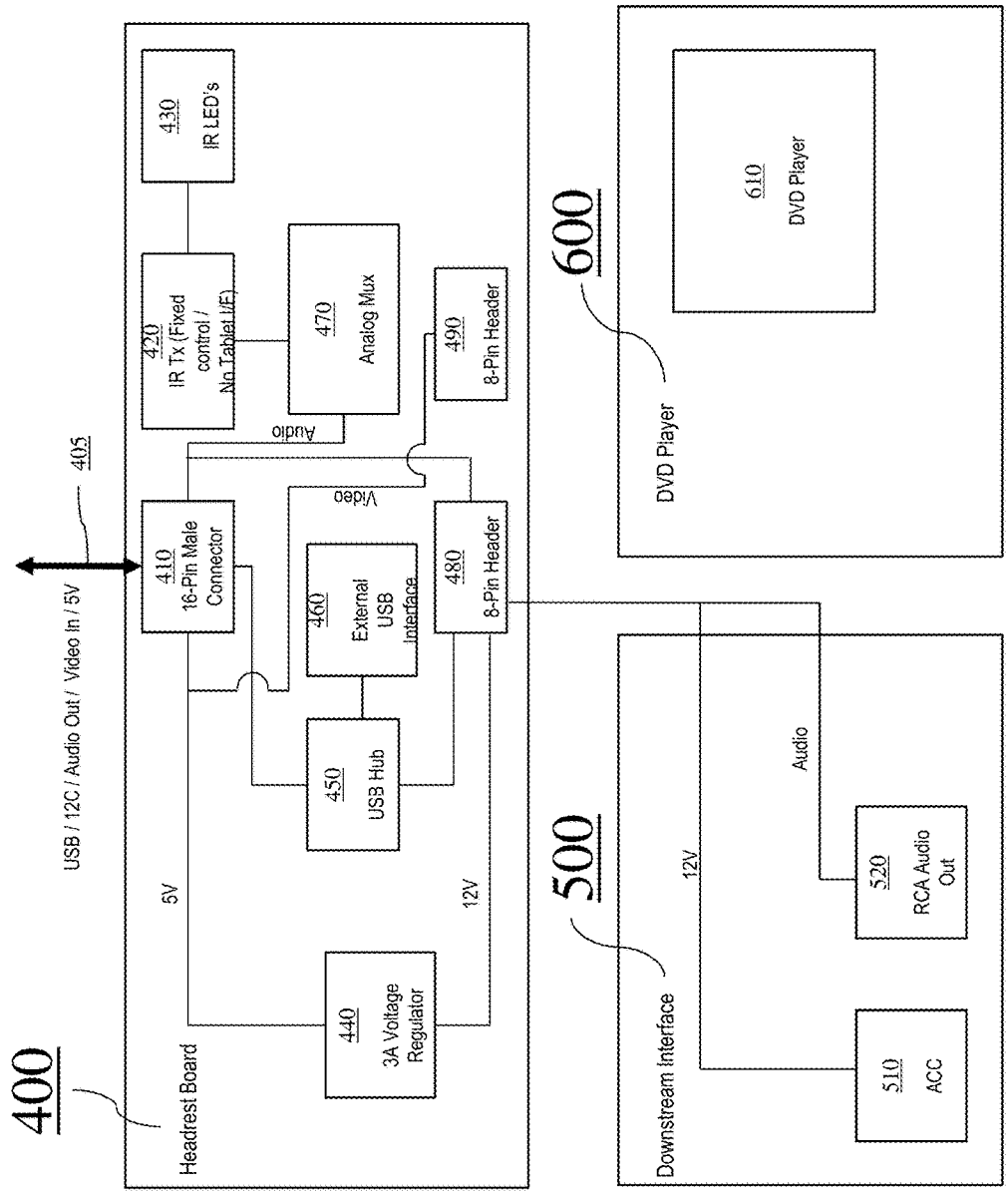

FIGS. 1C and 1D depict a block diagram illustrating a system configuration according to certain embodiments of the present invention. Specifically, FIGS. 1C-1D depict an exemplary block diagram of printed-circuit boards 100, 200, 400, 500 and 600 interconnected within a portable tablet computer that is part of the headrest mounted vehicle entertainment system according to certain embodiments of the present invention. The numbering scheme with respect to FIGS. 1C and 1D is specific to those two figures, which should be treated as a single figure that continues into two drawing sheets, connected by 405.

Referring to FIG. 1C, printed-circuit board 100 is the Main PCBA (Printed Circuit Board Assembly). The Main PCBA includes flash memory card SD Card interface 110, Wi-Fi/Bluetooth module 120, Digital Camera Input Port module 130, I2C Port module 140, headphone jack module 150, USB port module 160, and power input module 170.

PCBA Daughter Circuit Board 200 includes a 10-Bit 2:1 MUX Digital Bus module 210, FM Transmitter 220, PAL/NTSC video decoder module 230, and 16-Pin Male Connector 240.

The 10-Bit 2:1 MUX Digital Bus module 210 is connected to digital camera input port module 130, and interfaces with I2C Port module 140, FM Transmitter 220, PAL/NTSC video decoder module 230, and 16-Pin Male Connector 240.

Digital front-facing (i.e., toward a viewer/user and toward the rear of the vehicle) camera 300 is connected to Digital MUX module 210 and is connected to the digital camera input port module 130.

Headphone jack module 150 is connected with the FM transmitter module 220, and with the 16-pin male connector 240. Also, the 16-pin male connector module 240 is connected with the main PCBA power input module 170, and with the USB port 160.

Referring to FIG. 1D, Headrest Circuit Board 400 includes 16-Pin male connector 410, infrared (IR) transmitter fixed control tablet interface (UF) module 420, infrared (IR) LED module 430, 3-ampere voltage regulator module 440, USB hub module 450, external USB interface 460, analog mux (multiplexer) module 470, 8-pin header connector 480, and 8-pin header connector 490.

The 3-ampere voltage regulator module 440 is interconnected with 16-pin male connector 410 and with 8-pin header connector 480. USB hub module 450 is interconnected with 16-pin male connector 410, with 8-pin header connector 480, and with external USB interface module 460. IR transmitter fixed control tablet interface (UF) module 420 is connected to the IR LED's module 430, the Analog MUX module 470 and the 16-Pin Male connector 410. The 8-Pin header connector 490 is interconnected with the 16-pin male connector 410.

The headrest circuit board 400 (FIG. 1D) is connected to the PCBA daughter board 200 (FIG. 1C) with 16-pin male connectors 240 and 410, mounted on each printed circuit board, for USB, I2C, audio out, video in, 5 volt power supply and ground. The connection of both boards is with a 16-Pin female connector cable 405.

The downstream interface circuit board 500 (FIG. 1D) includes ACC module 510 and RCA audio out 520. The downstream interface 500 is connected with the headrest circuit board through the 8-pin header connector 480.

The headrest circuit board has another 8-pin header connector module 490 to couple the audio and video signals of a DVD player 600.

Figure 2:
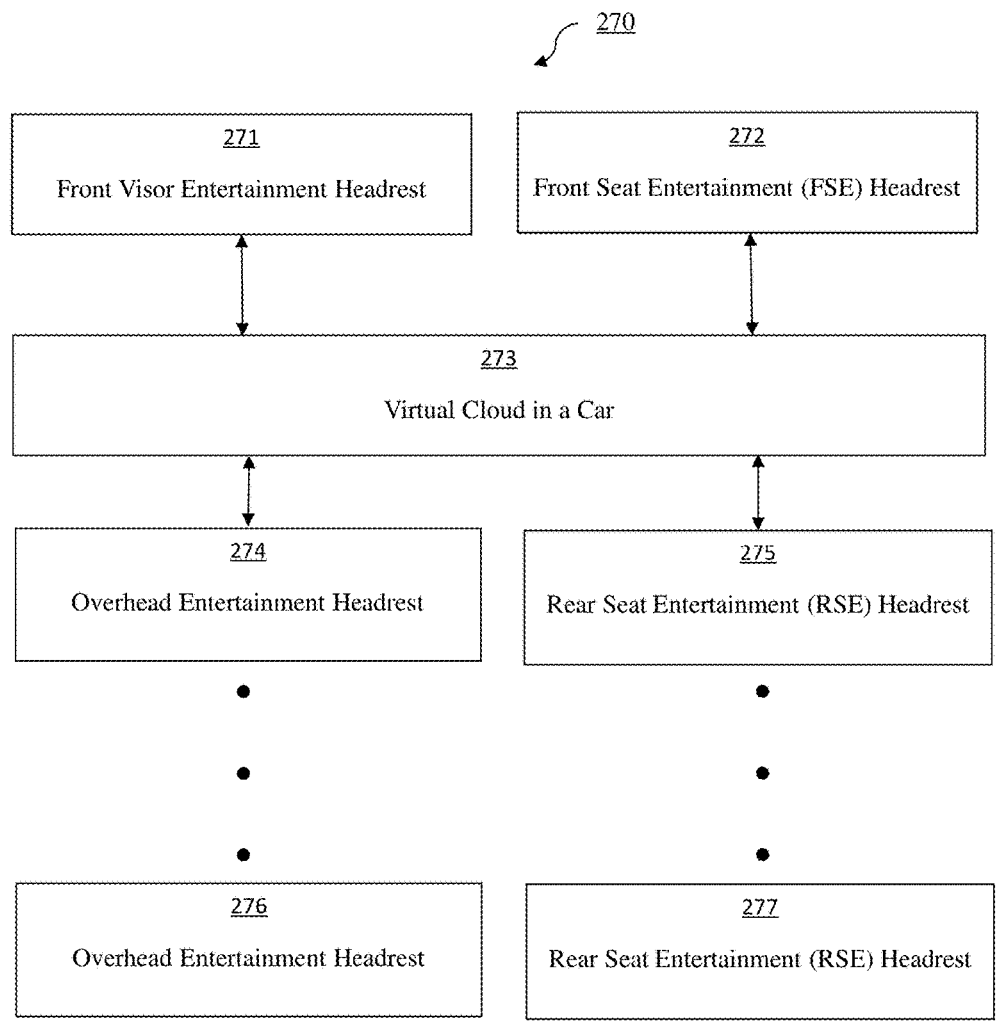
FIG. 2 depicts another block diagram illustrating a system configuration according to certain embodiments of the present invention.

FIG. 2 depicts another block diagram illustrating a system configuration 270 according to certain embodiments of the present invention.

As shown in FIG. 2, a virtual cloud in a car interface/system 273 is coupled to various components are shown. These may include a front visor entertainment headrest subsystem 271, front seat entertainment subsystem 272, one or more overhead entertainment headrest subsystems 274-276, and one or more rear seat entertainment headrest subsystems 275-277. In certain embodiments, the "virtual cloud in the car" interface/system enables various vehicle occupants to share a display with other occupants, and to collaborate on a document or play a game together, for example.

Figure 3A:
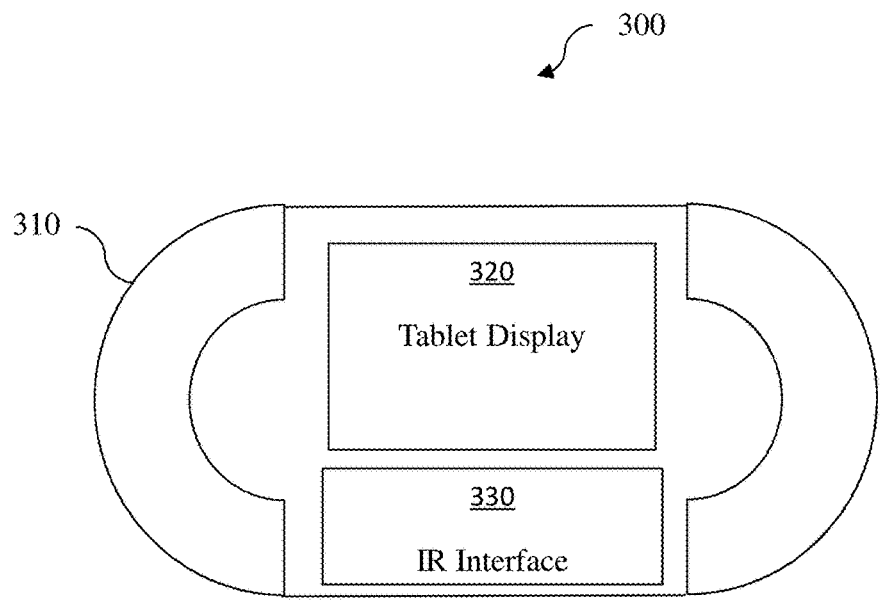
FIGS. 3A and 3B depict other block diagrams illustrating system configurations involving InfraRed (IR) interfaces according to certain embodiments of the present invention.
Figure 3B:
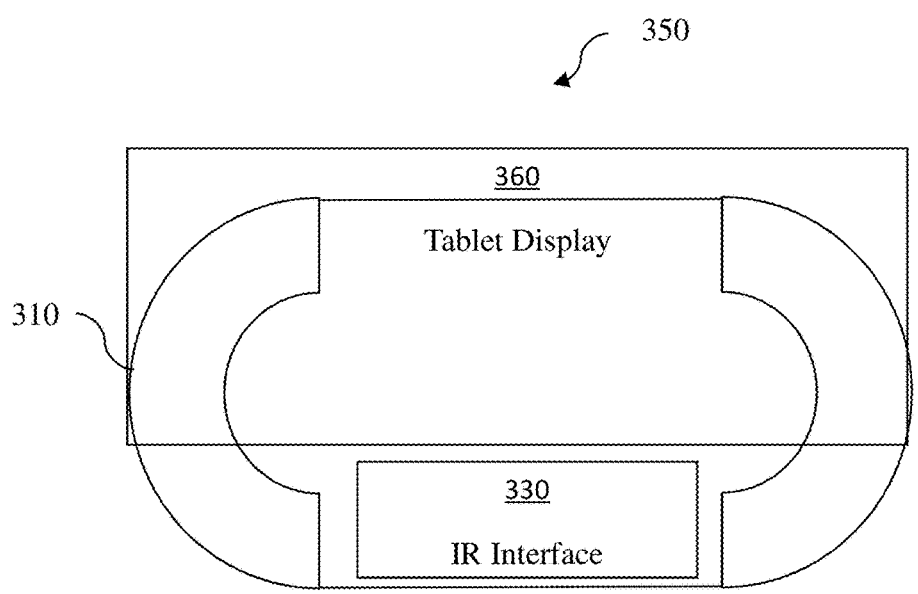

FIGS. 3A and 3B depict other block diagrams illustrating system configurations involving InfraRed (IR) interfaces according to certain embodiments of the present invention.

FIG. 3A depicts an exemplary headrest-mounted entertainment system comprising headrest 310, tablet computer/display device 320, which may be incorporated within headrest 310, and an infrared interface 330 for communicating audio signals to a user's head phones.

FIG. 3B depicts another exemplary headrest entertainment system comprising headrest 310, tablet computer/display device 360, which may be larger than headrest 310 may be able to accommodate, and infrared interface 330.

In certain configurations, a hinged tablet computer carrier includes guide rails into which a portable tablet computer may slide while in an open position, and which can hinge into a closed or locked position that holds the tablet computer in place, positions it for viewing, and effects mechanical and electrical coupling of the tablet computer with other components of the in-vehicle entertainment system. Exemplary placement could include headrest, seatback, overhead, or in-dash mounting. Hinging or sliding may be vertical or horizontal.

FIGS. 3C-3M depict various aspects of a tablet-mounting and interconnection system according to certain embodiments of the present invention.

FIG. 3C depicts a perspective view of a headrest entertainment system comprising headrest 310, posts 311 for mounting said headrest onto a vehicle seat back, and a tablet computing device 320 mounted within headrest 310.

FIG. 3D shows a view of an exemplary system, from the rear of a vehicle looking towards the front of the vehicle. Tablet computing device 320 is visible in FIG. 3D, and mounted within headrest 310.

FIG. 3E is a view from the side of a headrest entertainment subsystem, illustrating how, computing device 320 sits flush within headrest 310 and is essentially incorporated into the outline of the headrest.

FIG. 3F depicts another perspective view of a vehicle entertainment system mounted within headrest 310, shown in an open position. Tablet computing device 320 is inserted into its carrier 370, and ready to be locked into a closed position.

FIG. 3G is another view of what is shown in FIG. 3F, this time from the side, and illustrating how tablet computing device 320 may be locked into position once it has been mounted into carrier 370.

FIG. 3H depicts how tablet computing device 320 slides into carrier 370 in one embodiment, in this case from the top. Carrier 370 is hinged at the bottom and closes by rotating about its hinge or hinges.

FIG. 3I depicts the same view, this time from the side, and shows how tablet computing device 320 may be slid or otherwise inserted into its carrier 370, in this example from the top. Other arrangements are possible, depending on the needs of each particular implementation. For example, hinging may be implemented on the left or right side instead of from the bottom, and carrier 370 may thus swing horizontally instead of vertically to allow tablet computing device 320 to be slid horizontally from the right or left side.

Figure 3J:
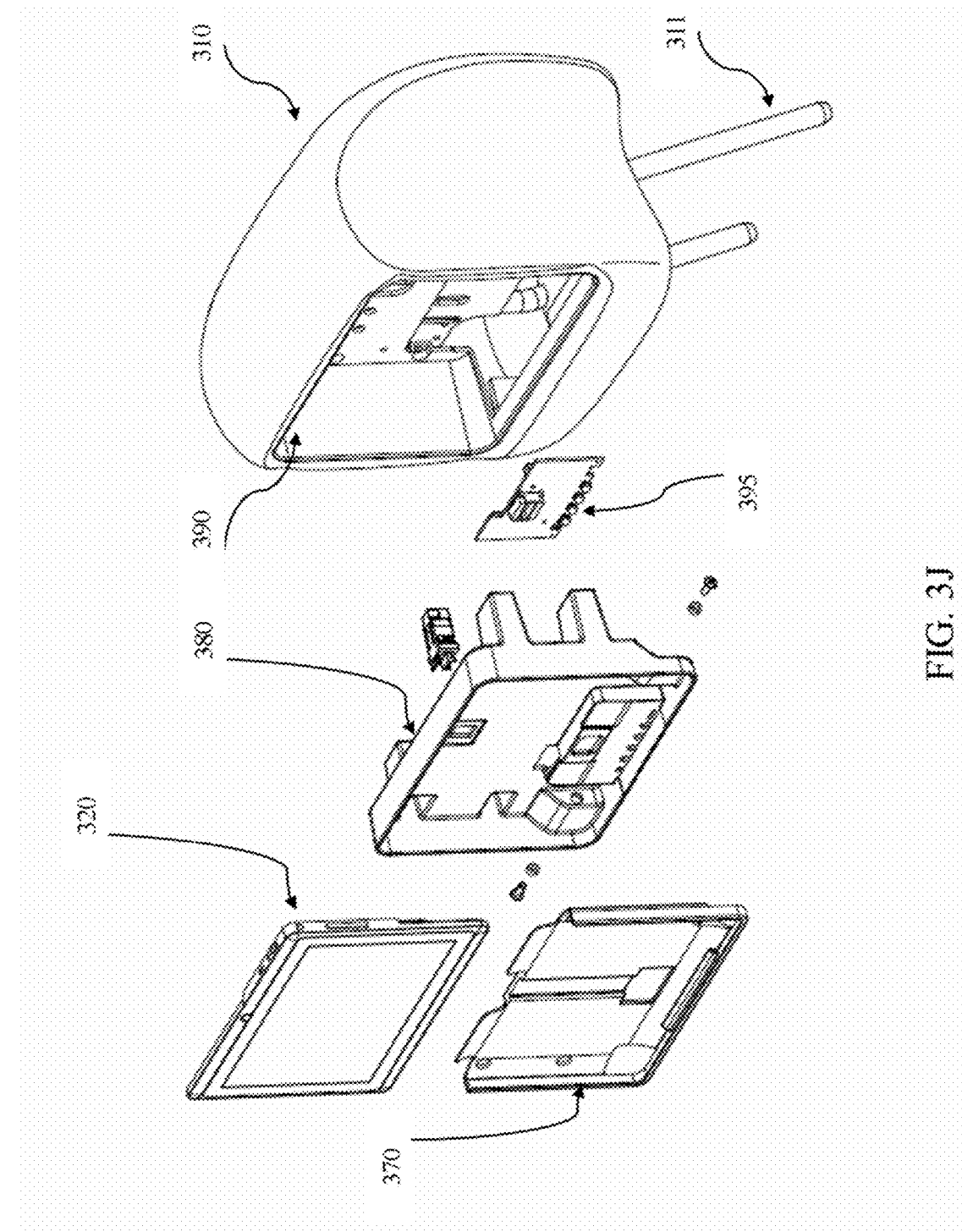

FIG. 3J depicts additional components used in a mounting system for a tablet computing device 320 into an in-vehicle headrest-mounted entertainment system. Receptacle 390 is mounted onto and within headrest 310, as shown in the figure. Tablet computing device 320 slides into carrier 370 from the top, along the guide rails as of carrier 370 as shown in the figure. This is the same as the arrangement that has been previously shown in earlier figures (such as FIGS. 3H and 3I). The assembly comprising tablet computing device 320 and carrier 370 are mounted to interface device 380, for example via the hinged arrangement that has been described earlier. A second interface member 395 is shown in the example of FIG. 3J which is used for effecting electrical and/or mechanical connections between tablet computing device 320 and other components of the system.

Figure 3K:
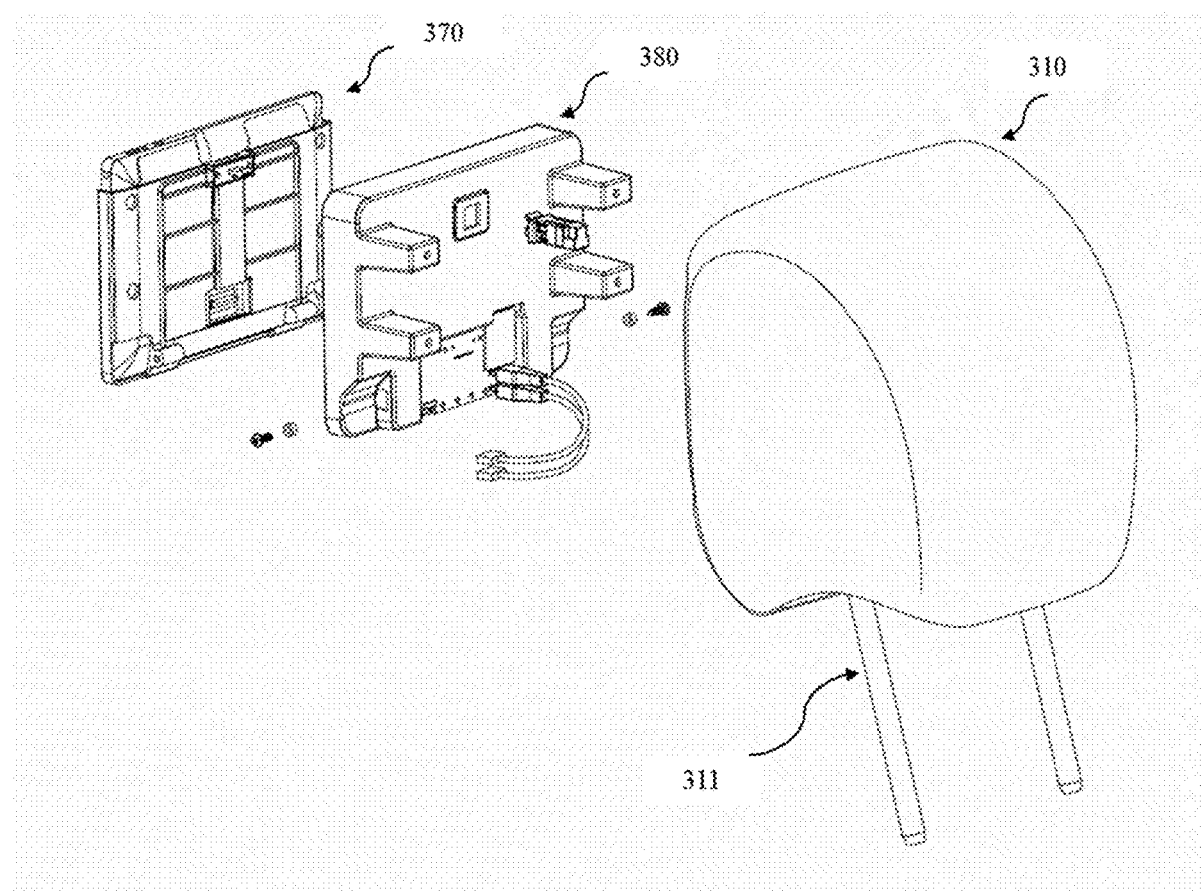

FIG. 3K is another view of the system that had been shown in FIG. 3J, this time looking at an angle from the front of the vehicle.

FIG. 3L shows carrier member 370 in an open position an mounted to headrest 310. Section A-A is also shown in FIG. 3L, and a cross section along Section A-A is shown in figure three M, depicting additional assembly details. As shown in FIG. 3M, mail-male latch 390 may be used in certain embodiments to engage carrier number 370 to its interface and receptacle members 380/390. Push-push latch 397 may be used to cause carrier member 370 to move into the open position once the carrier has been locked into position and a user wishes to remove tablet computing device 320.

Figure 4:
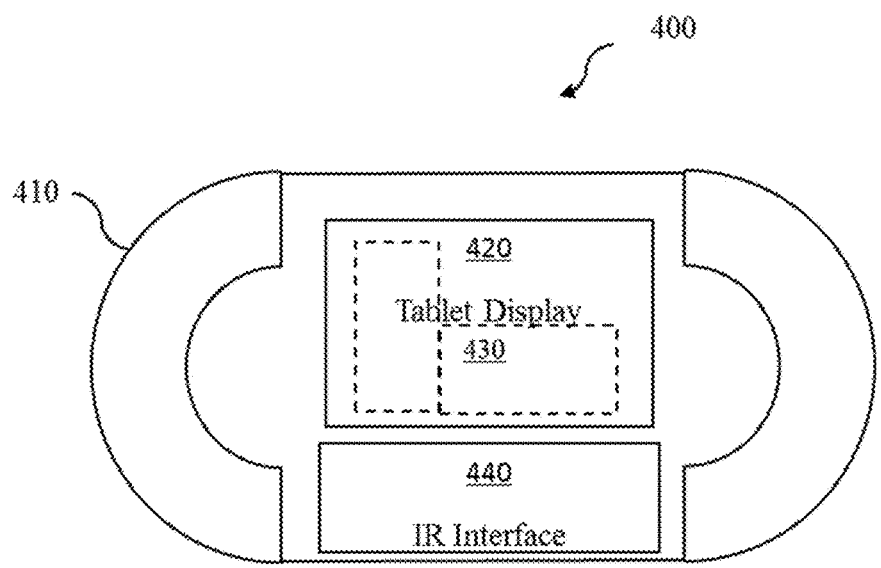
FIG. 4 depicts other block diagrams illustrating system configurations involving IR interfaces according to certain embodiments of the present invention.

FIG. 4 depicts other block diagrams illustrating system configurations involving IR interfaces according to certain embodiments of the present invention. FIG. 4 depicts another embodiment of the headrest mounted entertainment system 400, comprising headrest 410, tablet computing display device 420 incorporating one or more interface daughter cards and/or other interface boards as will be described later, and infrared interface 440.

Figure 5:
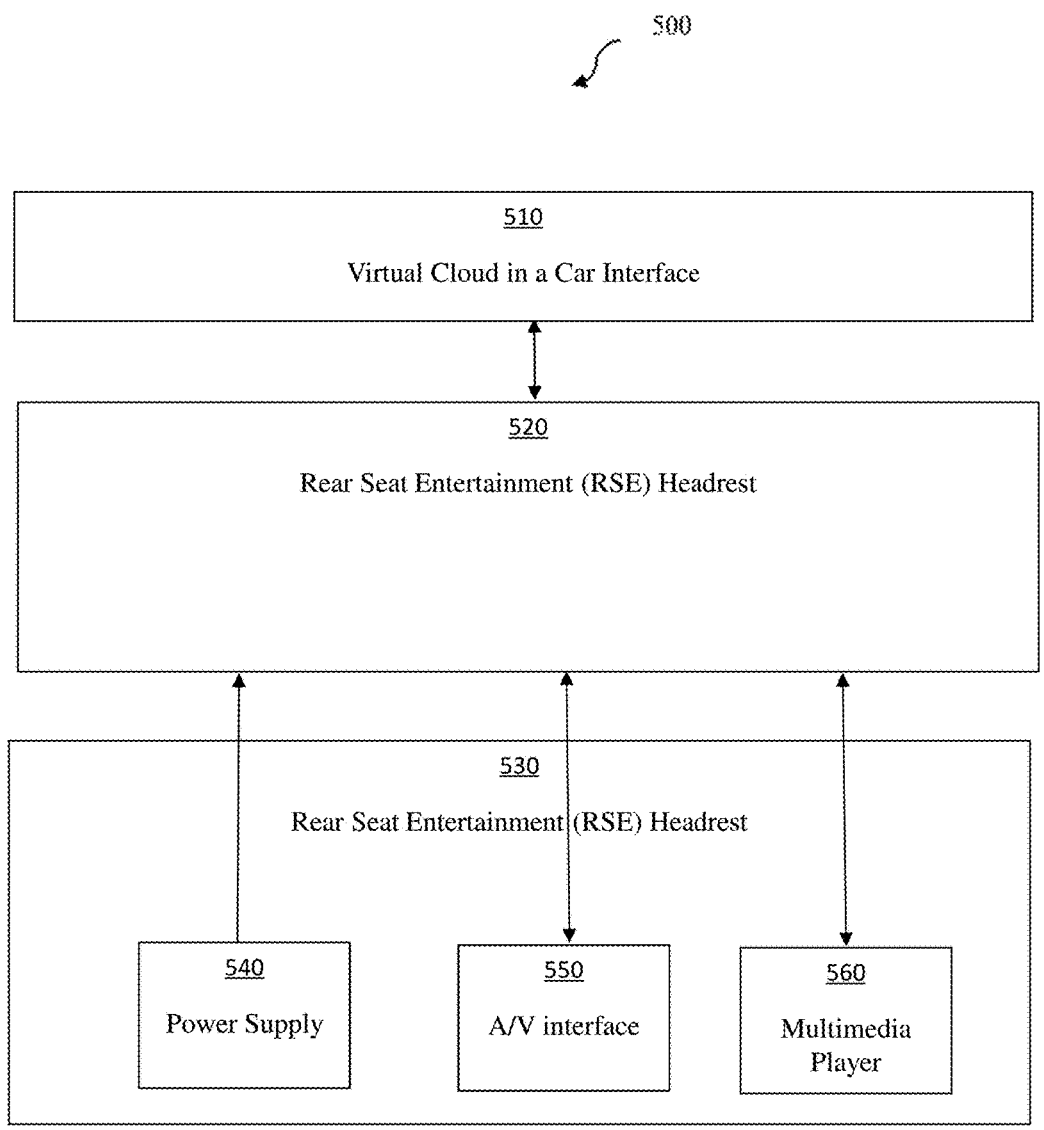
FIG. 5 depicts another block diagram illustrating a system configuration according to certain embodiments of the present invention.

FIG. 5 depicts another block diagram illustrating a system configuration according to certain embodiments of the present invention. FIG. 5 depicts a block diagram showing a virtual cloud in a car interface 510 coupled to a rear seat entertainment headrest system 520. The rear seat entertainment headrest system 520 in turn is coupled to rear seat entertainment headrest system 530 and various connections between items 530 and 520 are shown. Specifically, as shown in FIG. 5, power supply 540 is coupled to item 520, as well as an audiovisual (A/V) interface 550, and multimedia player 560. In a physical configuration corresponding to FIG. 5 in certain embodiments, item 530 may be permanently incorporated within a headrest assembly, whereas item 520 may comprise a tablet computing device. Item 520 may interface with or be coupled to the virtual cloud in a car interface 510 via any suitable wired or wireless interface.

Figure 6:
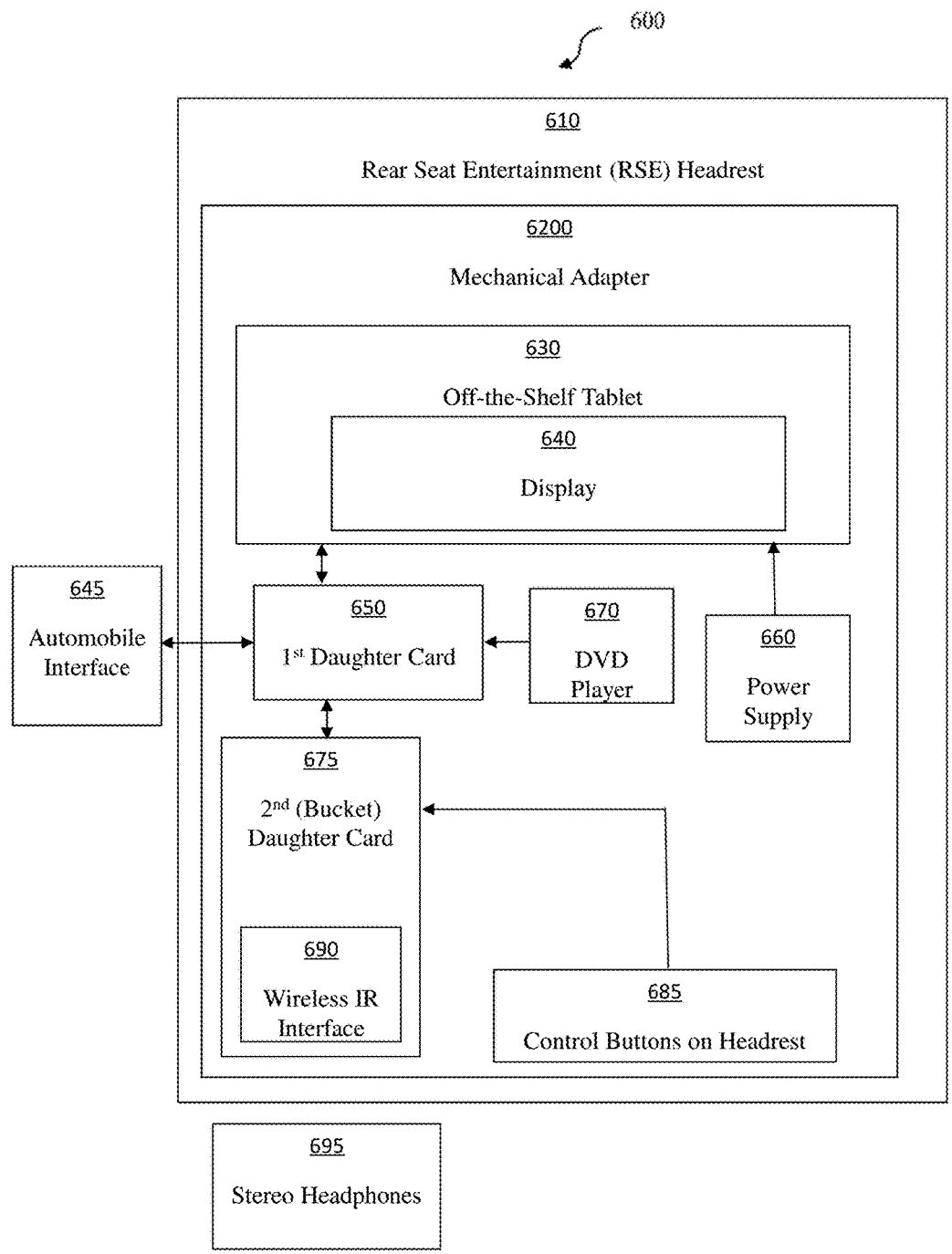
FIG. 6 depicts another block diagram illustrating a system configuration according to certain embodiments of the present invention.

FIG. 6 depicts another block diagram illustrating a system configuration according to certain embodiments of the present invention. Referring to FIG. 6, headrest-mounted rear seat entertainment system 600 is shown, which consists of rear seat entertainment headrest subsystem 610, and mechanical adapter 6200. Mechanical adaptor 6220 includes display 640 and commercially available tablet computer electronics 630. A first daughter card 650 is coupled via a bidirectional bus to the combination of display 640 and tablet computer 630. A DVD player (not shown) or other similar multimedia components are coupled to first daughter card 650 via automobile interface 645. A second daughter card 675 is also coupled to the first daughter card 650 and includes a wireless infrared interface 690. Control buttons on the headrest 685 communicate to the second daughter card 675 via an appropriate set of interconnections. Stereo headphones 695 may be coupled to the system via wireless IR interface 690.

Figure 7:
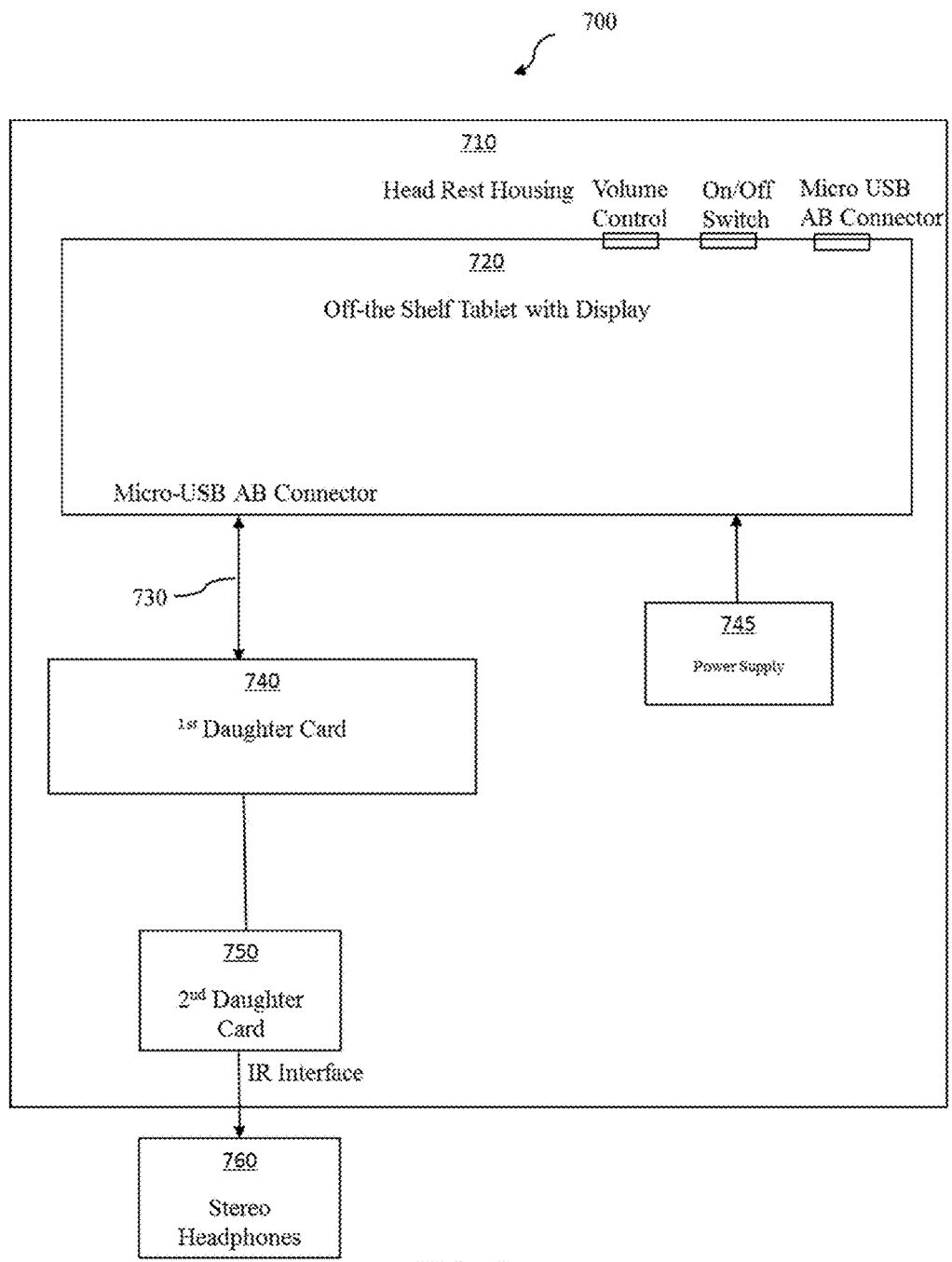
FIG. 7 depicts another block diagram illustrating a system configuration according to certain embodiments of the present invention.

FIG. 7 depicts another block diagram illustrating a system configuration according to aspects of the present invention. Referring to FIG. 7, there is shown a headrest mounting assembly 700 tons pricing of headrest housing 710, commercially available off-the-shelf tablet with display 720, daughter cards 740 coupled two display 720 via bidirectional interface 730, second daughter card 750 coupled to the first daughter cards 740, and stereo headphones 760 coupled to the second daughter card 750 via infrared IR interface. Power supply 745 is coupled to commercially available off-the-shelf tablet display computer 720, and also includes a volume control, on/off switch, and a micro USB AB connector.

Figure 8:
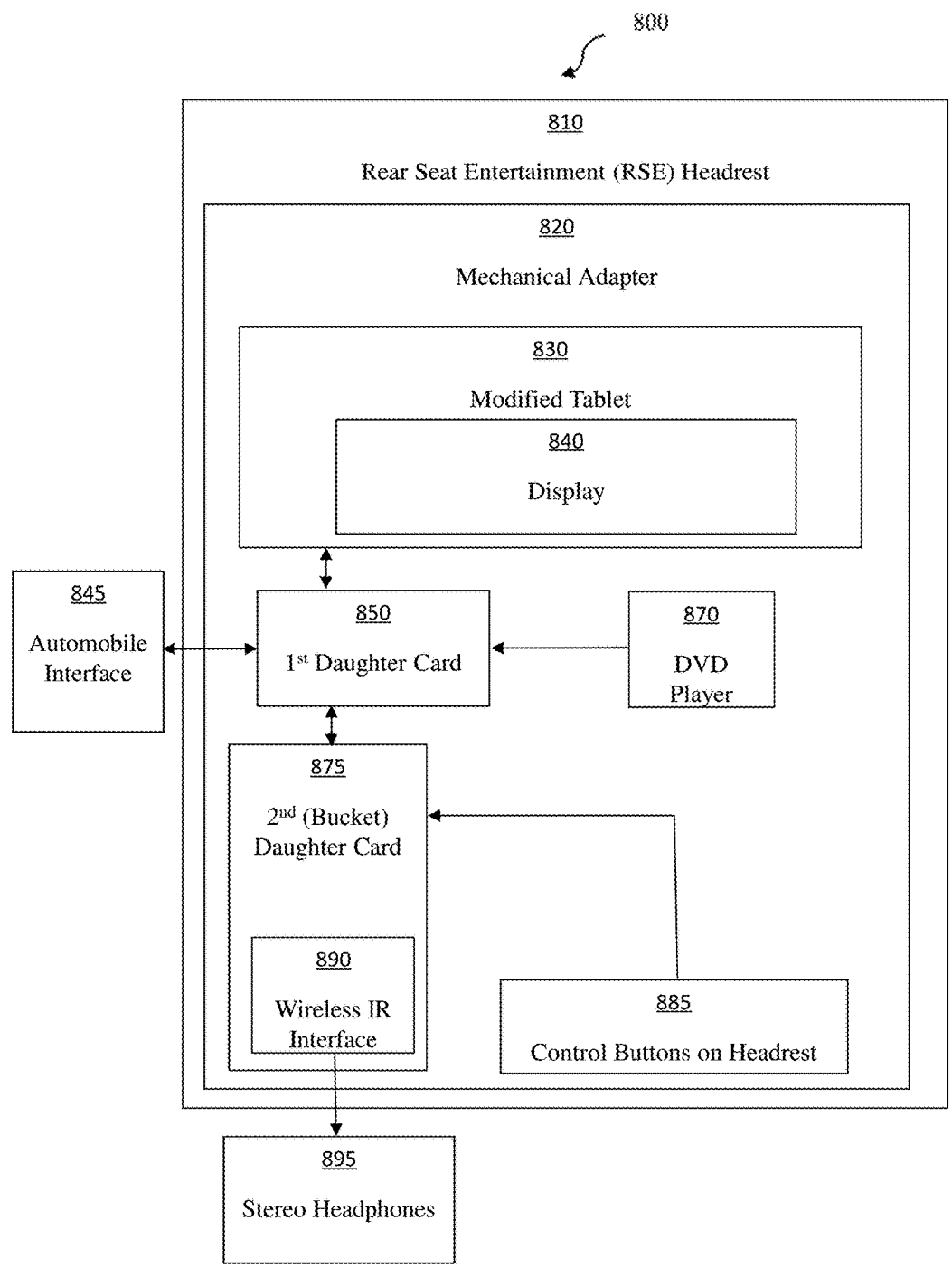
FIG. 8 depicts another block diagram illustrating a system configuration according to certain embodiments of the present invention.

FIG. 8 depicts another block diagram illustrating a system configuration according to certain embodiments of the present invention. Referring to FIG. 8, rear seat entertainment system 800 is shown, which consists of rear seat entertainment headrest subsystem 810, and mechanical adapter 820. Mechanical adaptor 820 includes display 840, coupled to modified tablet electronics 830 (as described in other sections of this document). A first daughter card 850 is coupled via a bidirectional bus to the combination of display 840 and modified tablet 830. DVD player 870 is also coupled to first daughter card 850 via automobile interface 845. A second daughter card 875 is also coupled to the first daughter card 850 and includes a wireless infrared interface 890. Control buttons on the headrest 885 communicate to the second daughter card 875 via an appropriate set of interconnections. Stereo headphones 895 may be coupled to the system via wireless IR interface 890.

Figure 9:
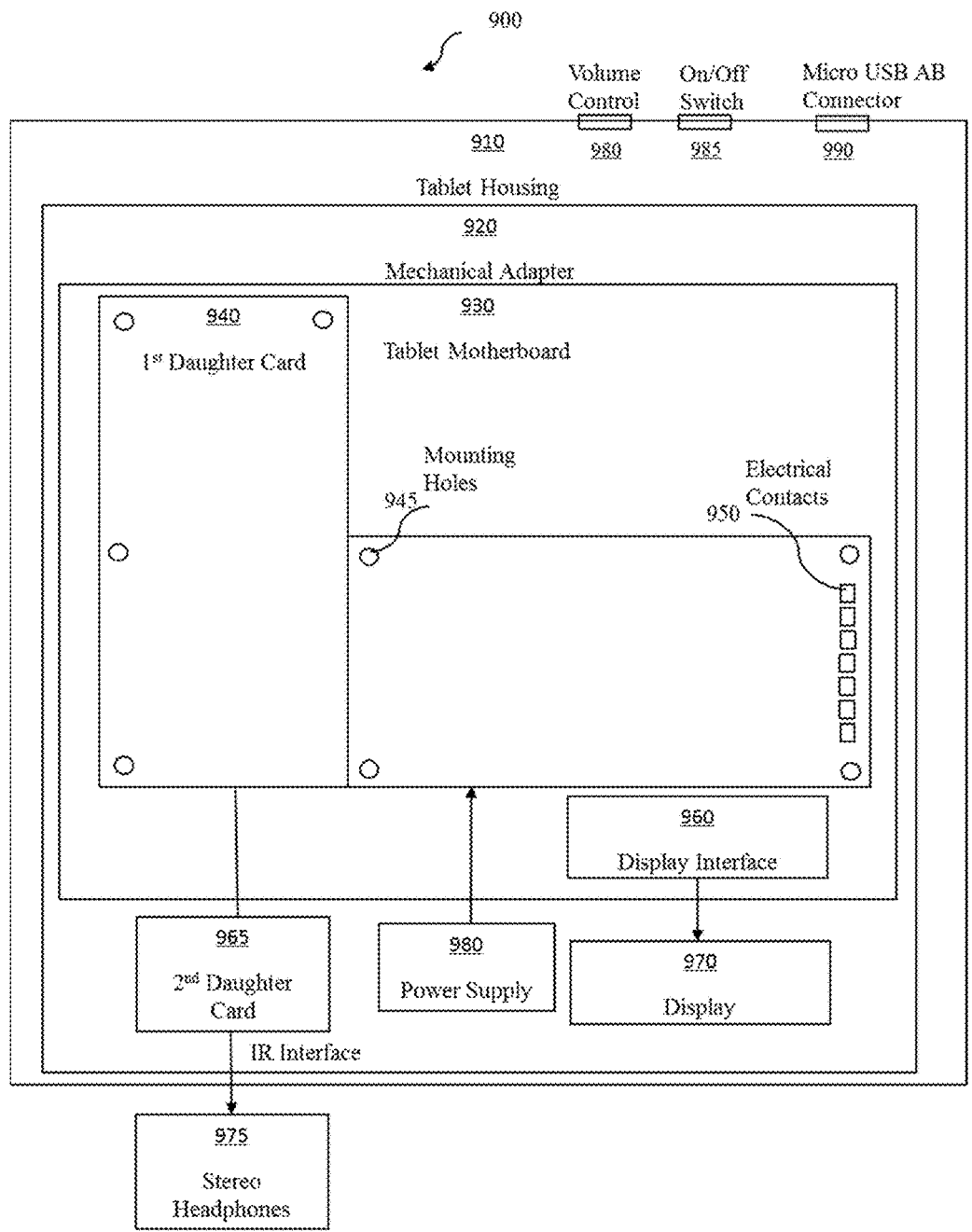
FIG. 9 depicts another block diagram illustrating a system configuration according to certain embodiments of the present invention.

FIG. 9 depicts another block diagram illustrating a system configuration according to certain embodiments of the present invention. Referring to FIG. 9, another embodiment of an in-vehicle headrest entertainment system 900 according to certain embodiments of the present invention is shown, comprising tablet housing 910. Housing 910 includes a mechanical adaptor 920, which further includes tablet motherboard 930, which itself includes a first daughter card 940, which includes a mounting holes 945 and electrical contacts 950. The first daughter card 940 communicates to a second daughter card 965 and receives power from power supply 980. Display 970 is coupled to display interface 960. Second daughter card 965 communicates with stereo headphones 975 via an infrared interface. Housing 910 also includes volume control 980, on/off switch 985, and micro USB AB connector 990.

Figure 10:
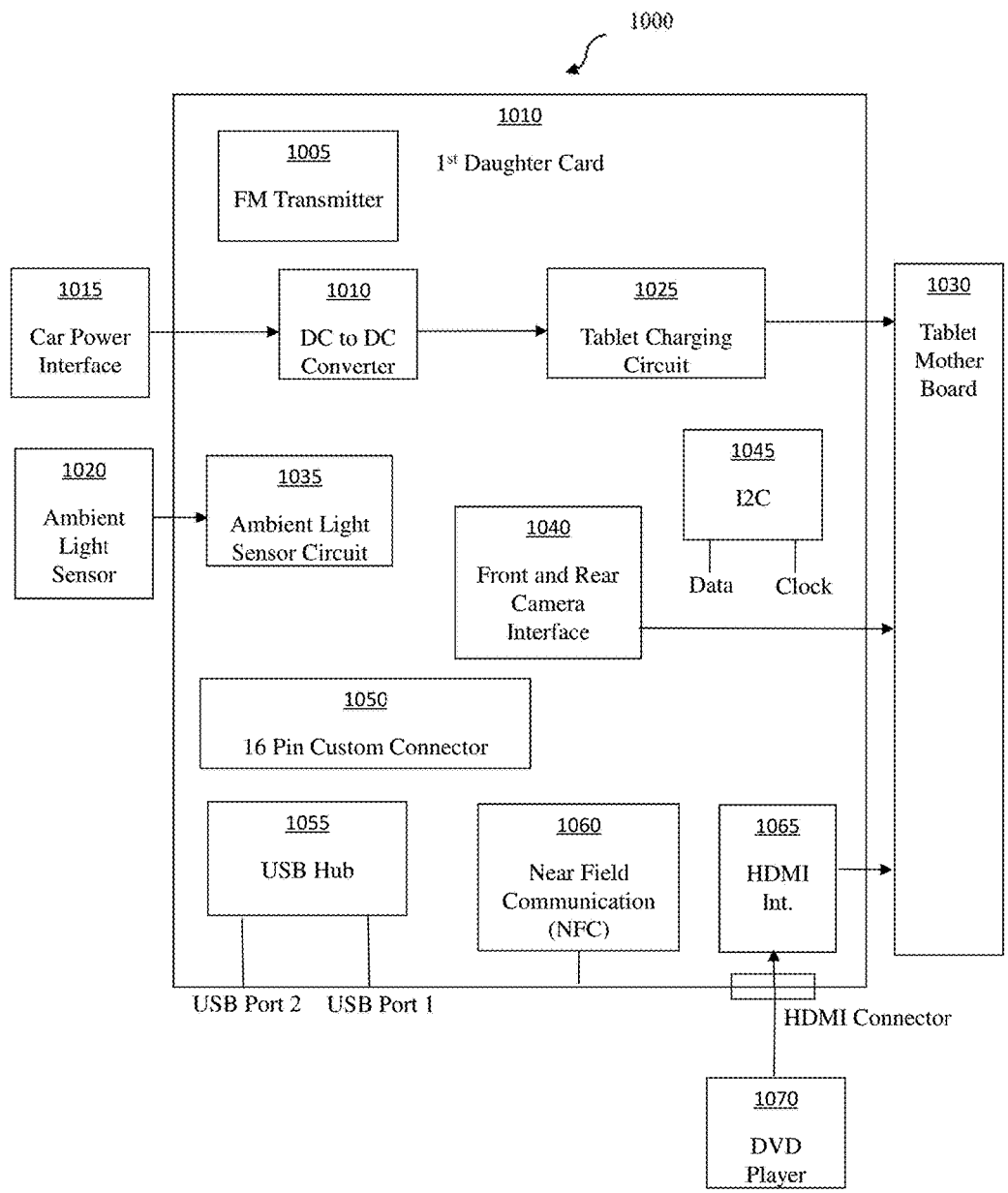
FIG. 10 depicts another block diagram illustrating a system configuration according to certain embodiments of the present invention.

FIG. 10 depicts another block diagram illustrating a system configuration according to certain embodiments of the present invention. Referring to FIG. 10, a first daughter card 1010 is shown, coupled to a tablet motherboard 1030. First daughter card 1010 also is coupled to a car power interface 1015, and ambient light sensor 1020, as well as a DVD player 1070, which is coupled to HDMI interface 1065 within first daughter card 1010 via a HDMI connector. First daughter card and 1010 also includes FM transmitter 1005, DC-DC converter 1010, which is coupled to car power interface 1015, and to tablet charging circuit 1025, which is also coupled to tablet motherboard 1030. Ambient light sensor 1020 interfaces with ambient light sensor circuit 1035 within first daughter card 1010. Front and rear camera interface 1040, shown as part of first daughter card 1010, is also coupled to a tablet motherboard 1030. First daughter card 1010 also receives data and clock signals via I2C ("I squared C") interface 1045. A 16-pin custom connector 1050 is also part of first daughter card 1010. Also shown as part of FIG. 10 is a USB Hub 1055, which is part of first daughter card 1010 and is used interface to USB Port 1 and USB Port 1. Near-field communication interface 1060 is also a part of first daughter card 1010 in the embodiment shown in FIG. 10.

Figure 11:
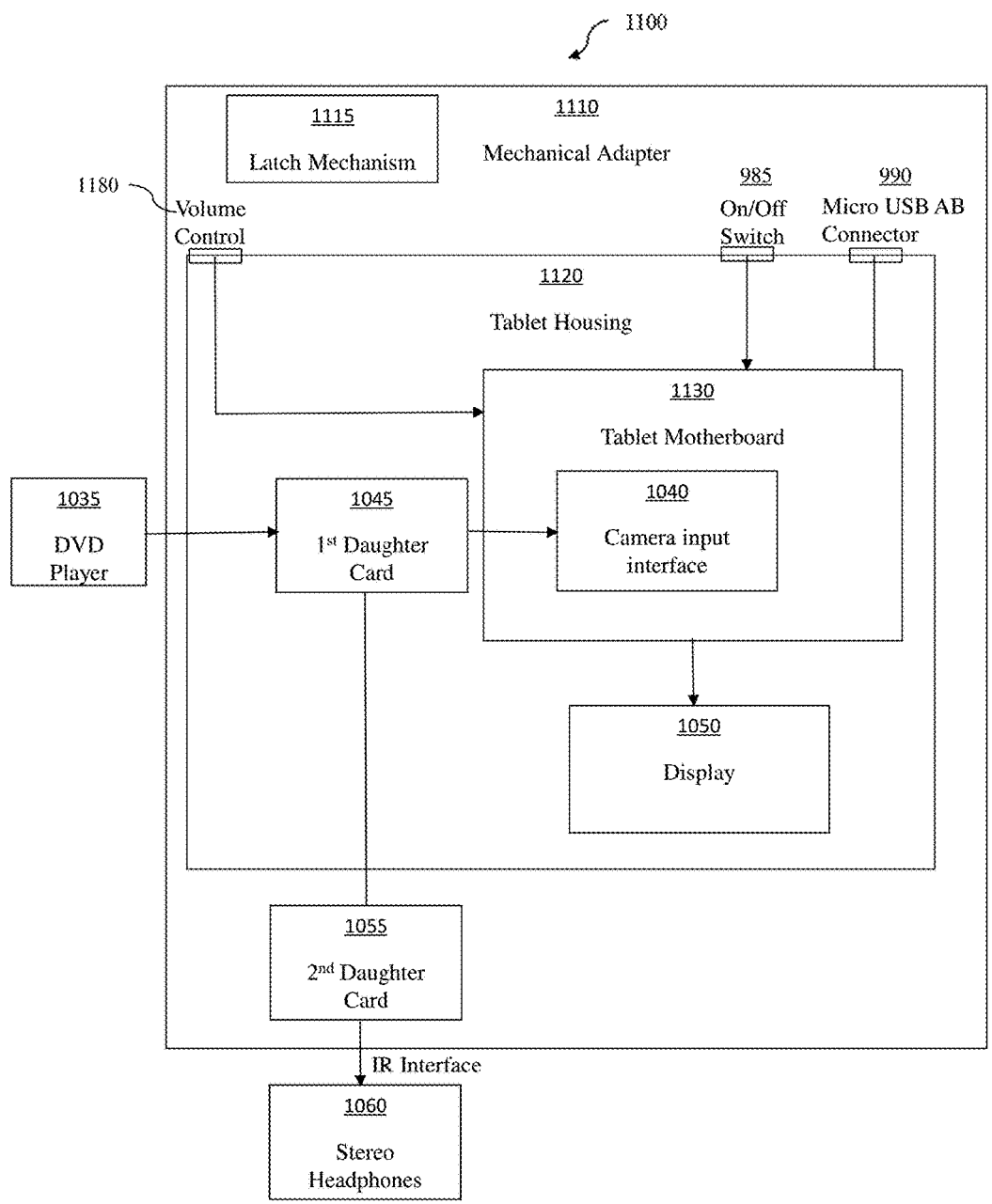
FIG. 11 depicts another block diagram illustrating a system configuration according to certain embodiments of the present invention.

FIG. 11 depicts another block diagram illustrating a system configuration according to certain embodiments of the present invention. Referring to FIG. 11, another embodiment of a vehicle mounted headrest system 1100 is shown, comprising mechanical adaptor 1110 coupled to DVD player 1035, as well as stereo headphones 1060, which are coupled to a second a daughter card 1055 via an infrared (IR) interface. A latch mechanism 1115 is part of mechanical adaptor 1110. Exemplary latch mechanisms were described earlier with reference to certain embodiments shown in FIGS. 3C-3M. Mechanical adaptor 1110 further comprises a tablet housing 1120, to the outside of which are mounted volume control switches 1180, on/off switch 985, and micro USB AB connector 990. Tablet motherboard 1130 contains a camera input interface 1040, and is coupled to first daughter card 1045. First daughter card 1045 is coupled to an external DVD player 1035, as well as to a second daughter card 1055 with a mechanical adaptor 1110. A display 1050 is coupled to the tablet motherboard 1130.

Figure 12:
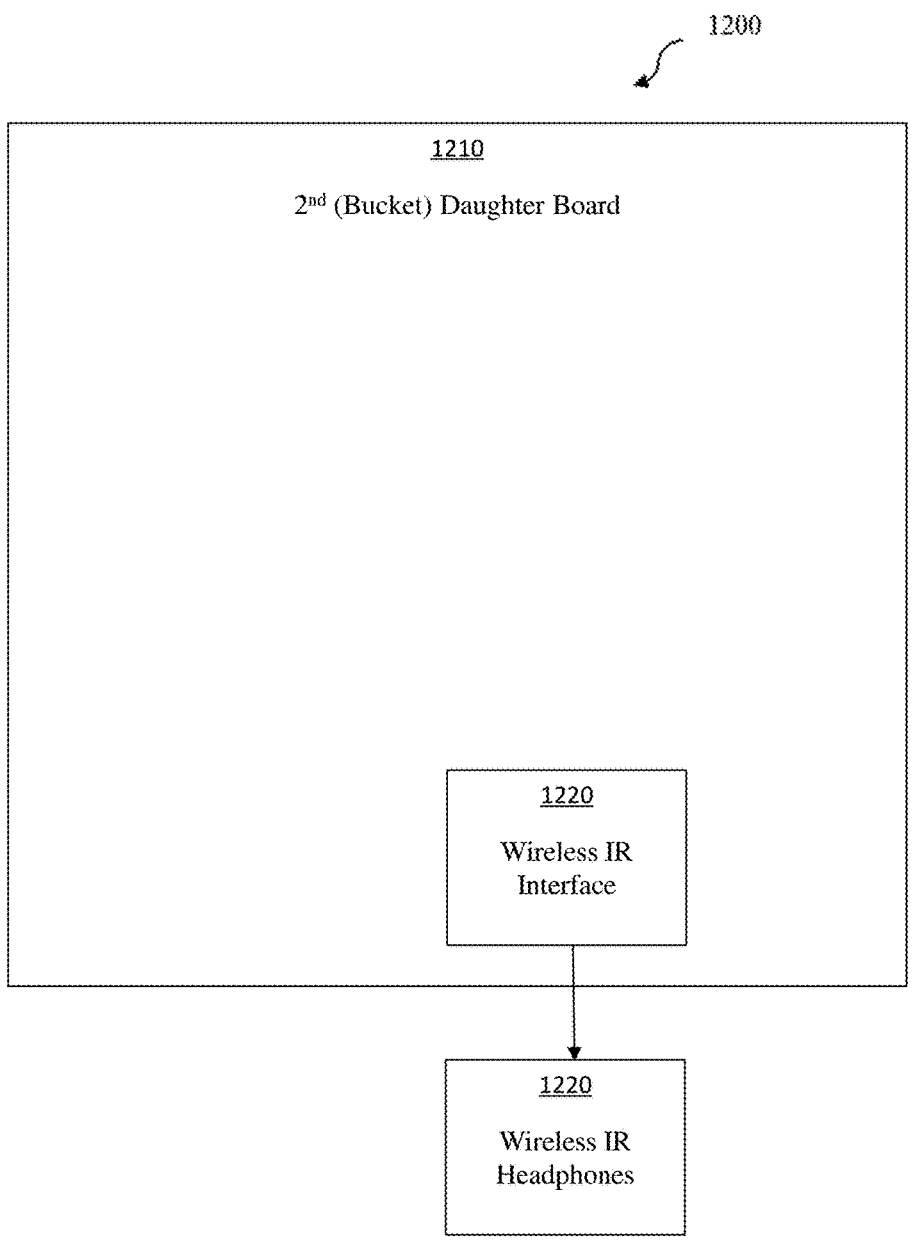
FIG. 12 depicts another block diagram illustrating a system configuration according to certain embodiments of the present invention.

FIG. 12 depicts another block diagram illustrating a system configuration according to certain embodiments of the present invention. Referring to FIG. 12, another embodiment of a headrest mounted entertainment system according to certain embodiments is shown, comprising a second daughter board known as a bucket, 1210 which includes a wireless infrared interface 1220. Wireless infrared headphones 1220 may be coupled to the system via wireless interface 1220.

Figure 13:
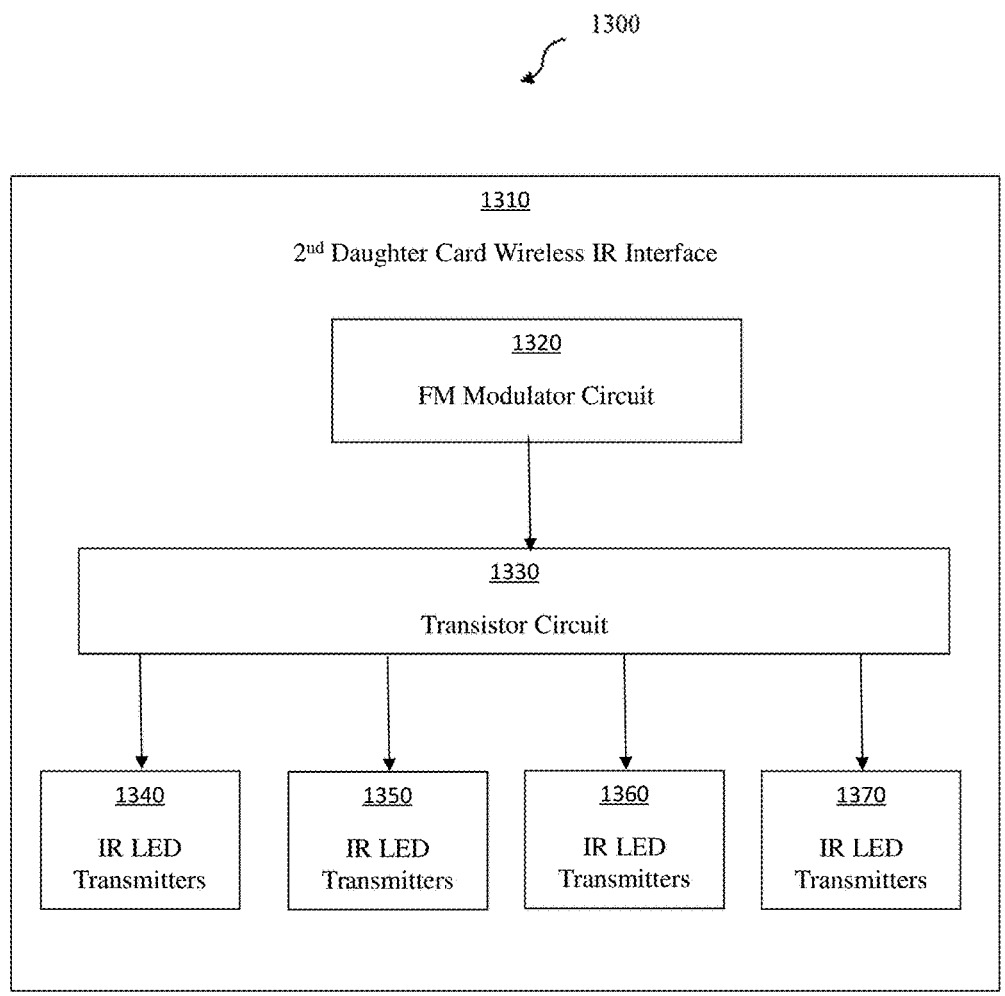
FIG. 13 depicts another block diagram illustrating a system configuration according to certain embodiments of the present invention.

FIG. 13 depicts another block diagram illustrating a system configuration according to certain embodiments of the present invention. Referring to FIG. 13, another embodiment of a vehicle entertainment system 1300 is shown, comprising second daughter card wireless infrared interface 1310. This interface contains FM modulator circuit 1320, which is coupled with transistor circuit 1330, which in turn is coupled to IR LED transmitters 1340, 1350, 1360, and 1370.

Figure 14A:
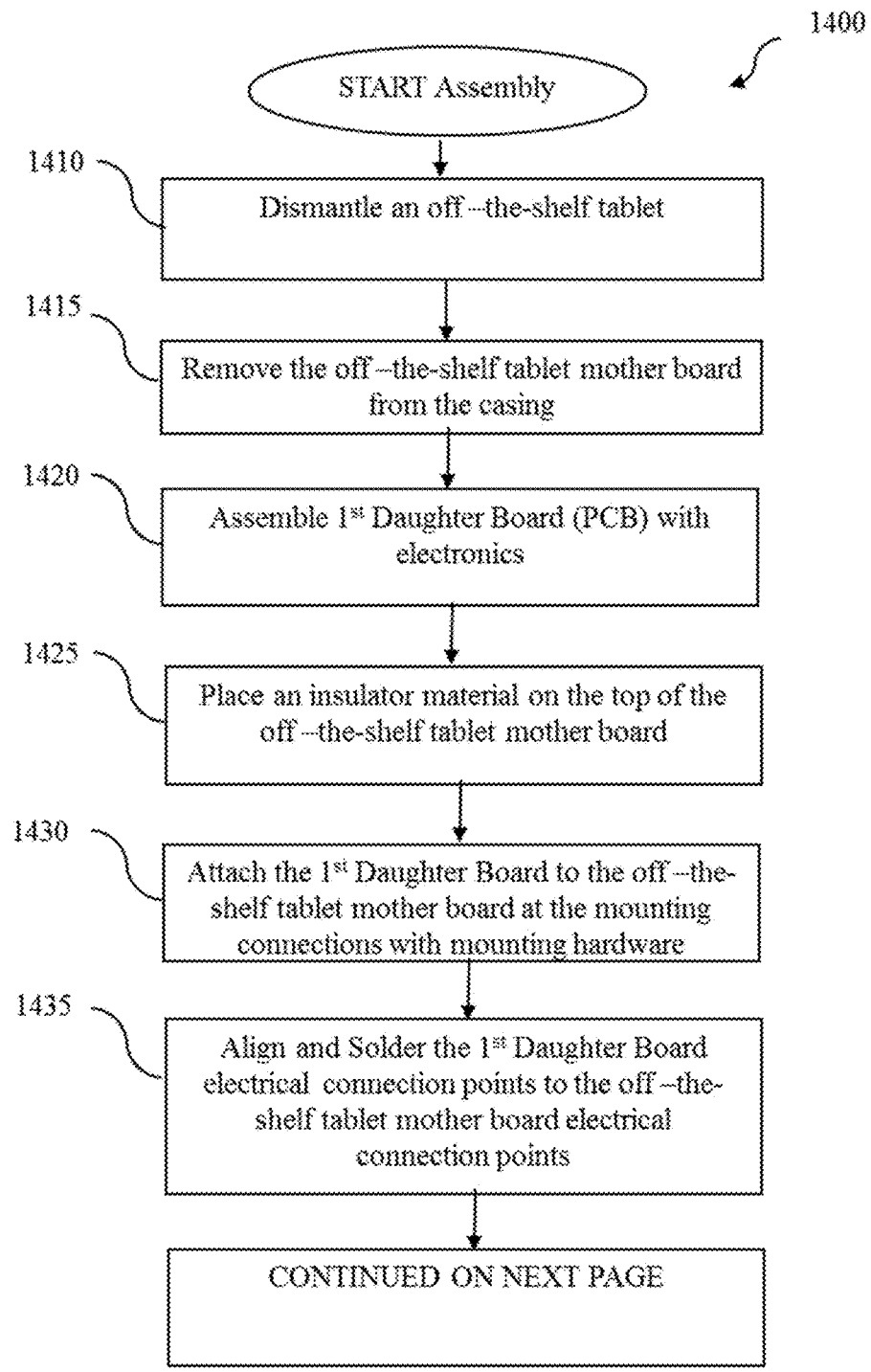
FIGS. 14A-14B depict a flow chart relating to tablet assembly/integration according to certain embodiments of the present invention.
Figure 14B:
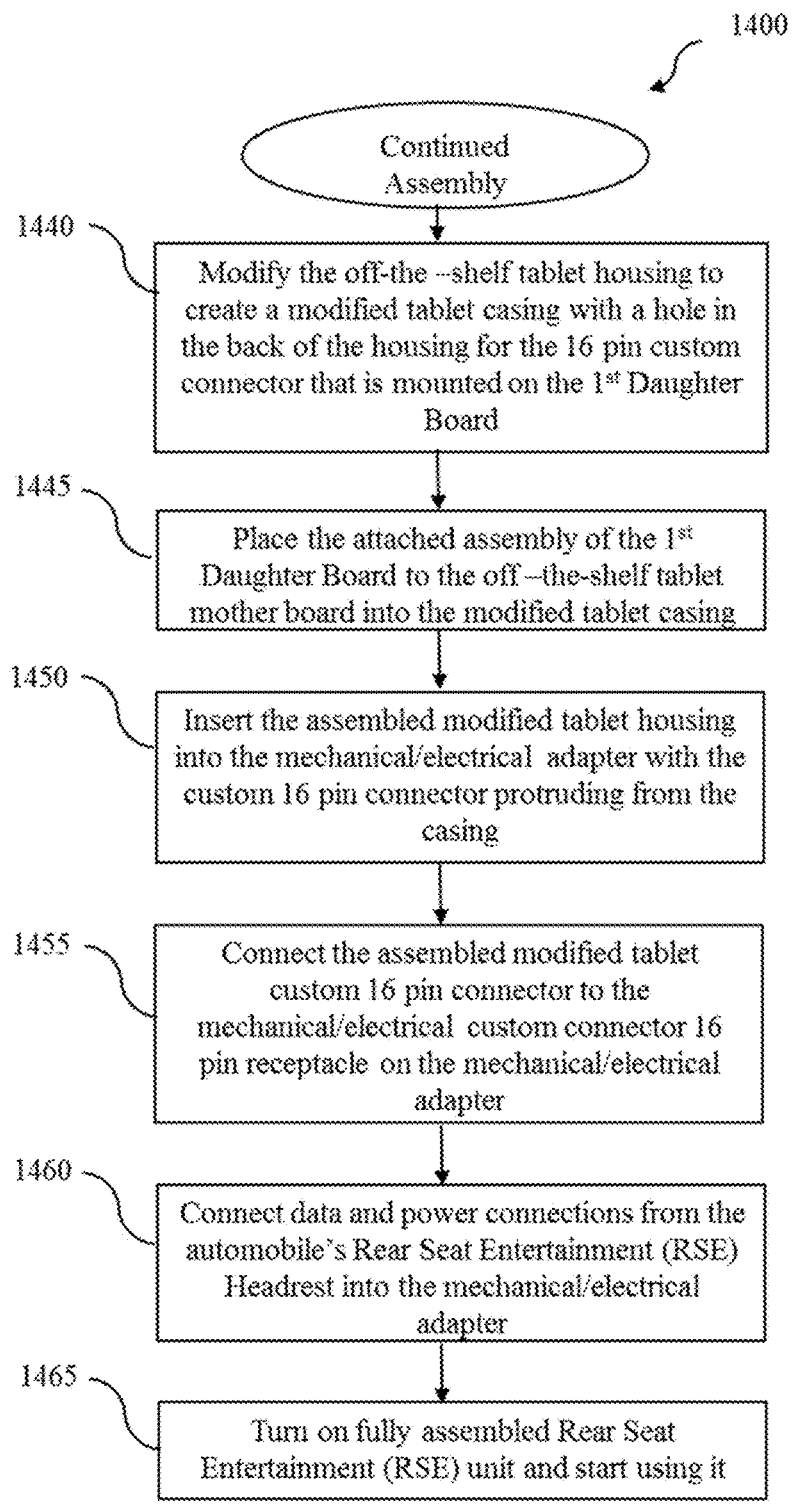

FIGS. 14A-14B depict a flow chart relating to tablet assembly/integration according to certain embodiments of the present invention. This process generally involves modifying an existing commercially-available tablet computer by adding a couple of circuit boards internally, and opening, at the back of the tablet computer, a hole to add an external connector for providing power and/or the appropriate digital and/or analog interfaces suitable for each particular implementation. The process shown in FIG. 14 starts at step 1410, at which a commercially available table computer is dismantled. At step 1415, the motherboard of this computer is removed from the casing. At step 1420, a first daughter board is assembled and provided. At step 1425, a thin sheet of insulator material is placed between the mother board and the first daughter board. At step 1430, the first daughter board is coupled to the motherboard at the mounting connections with mounting hardware. At step 1435 the first daughter board electrical connection points are aligned with and soldered to the corresponding mother board electrical connection points.

Continuing with FIG. 14B, the process continues at step 1440, during which the tablet computer housing is modified to create a modified casing with a hole in the back of the housing for a 16-pin custom connector that is mounted on the first daughter board. At step 1445, the attached assembly is placed on the first daughter board to the off the shelf, the motherboard into the modified, casing. At step 1450 the assembled modified tablet housing is inserted into the mechanical/electrical adapter with a custom 16-pin connector protruding from the casing. At step 1455, the assembled modified, tablet custom 16-pin connectors is connected to the mechanical/electrical custom connector 16-pin receptacle on the mechanical/electrical adapter.

At step 1460, the data and power connections from the automobile's rear seat entertainment headrest is connected into the mechanical/electrical adopter. At step 1465, the fully assembled rear seat entertainment unit is turned on and may be used.

Figure 15:
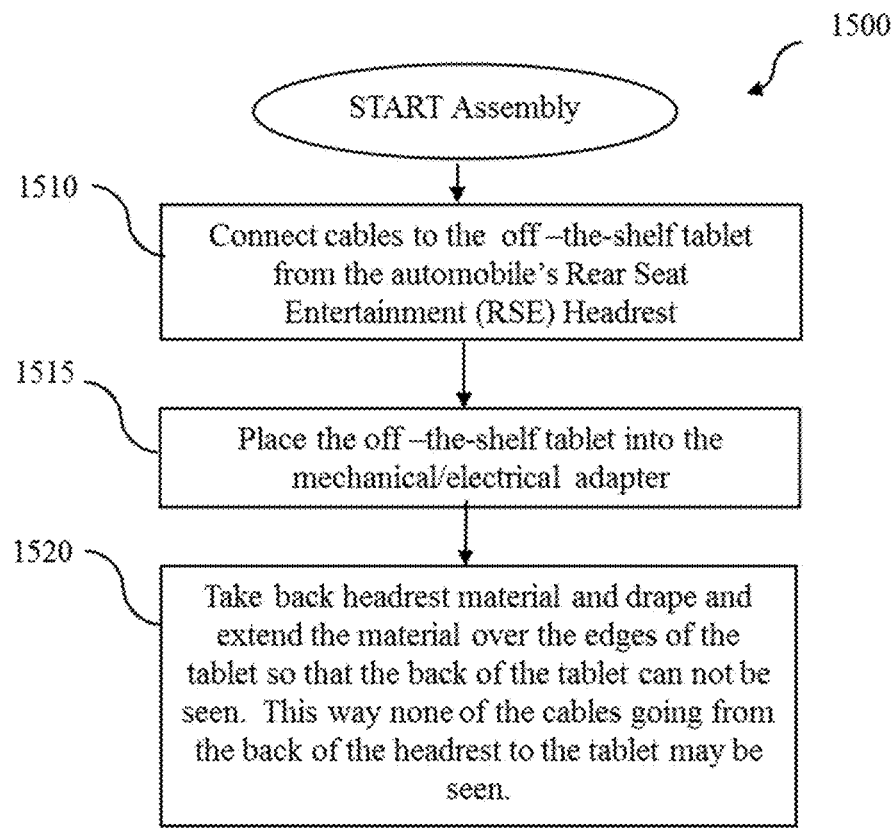
FIG. 15 depicts another flow chart relating to tablet assembly/integration according to certain embodiments of the present invention.

FIG. 15 depicts another flow chart relating to tablet assembly/integration according to certain embodiments of the present invention.

At step 1510, cables are connected to a commercially available table computer from the automobile's rear seat entertainment headrest subsystem. At step 1515, the tablet computer coupled to a mechanical/electrical adapter. At step 1520, the headrest material is taken back and draped and extended over the edges of the tablet so that the back of the tablet cannot be seen. This way and none of the cables going from the back of the headdress to the tablet may be seen.

Figure 16:
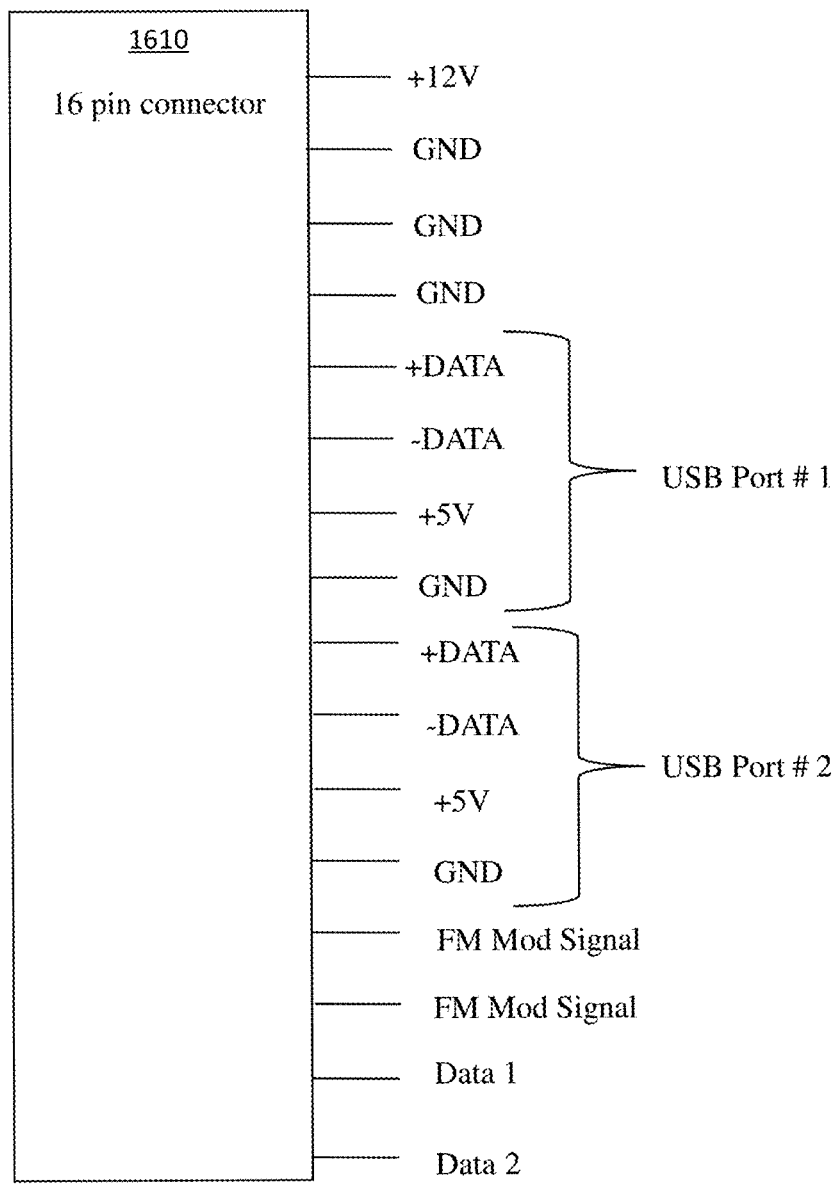
FIG. 16 depicts an exemplary electrical connection arrangement relating to tablet assembly/integration according to certain embodiments of the present invention.

FIG. 16 depicts an exemplary electrical connection arrangement relating to tablet assembly/integration according to certain embodiments of the present invention. Without limitation, for example, the 16-pin custom connector has connections for power, and two USB ports.

A custom PCB adapter card in certain embodiments contains a USB hub chip (for 2 USB ports), I2C interface for control, FM transmitter and IR interface, camera interface for front facing camera, and DC to DC power converter (12v to 5V @ 3 amps). Other capabilities integrated into certain embodiments include some or all of the following:

Charging system for tablet;
Wireless charging system;
Removable multimedia player;
FM/IR transmitter for head set;
Self-Tuning FM transmitter using real-time audio feedback, in which the device will find a suitable radio channel on which to transmit based on audio feedback (e.g., the tablet computing device can encode/modulate a signal, such as a DTMF audio tone, into an FM waveform, then sweep the FM spectrum until the device detects an "echo" of that signal as it is played over the vehicle's speakers and picked up by a microphone on the tablet computing device); and/or
Bluetooth interfaces, including multipoint Bluetooth in certain embodiments.

According to certain embodiments, as described and shown earlier, the electronic circuitry of a commercially available tablet are modified, and the modified electronics are inserted back into the tablet housing, which is also modified to provide interface circuitry. Such embodiments may be implemented, for example, as follows:

Step 1: Dismantle a tablet and take the tablet mother board out of the tablet housing.

Step 2: Attach a custom PCB adapter card to the tablet motherboard, placing kapton (polyimide) tape or other insulating material between the PCBs so shorting may not exist.

Step 3: Connect the existing connectors (power, data, etc.) that went to cables to the outside of the tablet housing from the tablet mother board to the custom PCB.

Step 4: Make a hole in the tablet housing where a custom PCB 16-pin custom connector is allowed to protrude out of the back of the modified tablet housing.

Step 5: Place the tablet motherboard, with the attached custom PCB daughterboard, back in the tablet housing with the display.

Step 6: Plug the adapter card within the tablet housing containing the 16-pin custom connector into the back headrest custom connector receptacle.

Certain other embodiments relate to systems and methods to integrate a standard tablet with no modifications into a headrest and connect dongles to the standard connection points. Such embodiments may be implemented, for example, as follows:

Step 1: Connect a standard commercially-available tablet to a rear headrest (could be any of the locations, i.e. visor, in dash, etc.) by using dongles to connect the tablet connection points to the back headrest cables.

Step 2: Mount the tablet to the rear headrest by sliding it into place.

Step 3: Take rear headrest material and drape and extend the material over the edges of the tablet so that the back of the tablet cannot be seen. This way none of the cables going from the back of the headrest to the tablet may be seen.

If two or more displays are used in the rear of the car, some or all of the following functionality may be provided:

All of the units may have the same functionality;
All units may be controlled by a master (e.g., in-dash) unit that controls each of them individually or collectively (this may be used, for example, to effect parent control for different ages of children);
The master unit could have a configuration file that automatically sets up what each of the tablets functionality and capability may be since different users may have different restrictions (i.e. age restrictions, use restrictions—no texting for a 5 year old, only certain games may be played or maybe just homework is allowed to be done, no internet surfing for one of the tablets, etc.);
If a DVD is played in any of the units installed in a vehicle, all other displays can watch it, or each unit can have its own DVD player;
Garage door opening capability;
Capability to senses when the vehicle is sufficiently close to a location (e.g., a user's home) and automatically control equipment (e.g., turns on the lights);
Capability to controls lights or other vehicle systems (e.g., vehicle locks); and/or
GPS/navigation interface (e.g., display the current GPS route and how long it will take to get to a specific destination).

Figure 17:
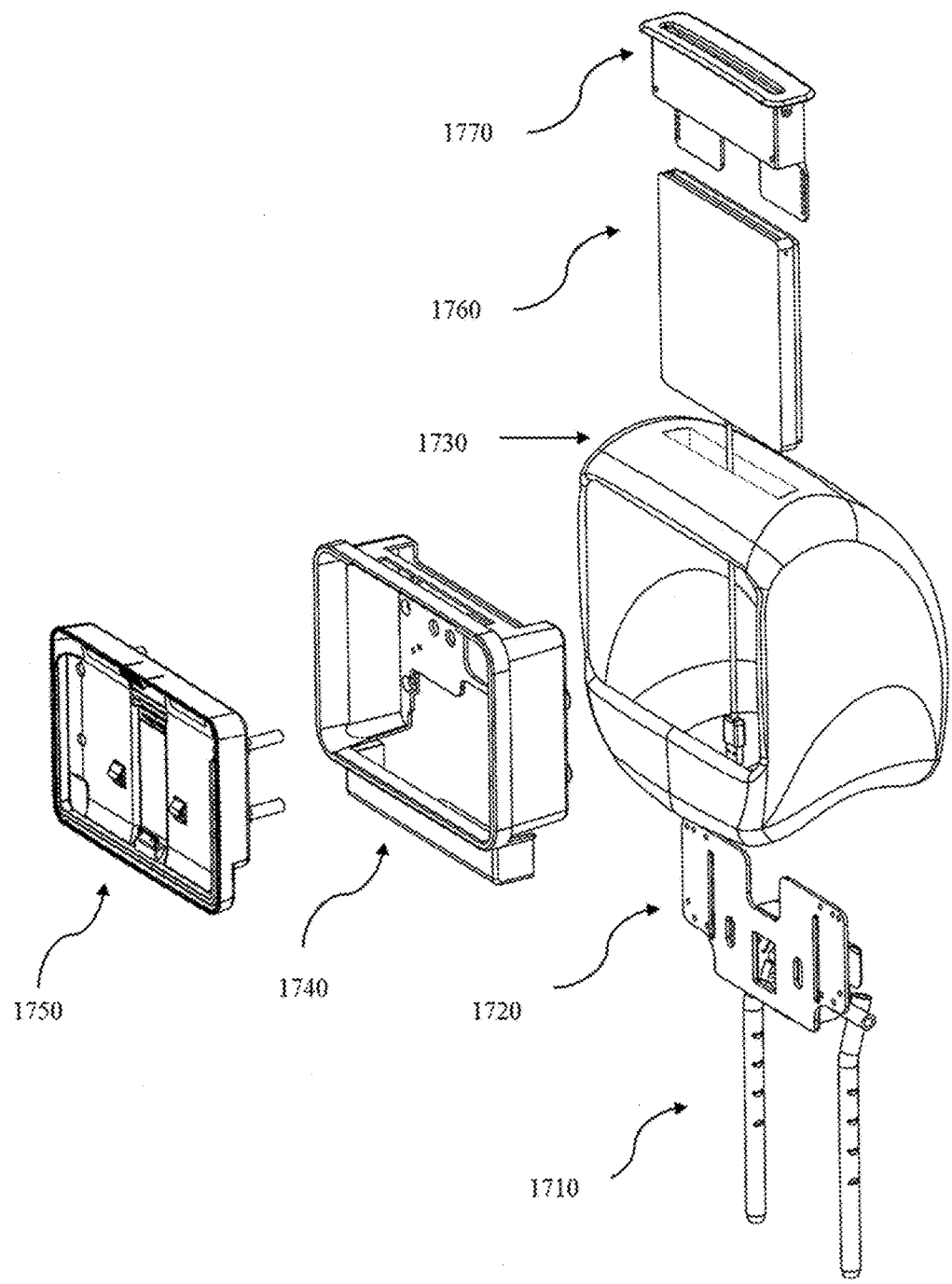
FIG. 17 depicts aspects of a tablet-based vehicle entertainment system (headrest-mounted) according to certain embodiments of the present invention.
Figure 18:
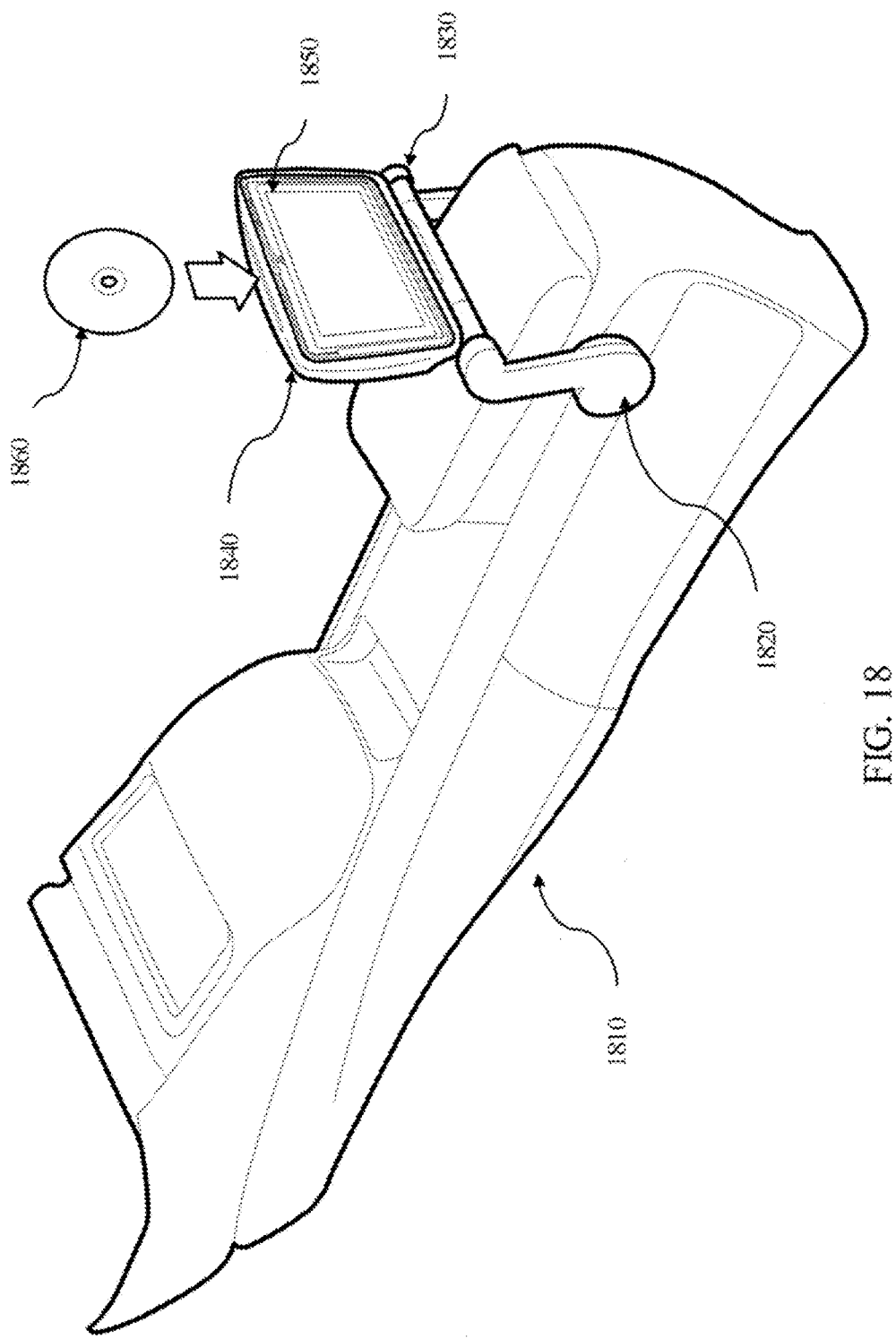
FIG. 18 depicts aspects of a tablet-based vehicle entertainment system (center-console-mounted) according to certain embodiments of the present invention.
Figure 19:
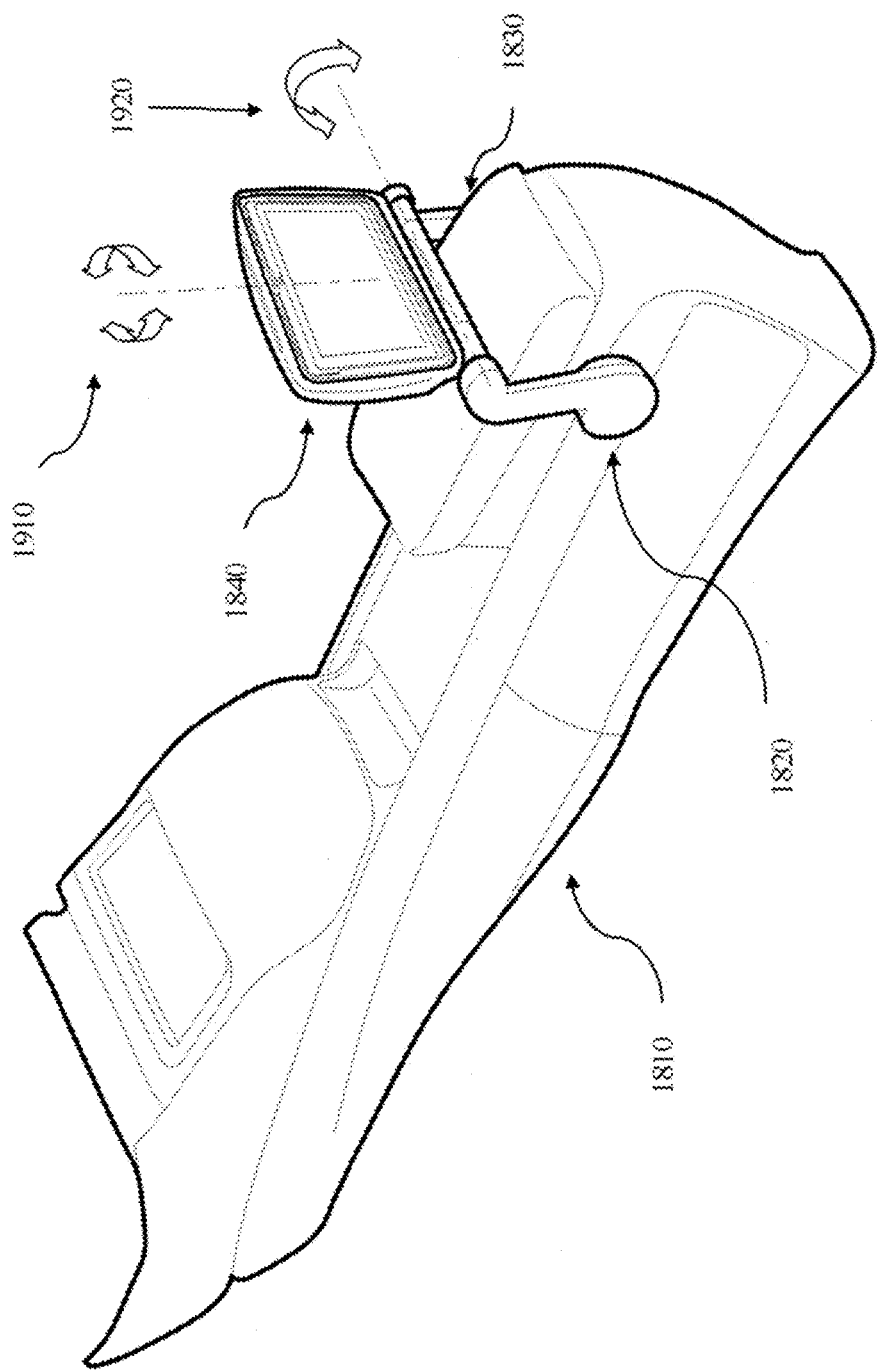
FIG. 19 depicts aspects of a tablet-based vehicle entertainment system (center-console-mounted) according to certain embodiments of the present invention.
Figure 20:
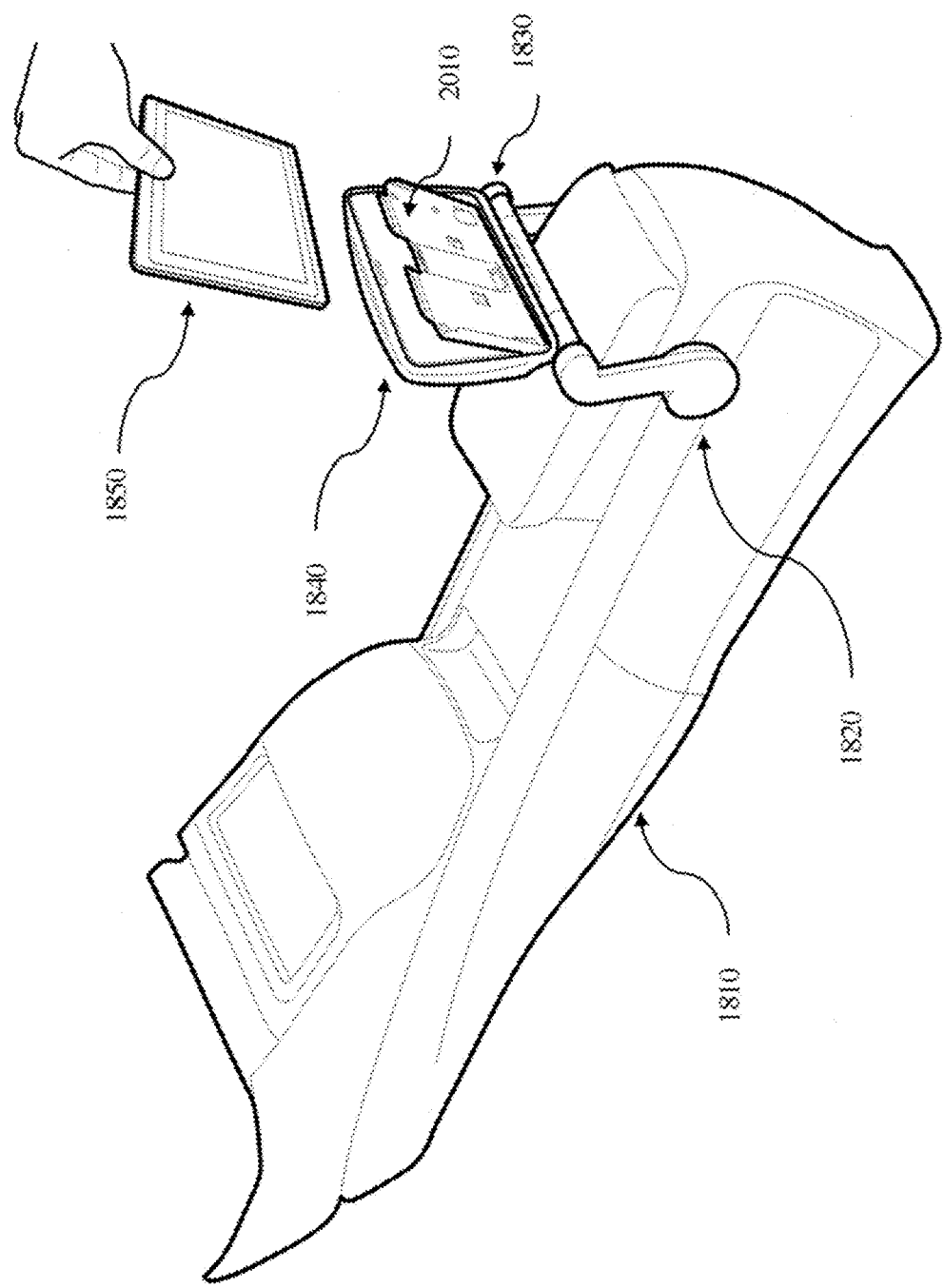
FIG. 20 depicts aspects of a tablet-based vehicle entertainment system (center-console-mounted) according to certain embodiments of the present invention.

FIG. 17 depicts aspects of a tablet-based vehicle entertainment system (headrest-mounted) according to certain embodiments of the present invention. A set of two headrest posts 1710 are attached to a head rest bracket 1720. Bracket 1720 is inserted into headrest bun 1730 through an opening at the bottom of bun 1730, and bracket 1720 is attached to bun 1730 by means of appropriate fasteners such as screws. Media module 1760 and its corresponding bezel 1770 are inserted into bun 1730 through an appropriately sized opening in bun 1730 (such as the top-facing opening shown in FIG. 17). Media module 1760 may comprise a DVD-ROM unit, DVD player, CD-ROM unit, CD player, or any other suitable media playback and/or recording device, depending on the requirements of each particular implementation. Media module 1760 is electrically coupled to receptacle member 1740 and its relevant electrical components by means of appropriate cabling, such as the USB cable shown in FIG. 17. Receptacle member 1740 is inserted into bun 1730 through an appropriately sized rear-facing opening in bun 1730. Tablet carrier module 1750 is inserted into receptacle member 1740, and all the foregoing components are attached to each other by means of suitable fasteners that are appropriate sized and located, depending on the requirements of each particular implementation. A tablet display device (not shown) may be selectively mounted onto (or inserted into) tablet carrier module 1750.

Figure 21:
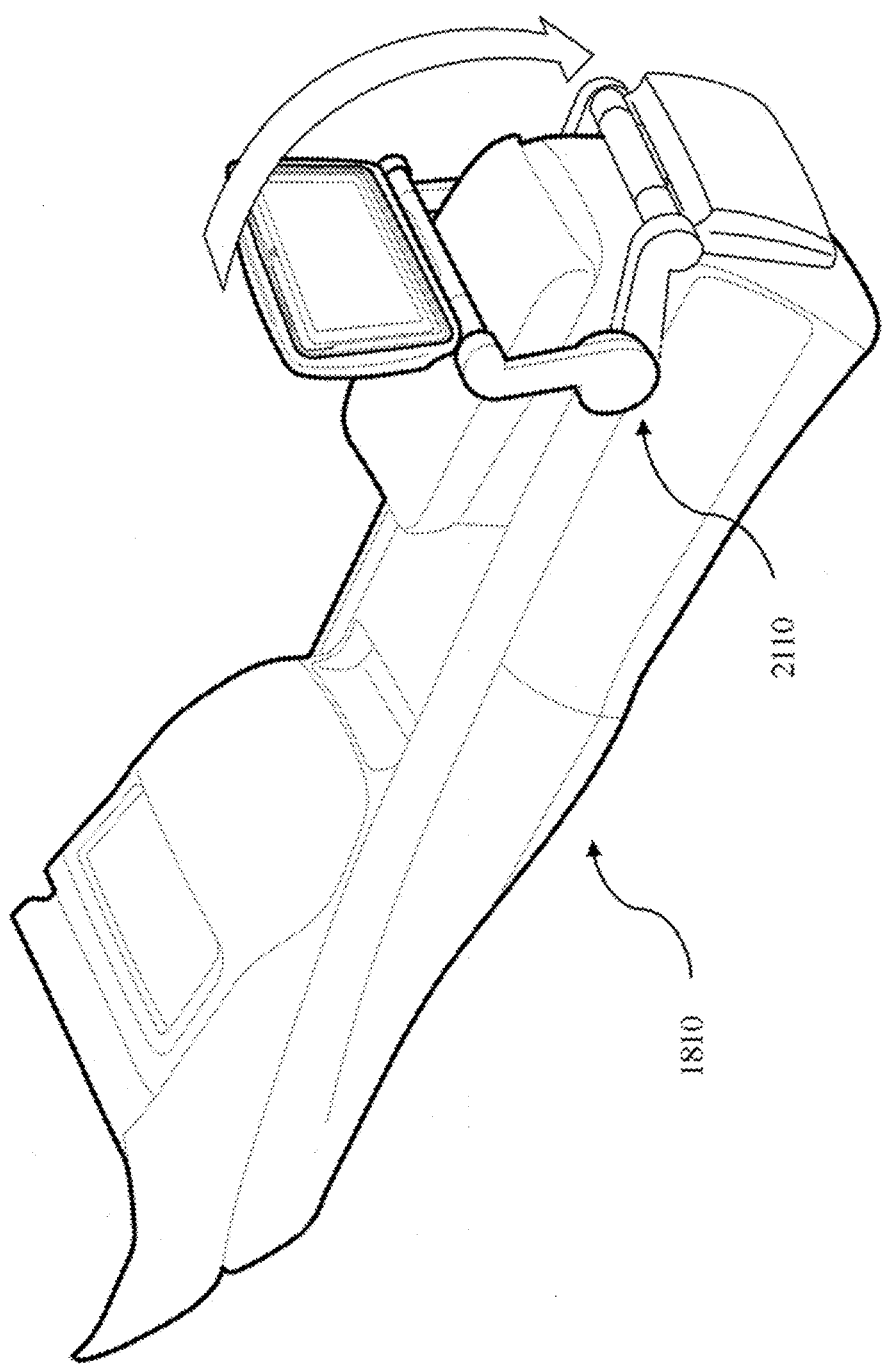
FIG. 21 depicts aspects of a tablet-based vehicle entertainment system (center-console-mounted) according to certain embodiments of the present invention.

FIGS. 18 through 21 depict aspects of a tablet-based vehicle entertainment system (center-console-mounted) according to certain embodiments of the present invention. Pivoting mounting arms (1820, 1830) are installed into a console 1820 by any suitable mechanism (not shown). Tablet receptacle member 1840 is pivotally attached to mounting arms (1820, 1830), such that member 1840 may rotate vertically in the directions shown by item 1920 about the indicated axis in FIG. 19. Media (1860), such as a DVD disk, may be inserted into receptacle member 1840 by means of a suitable opening, such as the top-loading opening shown in FIG. 18. Tablet display device 1850 is mounted into receptacle member 1840 by inserting device 1850 into a carrier member (item 2010, shown in FIG. 20) such that tablet display device 1850 and its corresponding carrier member may pivot horizontally in the directions shown by item 1910 about the indicated axis in FIG. 19. Mounting arms (1820, 1830) may rotate vertically as shown in FIG. 21, such that the entire tablet-based entertainment system may be moved into a stowed position when not in use.

Figure 22:
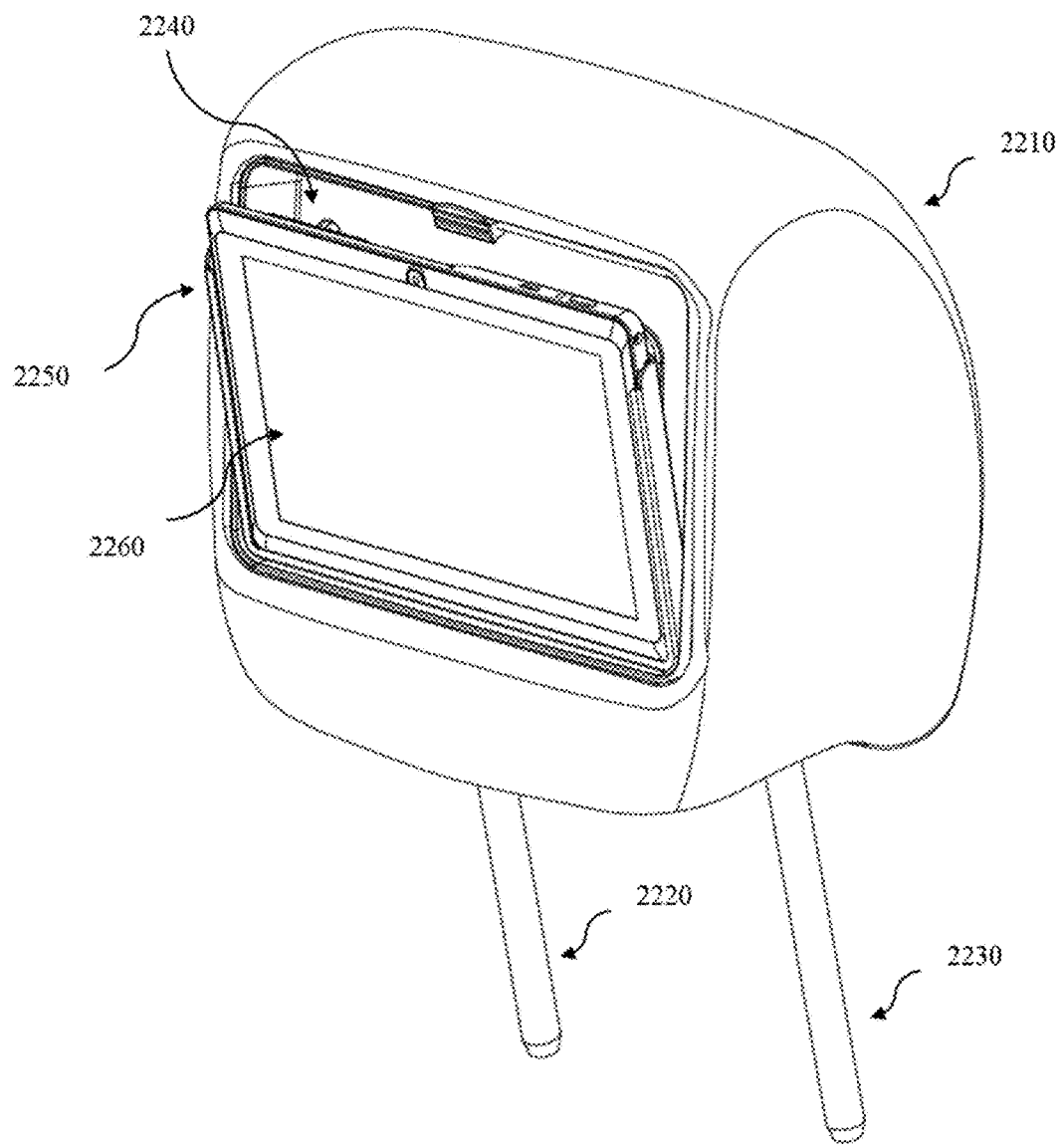
FIG. 22 depicts aspects of a tablet-based vehicle entertainment system (headrest-mounted) according to certain embodiments of the present invention.

FIG. 22 depicts aspects of a tablet-based vehicle entertainment system (headrest-mounted) according to certain embodiments of the present invention. A set of two headrest posts (2220, 2230) are attached to a head rest bracket (not shown). The bracket is inserted into headrest bun 2210 through an opening at the bottom of bun 2210, and the bracket is attached to bun 2210 by means of appropriate fasteners such as screws. Receptacle member 2240 is inserted into bun 2210 through an appropriately sized rear-facing opening in bun 2210. Tablet carrier module 2250 is inserted into receptacle member 2240, and all the foregoing components are attached to each other by means of suitable fasteners that are appropriate sized and located, depending on the requirements of each particular implementation. A tablet display device 2260 may be selectively mounted onto (or inserted into) tablet carrier module 2250.

Figures 23A, 23B:
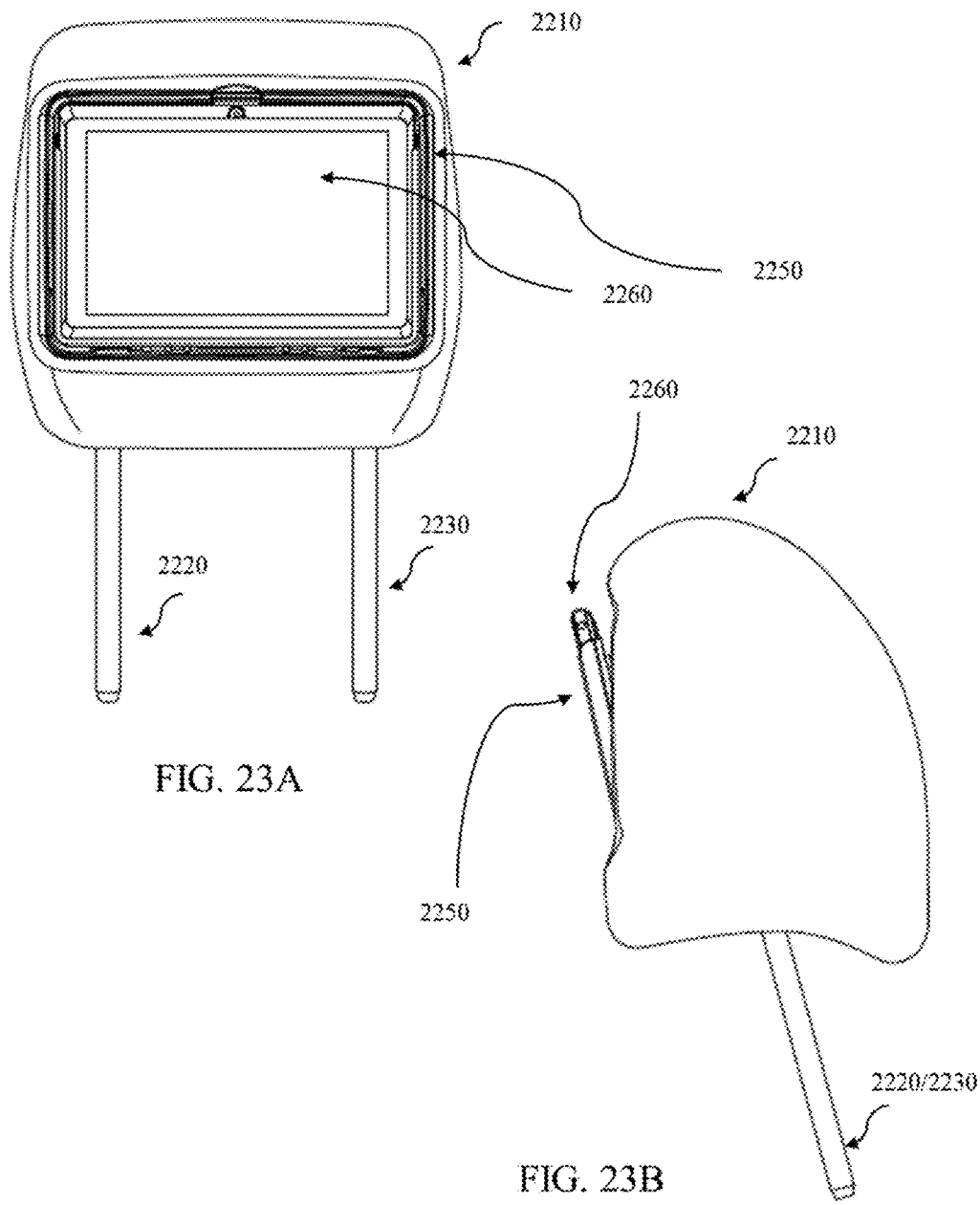
FIGS. 23A-23B depict aspects of a tablet-based vehicle entertainment system (headrest-mounted) according to certain embodiments of the present invention.
Figure 24A:
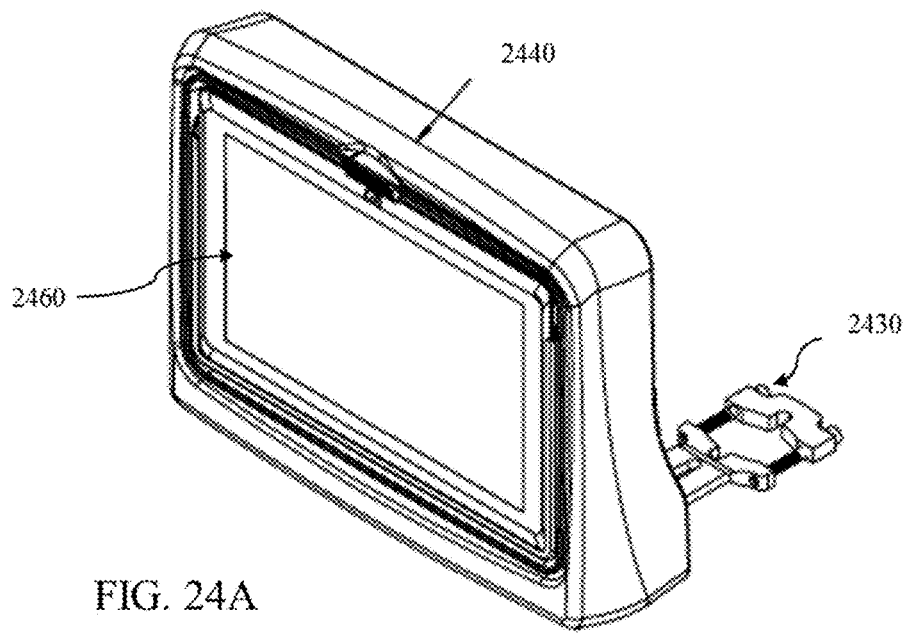
FIGS. 24A-24B depict aspects of a tablet-based vehicle entertainment system (headrest-mounted) according to certain embodiments of the present invention.
Figure 24B:
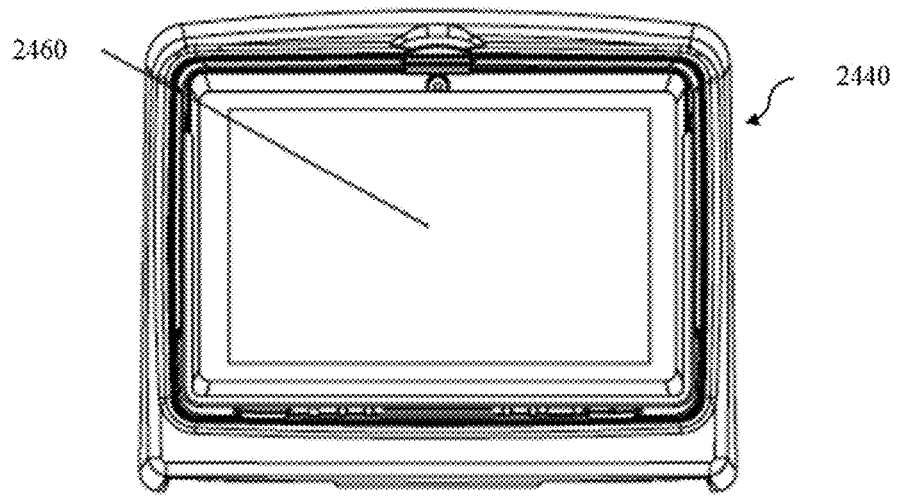
Figure 25A:
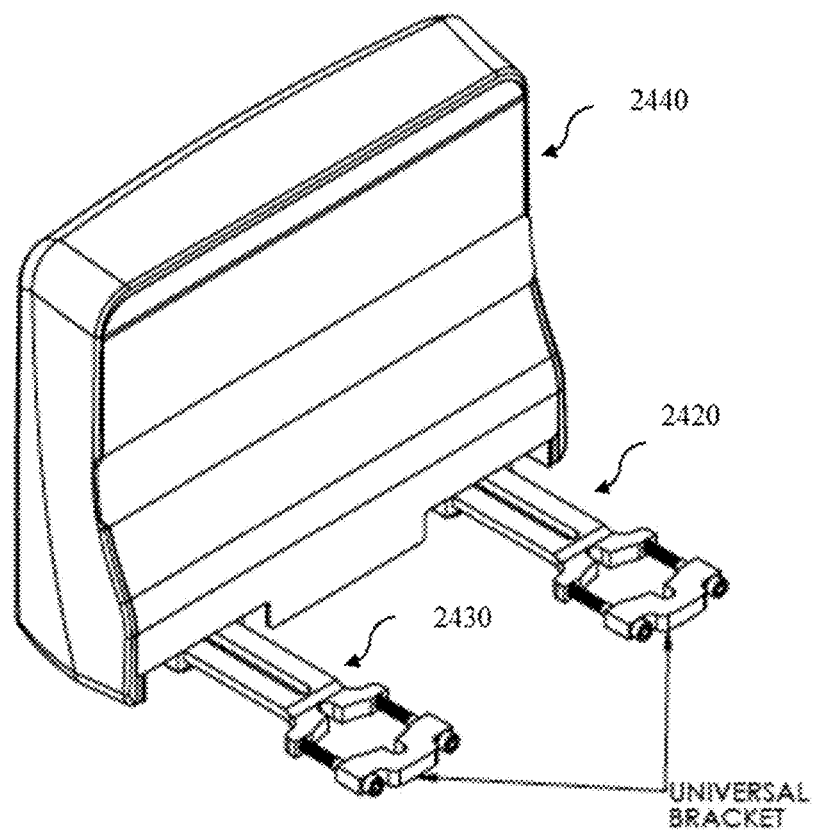
FIGS. 25A-25B depict aspects of a tablet-based vehicle entertainment system (headrest-mounted) according to certain embodiments of the present invention.
Figure 25B:
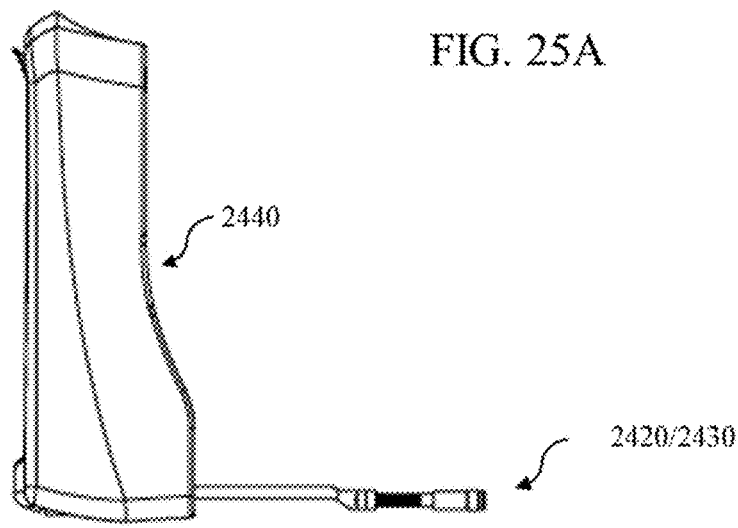
Figure 26:
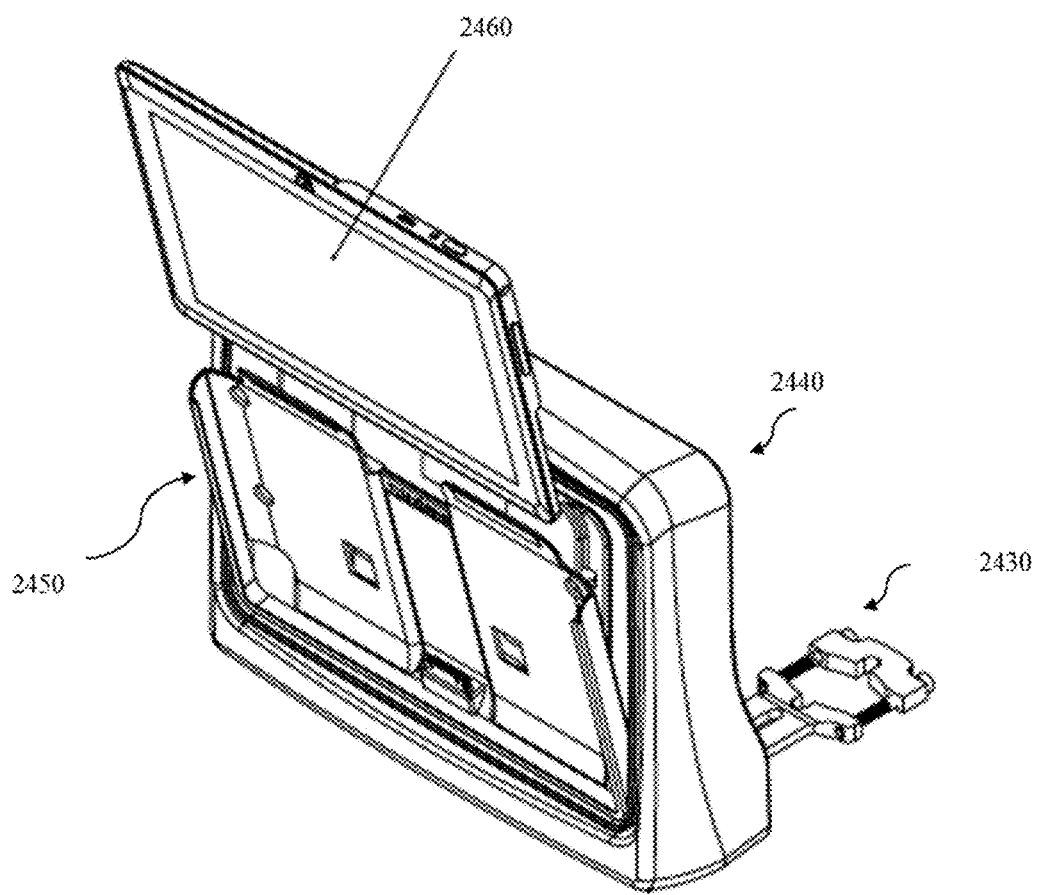
FIG. 26 depicts aspects of a tablet-based vehicle entertainment system (headrest-mounted) according to certain embodiments of the present invention.
Figure 27:
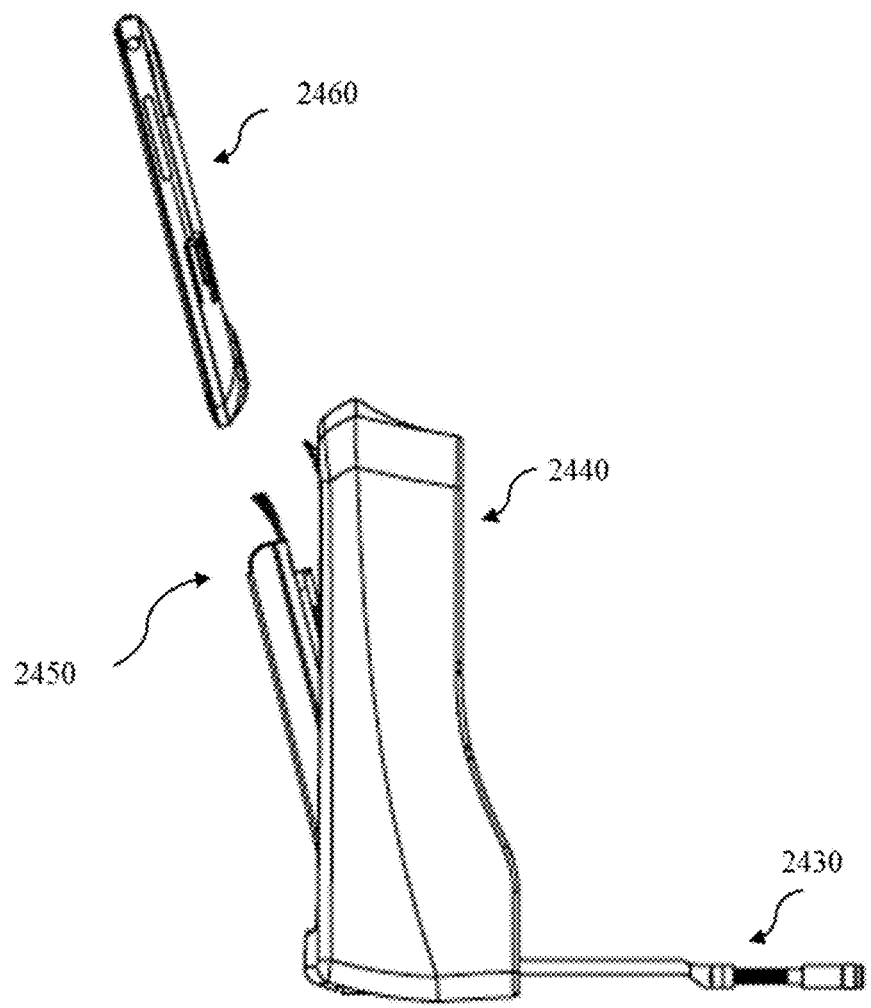
FIG. 27 depicts aspects of a tablet-based vehicle entertainment system (headrest-mounted) according to certain embodiments of the present invention.

FIGS. 23A-23B depict aspects of a tablet-based vehicle entertainment system (headrest-mounted) according to certain embodiments of the present invention. The components shown are the same as those in FIG. 22, as indicated by the use of the same reference numerals, but from different angles.

Figure 28:
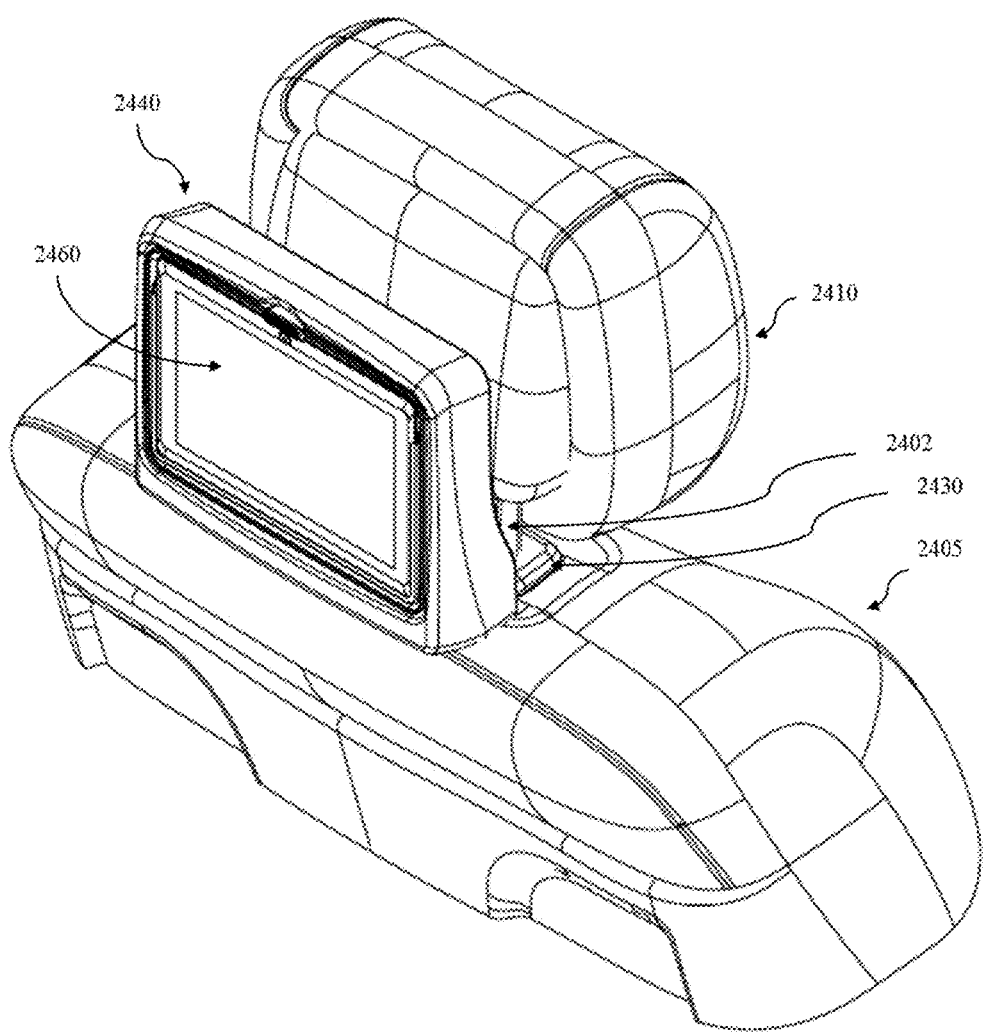
FIG. 28 depicts aspects of a tablet-based vehicle entertainment system (headrest-mounted) according to certain embodiments of the present invention.
Figure 29:
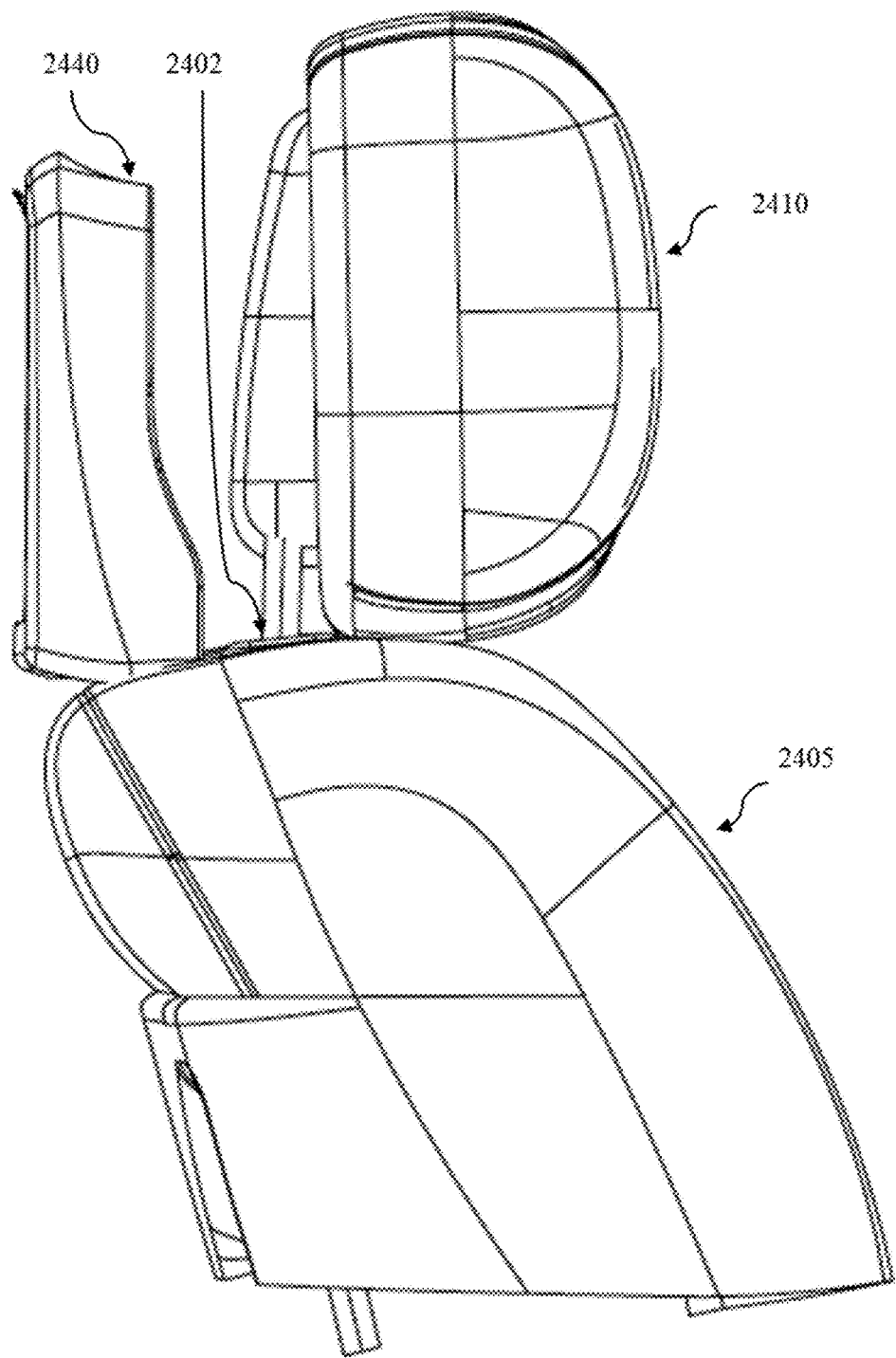
FIG. 29 depicts aspects of a tablet-based vehicle entertainment system (headrest-mounted) according to certain embodiments of the present invention.
Figure 30:
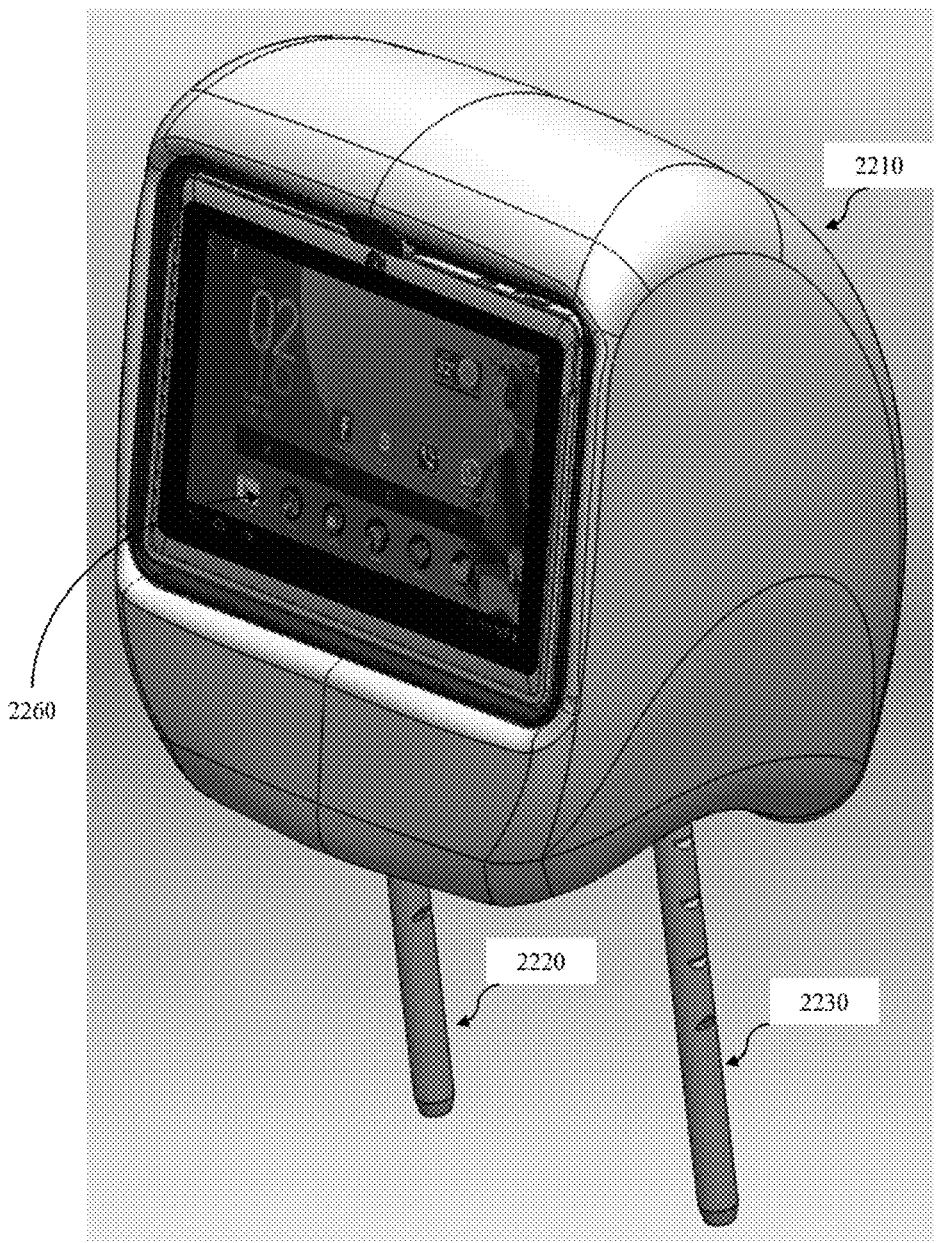
FIG. 30 depicts aspects of a tablet-based vehicle entertainment system (headrest-mounted) according to certain embodiments of the present invention.
Figure 31:
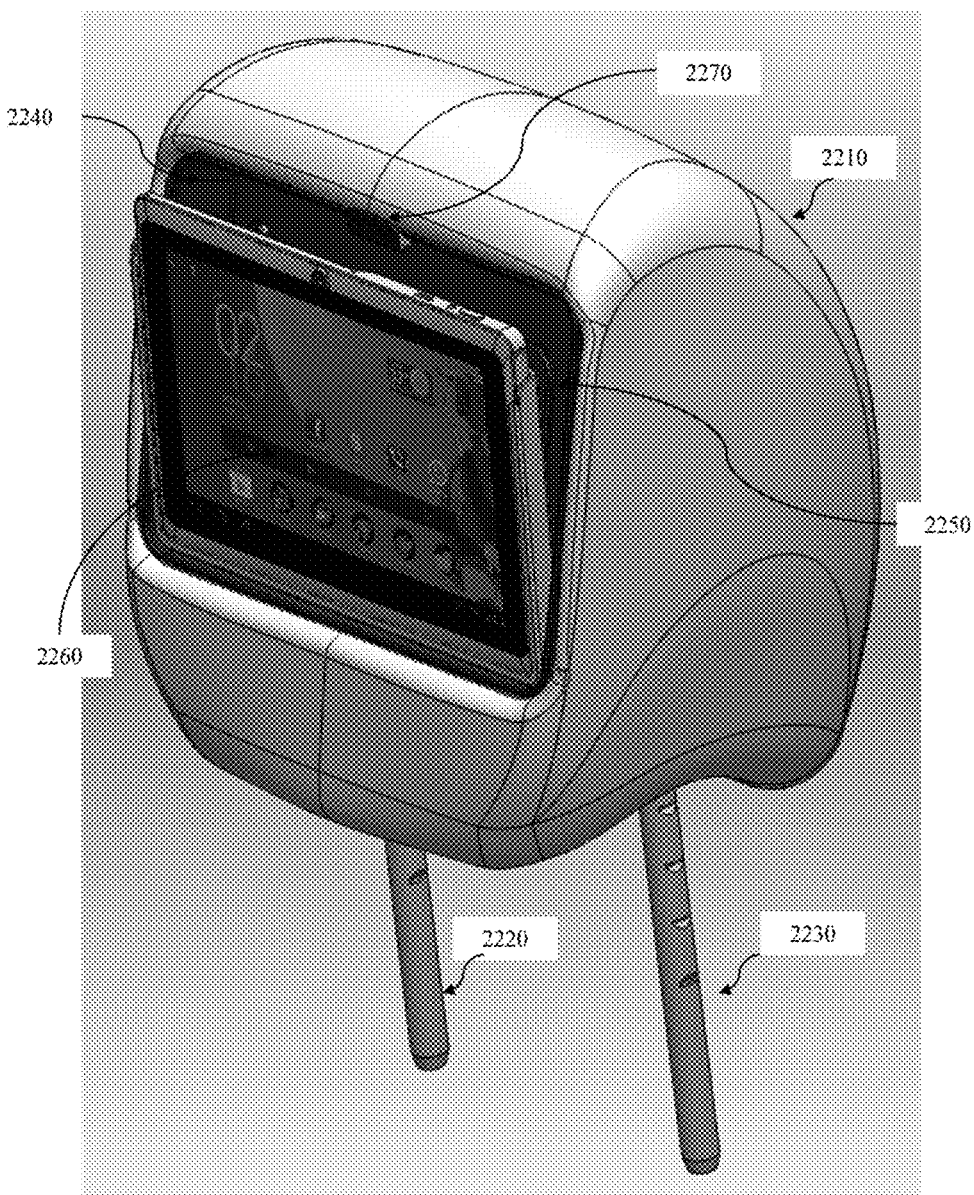
FIG. 31 depicts aspects of a tablet-based vehicle entertainment system (headrest-mounted) according to certain embodiments of the present invention.

FIGS. 24A through 29 depict aspects of a tablet-based vehicle entertainment system (headrest-mounted) according to certain embodiments of the present invention. This configuration may advantageously be implemented in vehicles with Active Headrest or Active Head Restraint (AHR) features, in which it is not practical to embed the headrest-mounted entertainment system into a headrest bun (as in FIG. 22, for example). A set of two headrest universal brackets (2220, 2430) attach to headrest posts (items 2492 as in FIGS. 28 and 29), and also to receptacle member 2440. A tablet display device 2460 may be selectively mounted onto (or inserted into) receptacle member 2440 by means of a tablet carrier module (item 2450 in FIGS. 26 and 27). Tablet carrier module 2450 rotates about a bottom hinge and can snap into a relatively vertical position once tablet device 2460 has been fully inserted, as described more fully elsewhere in this document. FIGS. 28 and 29 depict the headrest-mounted entertainment system in view of its relative location to active headrest (AHR) bun 2410 and vehicle seat back 2405.

Figure 32:
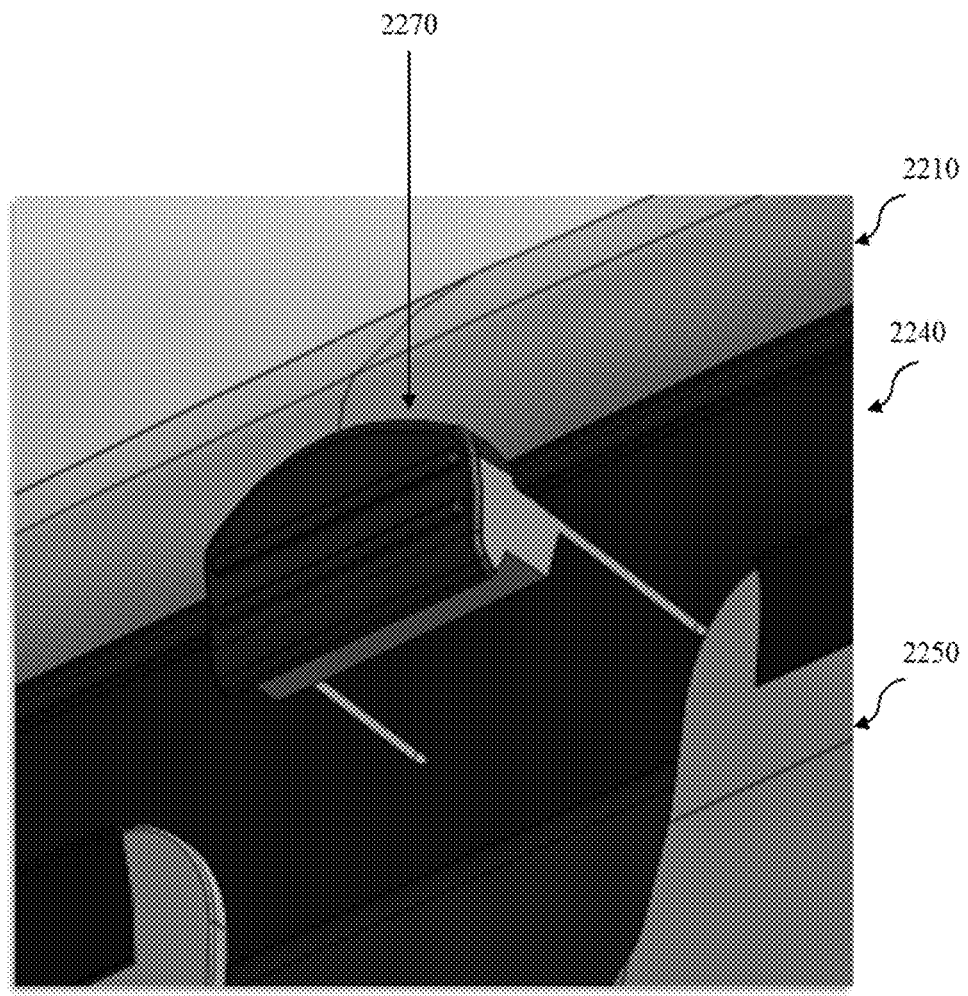
FIG. 32 depicts aspects of a feature of a tablet-based vehicle entertainment system (headrest-mounted) according to certain embodiments of the present invention.
Figure 33:
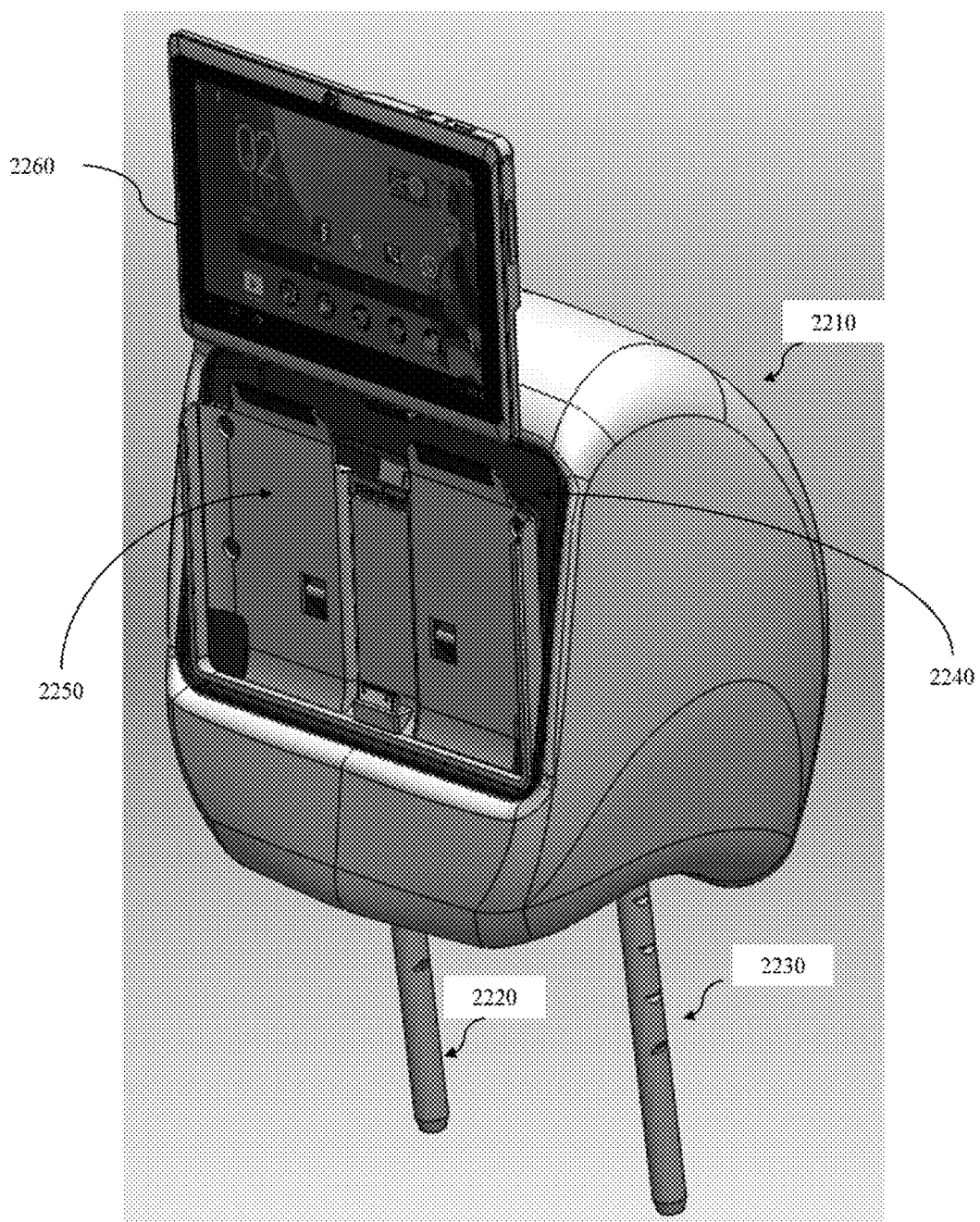
FIG. 33 depicts aspects of a tablet-based vehicle entertainment system (headrest-mounted) according to certain embodiments of the present invention.
Figure 34:
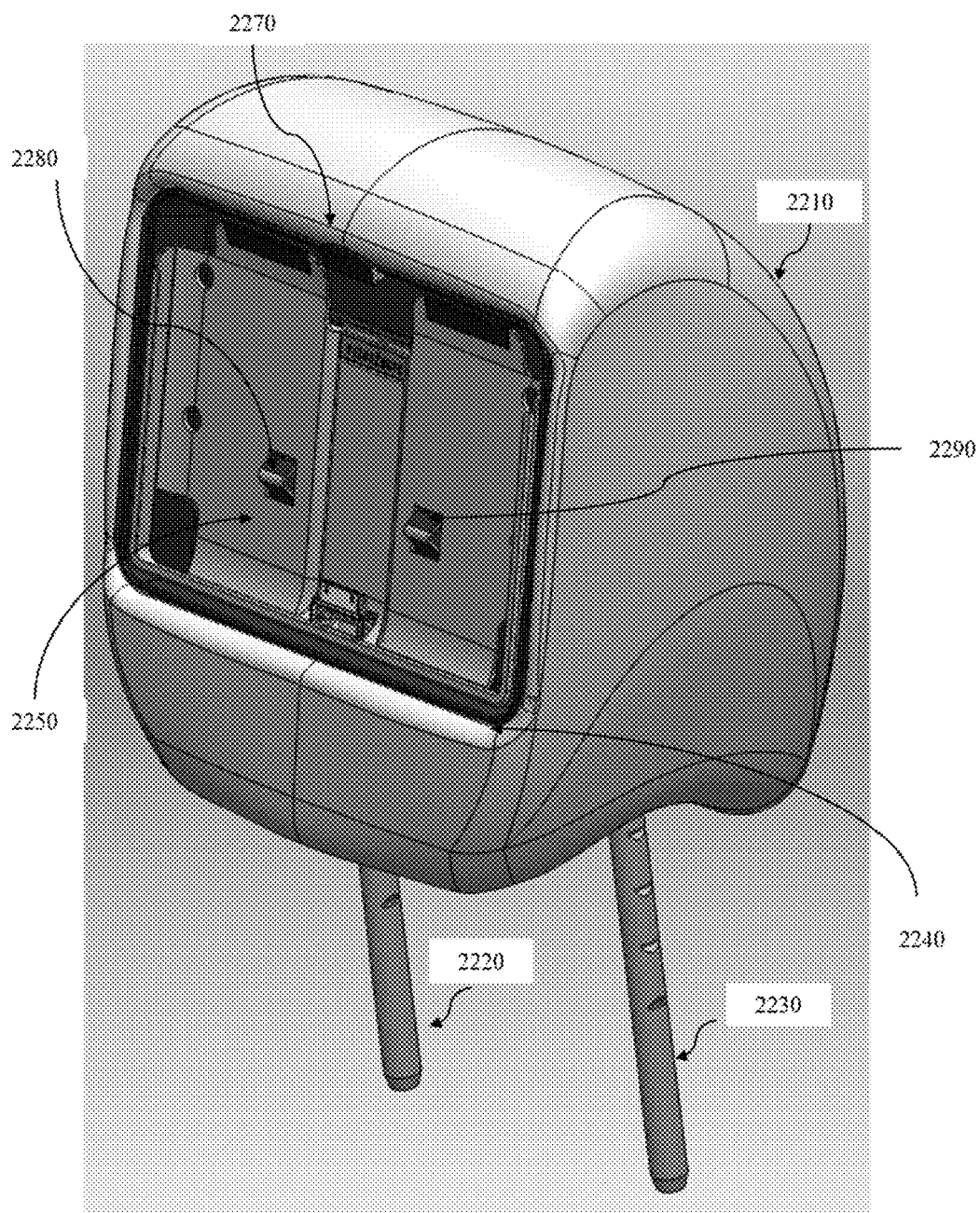
FIG. 34 depicts aspects of a tablet-based vehicle entertainment system (headrest-mounted) according to certain embodiments of the present invention.
Figure 35:
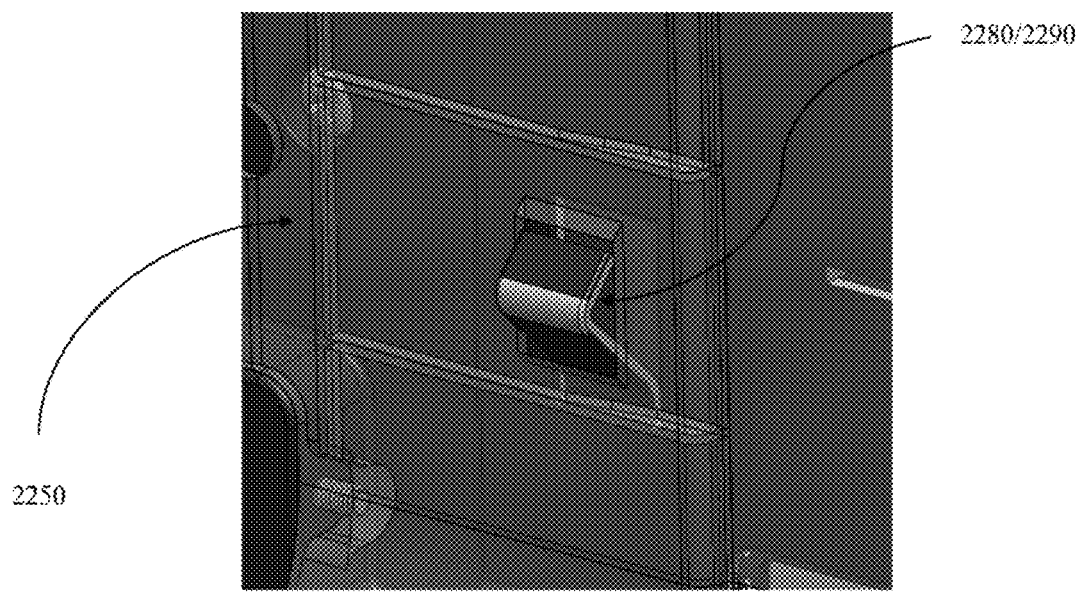
FIG. 35 depicts aspects of a feature of a tablet-based vehicle entertainment system (headrest-mounted) according to certain embodiments of the present invention.

FIGS. 30-36 depict various aspects and features of a tablet-based vehicle entertainment system (headrest-mounted) according to certain embodiments of the present invention. A set of two headrest posts (2220, 2230) are attached to a head rest bracket (not shown). The bracket is inserted into headrest bun 2210 through an opening at the bottom of bun 2210, and the bracket is attached to bun 2210 by means of appropriate fasteners such as screws. Receptacle member 2240 is inserted into bun 2210 through an appropriately sized rear-facing opening in bun 2210. Tablet carrier module 2250 is inserted into receptacle member 2240, and all the foregoing components are attached to each other by means of suitable fasteners that are appropriate sized and located, depending on the requirements of each particular implementation. A tablet display device 2260 may be selectively mounted onto (or inserted into) tablet carrier module 2250. Latch 2270 may be pressed when tablet display device 2260 is in its vertical and locked position, so as to cause carrier module 2250 to spring back into the angled position shown in FIGS. 31 and 33, and thereby facilitate tablet device 2260 insertion and removal. Additional details regarding latch 2270 in one exemplary embodiment are shown in FIG. 32. Spring members (2280, 2290) provide outward force so as to cause carrier module 2250 to spring back into the angled position of FIGS. 31 and 33 when latch 2270 is activated with tablet display device 2260 in the inserted position.

Figure 36:
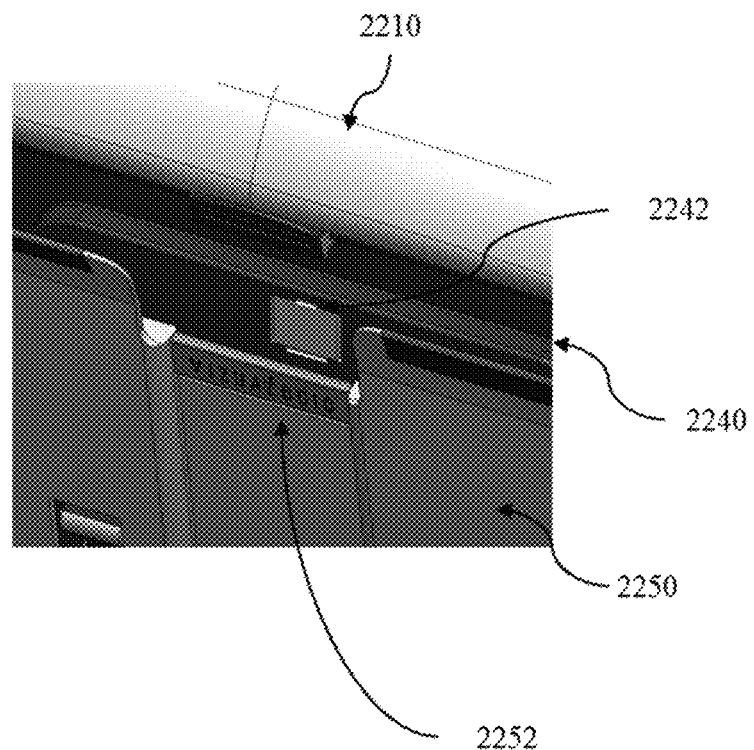
FIG. 36 depicts aspects of a feature of a tablet-based vehicle entertainment system (headrest-mounted) according to certain embodiments of the present invention.

FIG. 36 depicts details that facilitate magnetic locking of carrier 2250 into receptacle 2240 according to one embodiment. A magnet 2242 is located within receptacle 2240 such that when carrier 2250 is pushed into the locked vertical position, metallic material 2252 magnetically couples with magnet 2242 and maintains carrier 2250 in the locked position, until latch 2270 is activated.

Figure 37:
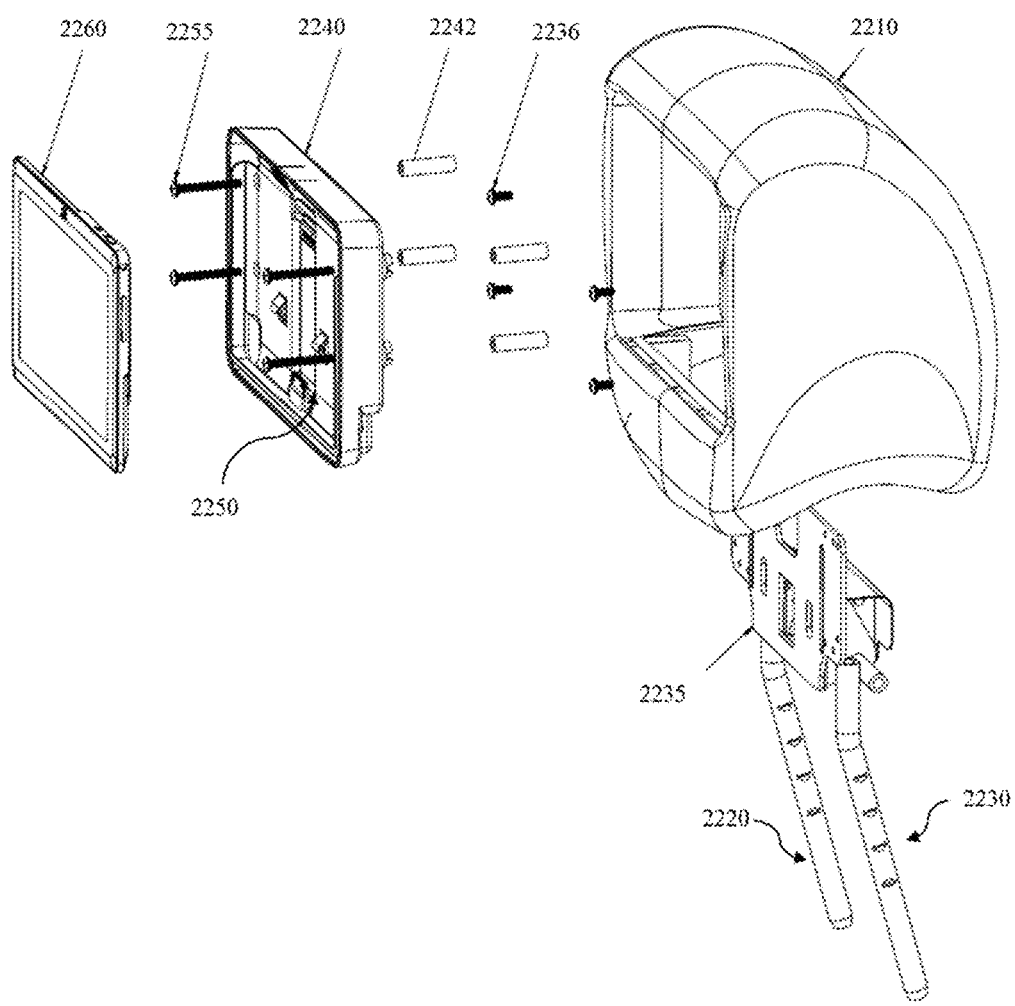
FIG. 37 depicts aspects of a tablet-based vehicle entertainment system (headrest-mounted) according to certain embodiments of the present invention.

FIG. 37 depicts aspects of a tablet-based vehicle entertainment system (headrest-mounted) according to certain embodiments of the present invention. A set of two headrest posts (2220, 2230) are attached to a head rest bracket 2235. Bracket 2235 is inserted into headrest bun 2210 through an opening at the bottom of bun 2210, and bracket 2235 is attached to bun 2210 by means of appropriate fasteners such as screws (2236). Receptacle member 2240 is inserted into bun 2210 through an appropriately sized rear-facing opening in bun 2210. Tablet carrier module 2250 is inserted into receptacle member 2240, and all the foregoing components are attached to each other by means of suitable fasteners that are appropriate sized and located (e.g., 2255, 2242), depending on the requirements of each particular implementation. A tablet display device (2260) may be selectively mounted onto (or inserted into) tablet carrier module 2250.

Figure 38:
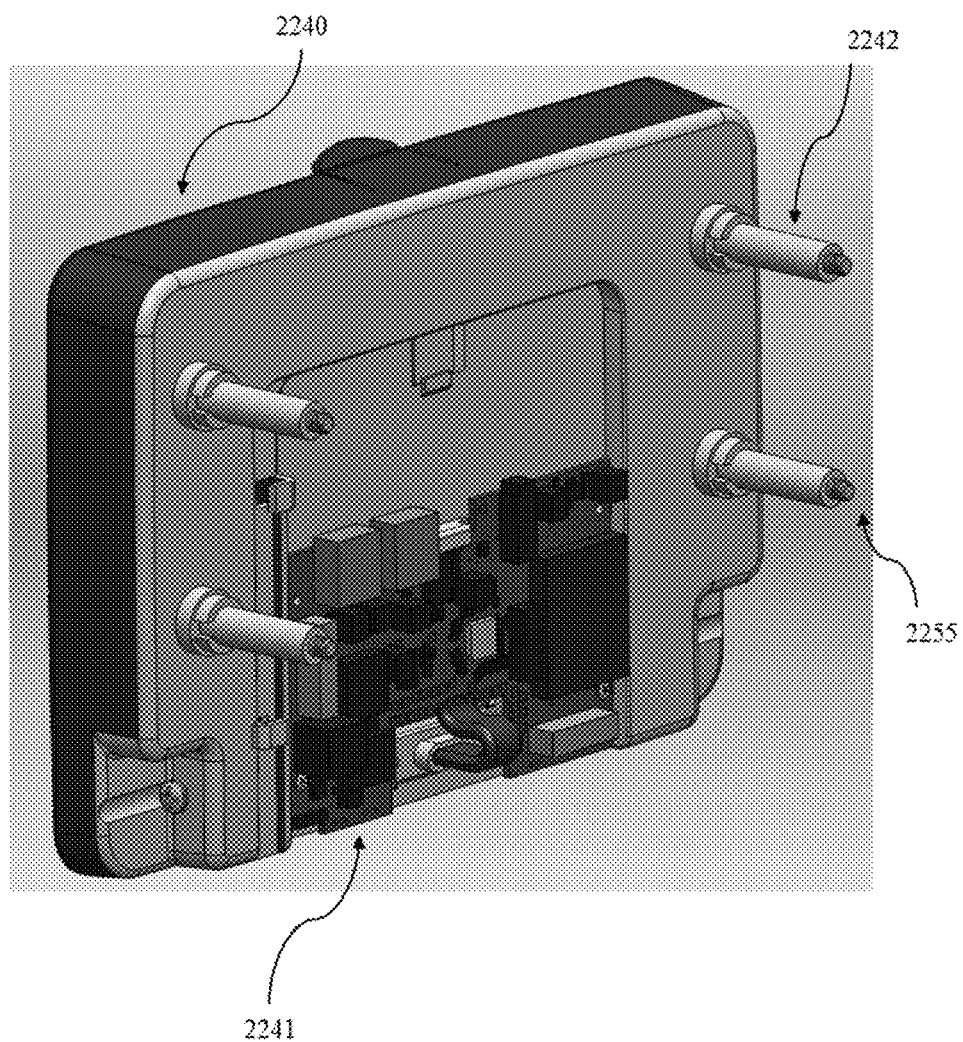
FIG. 38 depicts aspects of a tablet-based vehicle entertainment system (headrest-mounted) according to certain embodiments of the present invention.
Figure 39:
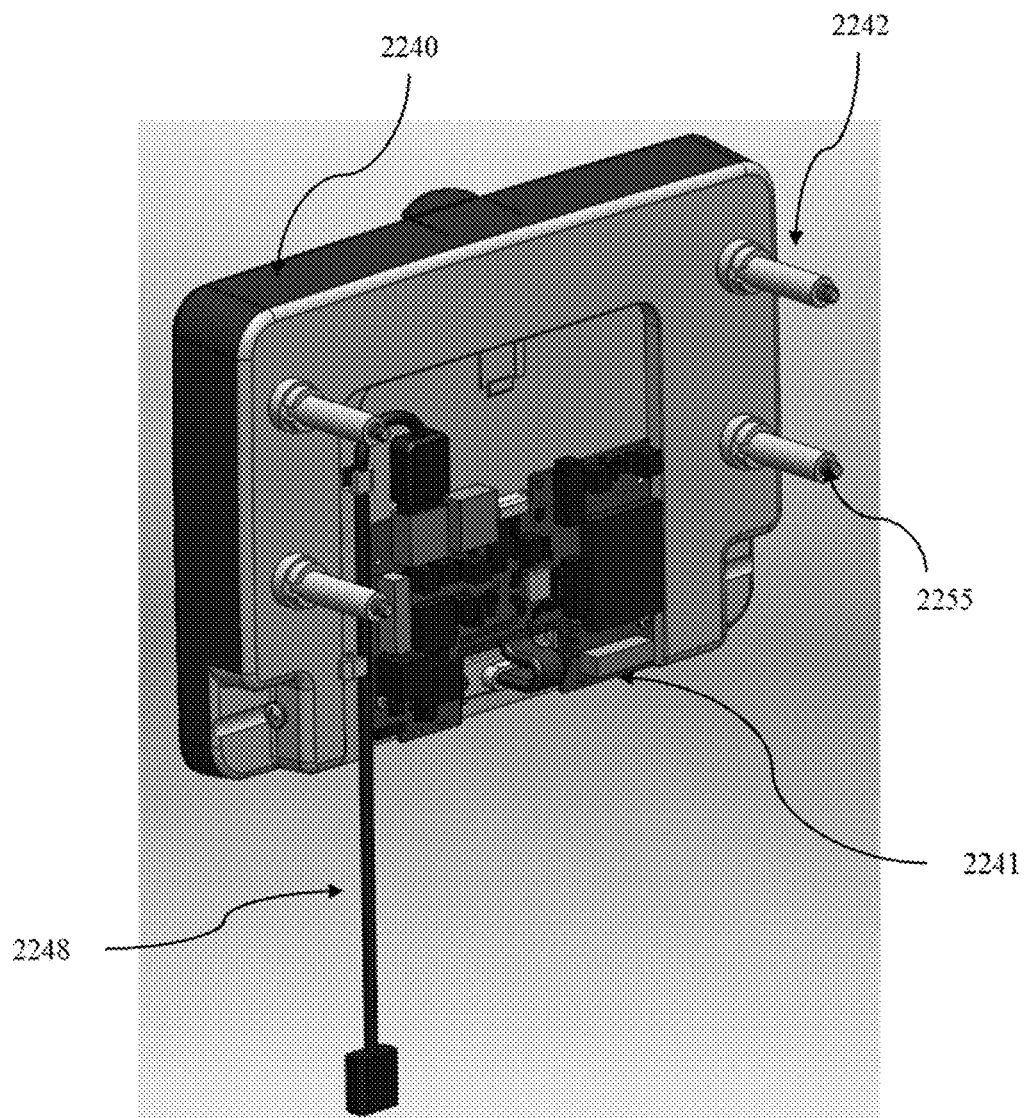
FIG. 39 depicts aspects of a tablet-based vehicle entertainment system (headrest-mounted) according to certain embodiments of the present invention.

FIGS. 38 and 39 depict aspects of a tablet-based vehicle entertainment system (headrest-mounted) according to certain embodiments of the present invention. The side of receptacle member 2240 that faces the interior of the headrest bun includes stand-offs 2242 and screws 2255 so as to facilitate mounting and attachment of all of the relevant components (as shown in FIG. 37), and electronics board 2241 includes electronic components necessary to perform some or all of the hardware and/or software tasks that have been described elsewhere in this document. Cable 2248 (shown in FIG. 39) may be used to interconnect components in a manner known to skilled artisans, such as by coupling the headrest entertainment system to other vehicle systems, and/or to couple receptacle member 2240 to a DVD-ROM or other media player, when such players/recorders are installed.

Figure 40:
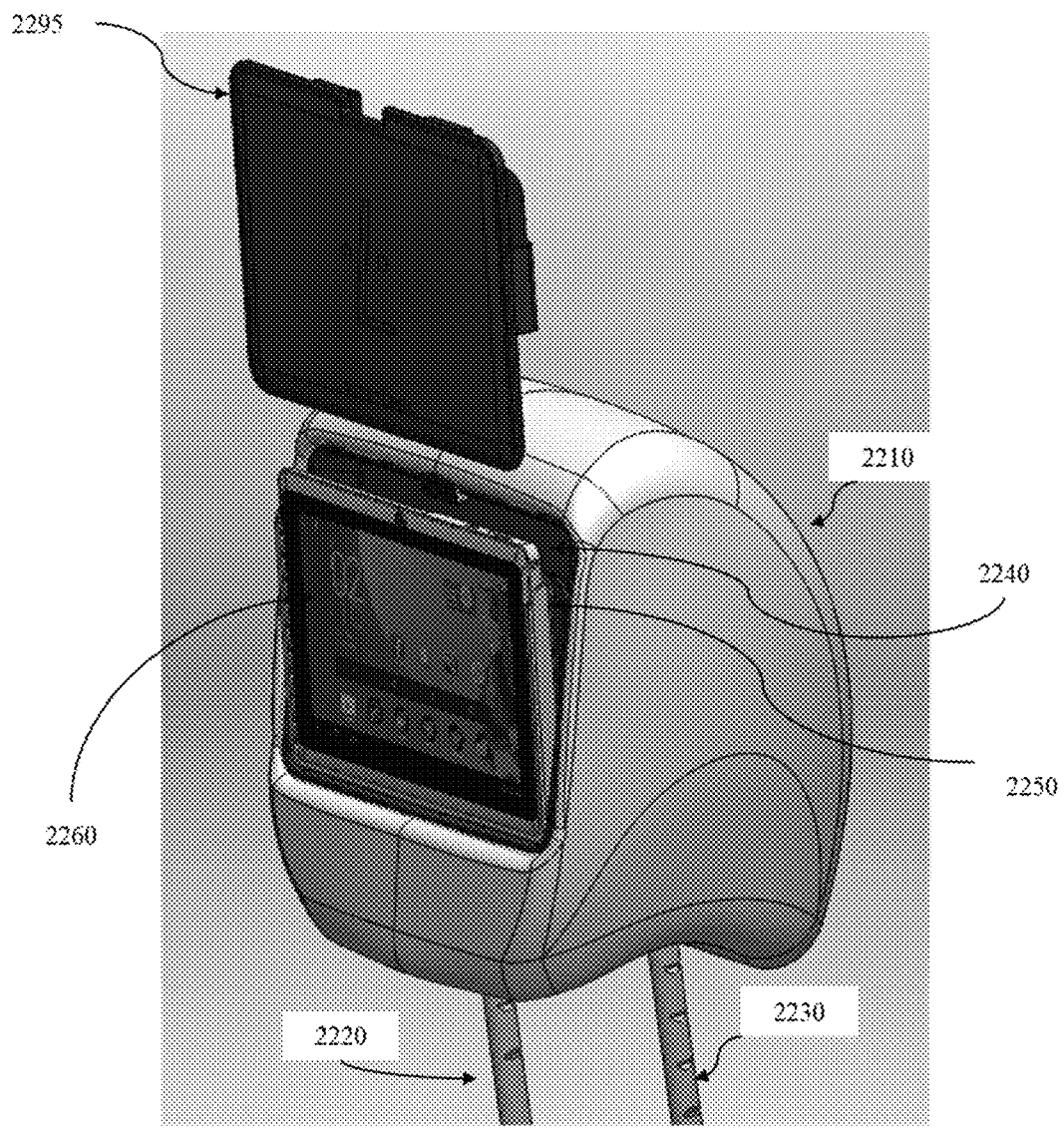
FIG. 40 depicts aspects of a tablet-based vehicle entertainment system (headrest-mounted) according to certain embodiments of the present invention.
Figure 41:
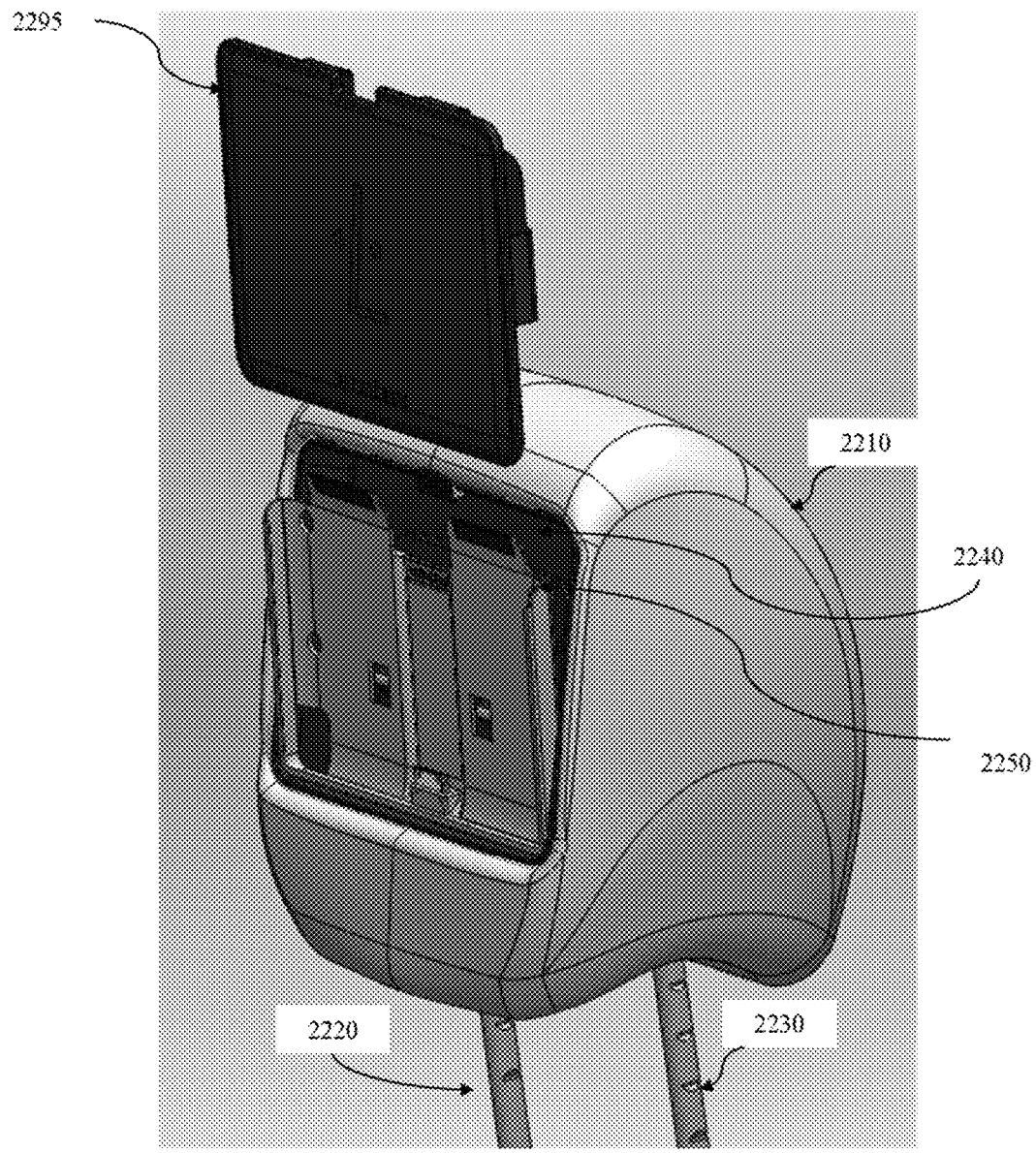
FIG. 41 depicts aspects of a tablet-based vehicle entertainment system (headrest-mounted) according to certain embodiments of the present invention.
Figure 42:
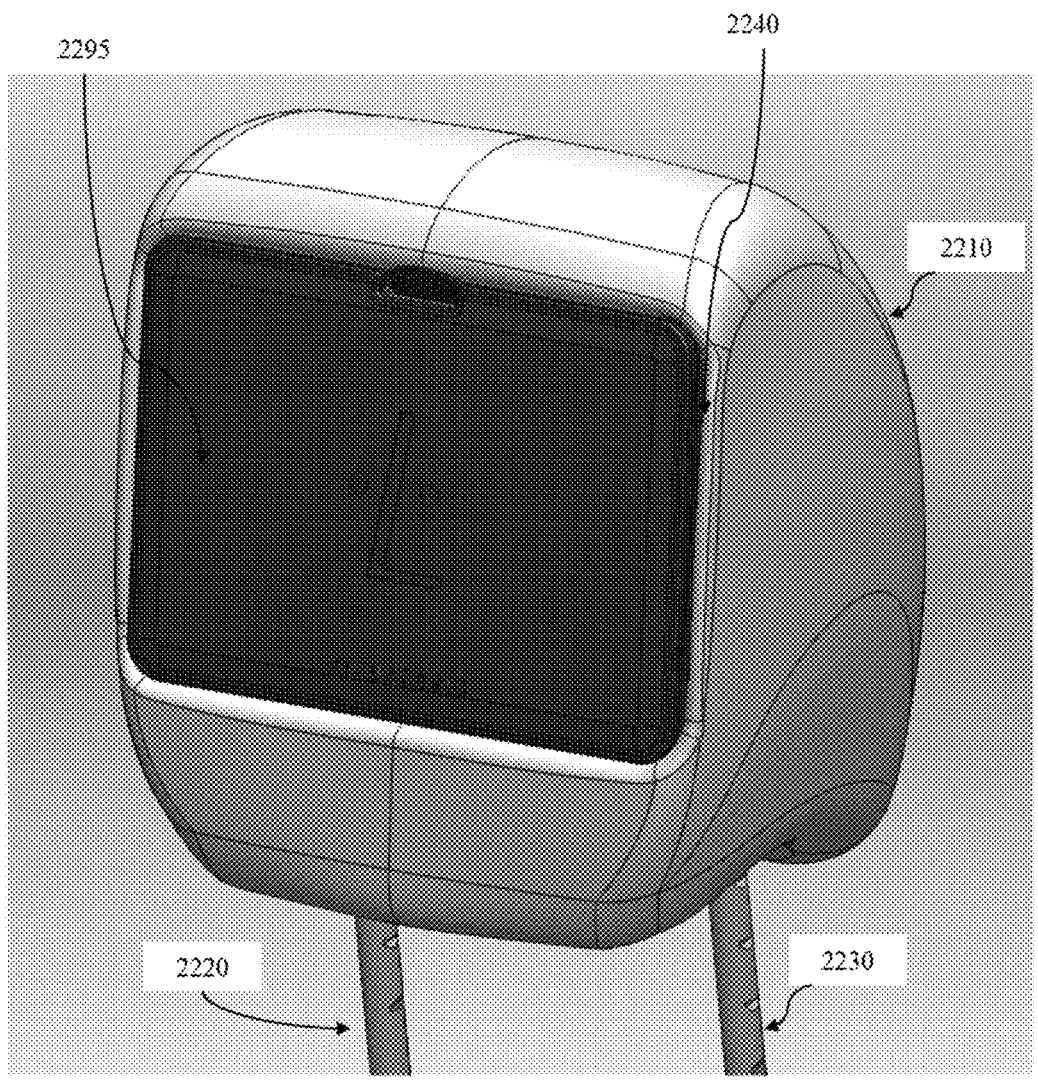
FIG. 42 depicts aspects of a tablet-based vehicle entertainment system (headrest-mounted) according to certain embodiments of the present invention.

FIGS. 40-42 depict aspects of a tablet-based vehicle entertainment system (headrest-mounted) according to certain embodiments of the present invention. A set of two headrest posts (2220, 2230) are attached to a head rest bracket (not shown). The bracket is inserted into headrest bun 2210 through an opening at the bottom of bun 2210, and the bracket is attached to bun 2210 by means of appropriate fasteners such as screws. Receptacle member 2240 is inserted into bun 2210 through an appropriately sized rear-facing opening in bun 2210. Tablet carrier module 2250 is inserted into receptacle member 2240, and all the foregoing components are attached to each other by means of suitable fasteners that are appropriate sized and located, depending on the requirements of each particular implementation. A tablet display device 2260 may be selectively mounted onto (or inserted into) tablet carrier module 2250. Display cover 2295 may be selectively inserted into carrier member 2250, both when tablet device 2260 is installed (FIGS. 40 and 42) and when it is not installed (FIG. 41). Display cover 2292 thus provides security and aesthetics enhancements in certain embodiments.

The entire contents of each of the following documents are hereby incorporated by reference as if fully set forth herein: United States Published Patent Application Nos. 2012/0162891 A1, 2006/0107295 A1, and 2013/0119727; U.S. Pat. Nos. 7,040,697, 7,407,227, and 7,597,393.

Many modifications and other embodiments of the invention will come to mind of one skilled in the art having the benefit of the teachings presented in the forgoing descriptions and the associated drawings. Therefore it is understood that the invention is not to be limited to the specific embodiments disclosed, and that modifications and embodiments are intended to be included as readily appreciated by those skilled in the art.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

We claim:

1. A media assembly adapted to be installed into a headrest of a vehicle, the assembly comprising:
   a receptacle member inserted into the headrest through a rear-facing opening in the headrest;
   a media module inserted into the headrest through a second opening in the headrest and electrically coupled to the receptacle member;
   a tablet carrier module inserted into said receptacle member; and
   a tablet computer selectively inserted into said tablet carrier module, the tablet computer including a touchscreen display, an audio output, and a tablet memory.

2. The media assembly of claim 1 further comprising a latch engaged with the tablet carrier module, to permit a user to quickly disconnect and remove the tablet computer from the media assembly.

3. The media assembly of claim 2 wherein the latch is a push-push latch that releases the tablet carrier module to tilt into an open position that permits removal of the tablet computer.

4. The media assembly of claim 1 further comprising a first daughter printed circuit board (PCB) coupled to the tablet computer.

5. The media assembly of claim 4 wherein the first daughter PCB is coupled to the media module.

6. The media assembly of claim 4 further comprising a Universal Serial Bus (USB) hub, and wherein the first daughter PCB is coupled to a USB port of the USB hub.

7. The media assembly of claim 4 further comprising a second daughter PCB coupled to the first daughter PCB, the second daughter PCB connected to a wireless interface.

8. The media assembly of claim 7 wherein the wireless interface is an infrared interface that drives an output device.

9. The media assembly of claim 8 wherein the output device comprises headphones.

10. The media assembly of claim 1 wherein the media module is a DVD player.

11. A seat headrest comprising:
    a headrest bun;
    a receptacle member disposed in a rear recession of the headrest bun;
    a media module disposed in the headrest bun and electrically coupled to the receptacle member;
    a tablet carrier module disposed in the receptacle member; and
    a tablet computer selectively inserted into said tablet carrier module, the tablet computer including a touchscreen display, an audio output, and a tablet memory.

12. The headrest of claim 11 further comprising one or more headrest posts extending into the headrest bun, wherein the one or more headrest posts is attached to a head rest bracket that is inserted into the headrest bun through a lower opening of the headrest bun, the lower opening being disposed at the bottom of the headrest bun.

13. The headrest of claim 12 wherein the head rest bracket is removably attached to the headrest bun.

14. The headrest of claim 11 further comprising a latch engaged with the tablet carrier module, to permit a user to quickly disconnect and remove the tablet computer from the headrest.

15. The headrest of claim 11 further comprising a first daughter printed circuit board (PCB) coupled to the tablet computer.

16. The headrest of claim 15 wherein the first daughter PCB is coupled to the media module.

17. The headrest of claim 15 further comprising a Universal Serial Bus (USB) hub, and wherein the first daughter PCB is coupled to a USB port of the USB hub.

18. The headrest of claim 15 further comprising a second daughter PCB coupled to the first daughter PCB, the second daughter PCB connected to a wireless interface.

19. The headrest of claim 18 wherein the wireless interface is an infrared interface that drives an output device.

20. The headrest of claim 11 wherein the media module is a DVD player.

* * * * *